United States Patent
Liang et al.

(10) Patent No.: US 12,486,265 B2
(45) Date of Patent: Dec. 2, 2025

(54) 2-AMINOPYRIMIDINE COMPOUNDS AND PHARMACEUTICAL COMPOSITIONS AND USES THEREOF

(71) Applicant: Shanghai Zhimeng Biopharma, Inc., Shanghai (CN)

(72) Inventors: Bo Liang, Shanghai (CN); Qiu Jin, Shanghai (CN); Huanming Chen, Shanghai (CN); Zhijun Zhang, Shanghai (CN); Tian Xia, Shanghai (CN); Bo Hua, Shanghai (CN); Gang Liu, Shanghai (CN)

(73) Assignee: Shanghai Zhimeng Biopharma, Inc. (CN)

( * ) Notice: Subject to any disclaimer, the term of this patent is extended or adjusted under 35 U.S.C. 154(b) by 956 days.

(21) Appl. No.: 17/636,164

(22) PCT Filed: Aug. 12, 2020

(86) PCT No.: PCT/CN2020/108722
§ 371 (c)(1),
(2) Date: Feb. 17, 2022

(87) PCT Pub. No.: WO2021/031960
PCT Pub. Date: Feb. 25, 2021

(65) Prior Publication Data
US 2022/0340563 A1    Oct. 27, 2022

(30) Foreign Application Priority Data
Aug. 19, 2019 (CN) .......................... 201910764971.6

(51) Int. Cl.
*C07D 471/04* (2006.01)
(52) U.S. Cl.
CPC .................................. *C07D 471/04* (2013.01)
(58) Field of Classification Search
CPC ................................................... C07D 471/04
See application file for complete search history.

(56) References Cited

U.S. PATENT DOCUMENTS

| | | | |
|---|---|---|---|
| 2021/0269439 A1 | 9/2021 | Zhang et al. | |
| 2021/0340141 A1 | 11/2021 | Sun et al. | |

FOREIGN PATENT DOCUMENTS

| | | | | |
|---|---|---|---|---|
| CN | 103748081 A | 4/2014 | | |
| CN | 107108615 A | 8/2017 | | |
| WO | 2012156498 A1 | 11/2012 | | |
| WO | 2016141092 A1 | 9/2016 | | |
| WO | 2017048727 A1 | 3/2017 | | |
| WO | WO-2018045150 A1 * | 3/2018 | ............. | A61P 37/00 |
| WO | 2019166532 A1 | 9/2019 | | |
| WO | WO-2020007275 A1 * | 1/2020 | .......... | A61K 31/519 |
| WO | 20200078455 A1 | 4/2020 | | |

OTHER PUBLICATIONS

Liu, Current Opinion in Rheumatology, May 2019; 31 (3): 307-315 (Year: 2019).*
International Search Report and Written Opinion for International Application No. PCT/CN2020/108722, mailed Oct. 20, 2020, 09 Pages.

* cited by examiner

*Primary Examiner* — Andrew D Kosar
*Assistant Examiner* — Phillip Matthew Rzeczycki
(74) *Attorney, Agent, or Firm* — Hao Yin

(57) ABSTRACT

2-aminopyrimidine compounds and pharmaceutical compositions and uses thereof are provided. Specifically, the 2-aminopyrimidine compounds have a structure as shown in formula I. The compounds are suitable for use in the fields of anti-virus and anti-infection, as well as treatment of diseases such as autoimmune diseases and tumors.

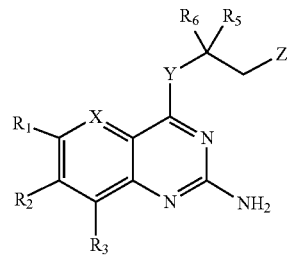

15 Claims, No Drawings

2-AMINOPYRIMIDINE COMPOUNDS AND PHARMACEUTICAL COMPOSITIONS AND USES THEREOF

CROSS-REFERENCE TO RELATED APPLICATIONS

This application is a Section 371 of International Application No. PCT/CN2020/108722, filed Aug. 12, 2020, which was published in the Chinese language on Feb. 25, 2021, under International Publication No. WO 2021/031960 A1, which claims priority under 35 U.S.C. § 119(b) to Chinese Application No. 201910764971.6, filed Aug. 19, 2019, the disclosure of each of which is incorporated herein by reference in its entirety.

TECHNICAL FIELD

The invention relates to the field of biomedicine, in particular to 2-aminopyrimidine compounds and pharmaceutical compositions and uses thereof.

BACKGROUND ART

Toll-like receptor (TLR) family plays an important role in pathogen recognition and activation of innate immunity. Toll-like receptor 8 (TLR8) is mainly expressed by bone marrow immune cells, and activation of this receptor stimulates a wide range of immune responses. The signaling pathway of TLR8 can be activated by bacterial single-stranded RNAs, small molecule agonists and microRNAs. Activation of TLR8 leads to the production of Th1 polar cytokines such as IL-12, IL-18, TNF-α and IFN-γ and various co-stimulator factors such as CD80 and CD86. These cytokines can activate and amplify innate immune and adaptive immune responses, and provide therapeutic benefits in a variety of diseases related to autoimmunity, inflammation, allergies, asthma, graft rejection, graft-versus-host diseases, infections, tumors and immunodeficiency. For example, with regard to hepatitis B, the activation of TLR8 on specialized antigen-presenting cells (pAPC) and other intrahepatic immune cells is associated with the induction of IL-12 and pro-inflammatory cytokines, which is expected to enhance HBV-specific T cell responses, activate intrahepatic NK cells and drive the reconstitution of antiviral immunity.

Currently, no regulator of toll-like receptors such as TLR8 has been marketed. In view of the potential to treat a wide range of diseases, it is very necessary to develop TLR8 regulators with high activity, high selectivity, low toxicity and excellent pharmacokinetics.

SUMMARY OF THE INVENTION

The purpose of the present invention is to provide a compound of formula I and its use in the field of anti-virus, anti-infection, autoimmune, tumor and other diseases.

In the first aspect of the present invention, it provides a compound represented by formula I or a stereoisomer or a pharmaceutically acceptable salt thereof:

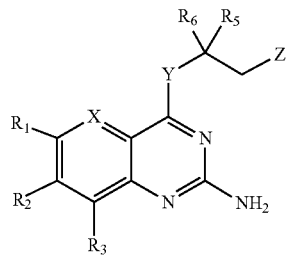

formula I wherein,

X is selected from the group consisting of N and $CR_7$;

Y is selected from the group consisting of NH and O;

Z is selected from the group consisting of —N(H)C(O)$R_4$ and —OH;

$R_1$ and $R_3$ are independently selected from the group consisting of hydrogen, halogen, $C_1$-$C_6$ alkyl, hydroxyl and amino; the alkyl is optionally substituted by 1-3 substituents selected from the group consisting of hydrogen, halogen, hydroxyl, $C_1$-$C_6$ alkylamino, $C_1$-$C_6$ alkoxy, cyano, $C_1$-$C_6$ alkyl-C(O)NH—, $C_1$-$C_6$ alkyl-NH—C(O)—, $C_1$-$C_6$ alkyl, $C_3$-$C_{10}$ cycloalkyl, $C_3$-$C_{10}$ heterocycloalkyl, halogen-substituted $C_1$-$C_6$ alkyl, $C_3$-$C_{10}$ heteroaryl and $C_6$-$C_{12}$ aryl;

$R_2$ is selected from the group consisting of $C_3$-$C_{10}$ cycloalkyl, $C_3$-$C_{10}$ heterocycloalkyl, —$NR_8R_9$, —$OR_8$, —$SR_8$, —$S(O)_2R_8$, —$N(R_{10})COR_{11}$, —$N(R_{10})S(O)_2R_{11}$, —$CONR_{10}R_{11}$, —$COR_{10}$ and —$S(O)_2NR_{10}R_{11}$; the cycloalkyl and the heterocycloalkyl are optionally substituted by 1-3 substituents selected from the group consisting of hydrogen, halogen, hydroxyl, $C_1$-$C_6$ alkylamino, $C_1$-$C_6$ alkoxy, cyano, $C_1$-$C_6$ alkyl-C(O)NH—, =O, $C_1$-$C_6$ alkyl-NH—C(O)—, $C_1$-$C_6$ alkyl, $C_3$-$C_{10}$ cycloalkyl, $C_3$-$C_{10}$ heterocycloalkyl, halogen-substituted $C_1$-$C_6$ alkyl, $C_3$-$C_{10}$ heteroaryl and $C_6$-$C_{12}$ aryl;

$R_4$, $R_5$ and $R_6$ are independently selected from the group consisting of halogen, $C_1$-$C_6$ alkyl, $C_3$-$C_{10}$ cycloalkyl, $C_3$-$C_{10}$ heterocycloalkyl, $C_3$-$C_{10}$ heteroaryl and $C_6$-$C_{12}$ aryl; the alkyl, cycloalkyl, heterocycloalkyl, heteroaryl and aryl are optionally substituted by 1-3 substituents selected from the group consisting of hydrogen, halogen, hydroxyl, amino, $C_1$-$C_6$ alkylamino, $C_1$-$C_6$ alkoxy, cyano, $C_1$-$C_6$ alkyl-C(O)NH—, $C_1$-$C_6$ alkyl-NH—C(O)—, $C_1$-$C_6$ alkyl, $C_3$-$C_{10}$ cycloalkyl, $C_3$-$C_{10}$ heterocycloalkyl, halogen-substituted $C_1$-$C_6$ alkyl, $C_3$-$C_{10}$ heteroaryl and $C_6$-$C_{12}$ aryl;

$R_7$ is selected from the group consisting of hydrogen, halogen and $C_1$-$C_6$ alkyl; the alkyl is optionally substituted by 1-3 substituents selected from the group consisting of hydrogen, halogen, hydroxyl and amino;

$R_8$ is selected from the group consisting of $C_3$-$C_{10}$ cycloalkyl, $C_3$-$C_{10}$ heterocycloalkyl, $C_3$-$C_{10}$ heteroaryl and $C_6$-$C_{10}$ aryl; the cycloalkyl, heterocycloalkyl, heteroaryl and aryl are optionally substituted by 1-3 substituents selected from the group consisting of hydrogen, halogen, hydroxyl, amino, $C_1$-$C_6$ alkylamino, $C_1$-$C_6$ alkoxy, cyano, $C_1$-$C_6$ alkyl-C(O)NH—, $C_1$-$C_6$ alkyl-NH—C(O)—, $C_1$-$C_6$ alkyl, $C_3$-$C_{10}$ cycloalkyl, $C_3$-$C_{10}$ heterocycloalkyl, halogen-substituted $C_1$-$C_6$ alkyl, $C_3$-$C_{10}$ heteroaryl and $C_6$-$C_{12}$ aryl;

$R_9$, $R_{10}$ and $R_{11}$ are independently selected from the group consisting of hydrogen, hydroxyl, $C_1$-$C_6$ alkyl, $C_3$-$C_{10}$ cycloalkyl, $C_3$-$C_{10}$ heterocycloalkyl, $C_3$-$C_{10}$ heteroaryl and $C_6$-$C_{10}$ aryl; the alkyl, cycloalkyl, heterocycloalkyl, heteroaryl and aryl are optionally substituted by 1-3 substituents selected from the group consisting of hydrogen, halogen, hydroxyl, amino, ($C_1$-$C_6$ alkyl)$_2$N—, $C_1$-$C_6$ alkoxy, cyano, $C_1$-$C_6$ alkyl-C(O)NH—, $C_1$-$C_6$ alkyl-NH—C(O)—, $C_1$-$C_6$ alkyl, $C_3$-$C_{10}$ cycloalkyl, $C_3$-$C_{10}$ heterocycloalkyl, halogen-substituted $C_1$-$C_6$ alkyl, $C_3$-$C_{10}$ heteroaryl and $C_6$-$C_{12}$ aryl;

or $R_{10}$ and $R_{11}$ and their respective connected N, C or S form $C_3$-$C_{10}$ heterocycloalkyl, 6-12 membered fused heterocyclyl or $C_3$-$C_{10}$ heteroaryl, and the heterocycloalkyl is optionally substituted by 1-3 substituents selected from the group consisting of hydrogen, halogen, hydroxyl, amino, ($C_1$-$C_6$ alkyl)$_2$N—, $C_1$-$C_6$ alkoxy, cyano, $C_1$-$C_6$ alkyl-C(O)NH—, $C_1$-$C_6$ alkyl-NH—C(O)—, $C_1$-$C_6$ alkyl, $C_3$-$C_{10}$ cycloalkyl, $C_3$-$C_{10}$ heterocycloalkyl, halogen-substituted $C_1$-$C_6$ alkyl, $C_1$-$C_6$ alkoxy, $C_3$-$C_{10}$ heteroaryl and $C_6$-$C_{12}$ aryl;

and, the heterocycloalkyl comprises 1, 2 or 3 heteroatoms selected from N, O or S;

the heteroaryl comprises 1, 2 or 3 heteroatoms selected from N, O or S;

the 6-12 membered fused heterocyclyl comprises 1, 2, 3 or 4 heteroatoms selected from N, O or S.

In another preferred embodiment, X is selected from the group consisting of N and $CR_7$;

Y is NH;

Z is selected from the group consisting of —N(H)C(O)R$_4$ and —OH;

$R_1$ and $R_3$ are independently selected from the group consisting of hydrogen, halogen and $C_1$-$C_6$ alkyl, and the alkyl is optionally substituted by 1-3 substituents selected from the group consisting of hydrogen and halogen;

$R_2$ is selected from the group consisting of $C_3$-$C_{10}$ cycloalkyl, $C_3$-$C_{10}$ heterocycloalkyl, —NR$_8$R$_9$, —OR$_8$, —SR$_8$, —S(O)$_2$R$_8$, —N(R$_{10}$)COR$_{11}$, —N(R$_{10}$)S(O)$_2$R$_{11}$, —CONR$_{10}$R$_{11}$, —COR$_{10}$ and —S(O)$_2$NR$_{10}$R$_{11}$; the cycloalkyl and heterocycloalkyl are optionally substituted by 1-3 substituents selected from the group consisting of hydrogen, =O and halogen;

$R_4$ is selected from the group consisting of $C_1$-$C_6$ alkyl, $C_3$-$C_{10}$ cycloalkyl and $C_3$-$C_{10}$ heterocycloalkyl; the alkyl, cycloalkyl and heterocycloalkyl are optionally substituted by 1-3 substituents selected from the group consisting of hydrogen, halogen and $C_1$-$C_6$ alkylamino;

$R_5$ and $R_6$ are independently $C_1$-$C_6$ alkyl respectively; the alkyl is optionally substituted by 1-3 substituents selected from the group consisting of hydrogen and halogen;

$R_7$ is selected from the group consisting of hydrogen, halogen and $C_1$-$C_6$ alkyl; the alkyl is optionally substituted by 1-3 substituents selected from the group consisting of hydrogen and halogen;

$R_8$ is selected from the group consisting of $C_3$-$C_{10}$ cycloalkyl, $C_3$-$C_{10}$ heterocycloalkyl, $C_3$-$C_{10}$ heteroaryl and $C_6$-$C_{12}$ aryl; the cycloalkyl, heterocycloalkyl, heteroaryl and aryl are optionally substituted by 1-3 substituents selected from the group consisting of hydrogen, halogen and hydroxyl;

$R_9$, $R_{10}$ and $R_{11}$ are independently selected from the group consisting of hydrogen, hydroxyl, $C_1$-$C_6$ alkyl, $C_3$-$C_{10}$ cycloalkyl, $C_3$-$C_{10}$ heterocycloalkyl, $C_3$-$C_{10}$ heteroaryl and $C_6$-$C_{12}$ aryl; the alkyl, cycloalkyl, heterocycloalkyl, heteroaryl and aryl are optionally substituted by 1-3 substituents selected from the group consisting of hydrogen, halogen, ($C_1$-$C_6$ alkyl)$_2$N— and $C_1$-$C_6$ alkyl;

or $R_{10}$ and $R_{11}$ and their respective connected N, C or S form $C_3$-$C_{10}$ heterocycloalkyl, 6-12 membered fused heterocyclyl or $C_3$-$C_{10}$ heteroaryl, and the heterocycloalkyl is optionally substituted by 1-3 substituents selected from the group consisting of hydrogen, halogen, hydroxyl, ($C_1$-$C_6$ alkyl)$_2$N—, $C_1$-$C_6$ alkoxy and $C_3$-$C_{10}$ heterocycloalkyl.

In another preferred embodiment, X is N;

Y is NH;

Z is selected from the group consisting of —N(H)C(O)R$_4$ and —OH;

$R_1$ and $R_3$ are independently selected from the group consisting of hydrogen, halogen and $C_1$-$C_6$ alkyl, and the alkyl is optionally substituted by 1-3 substituents selected from the group consisting of hydrogen and halogen;

$R_2$ is selected from the group consisting of —NR$_8$R$_9$, —CONR$_{10}$R$_{11}$, —COR$_{10}$ and —S(O)$_2$NR$_{10}$R$_{11}$;

$R_4$ is selected from the group consisting of $C_1$-$C_6$ alkyl and $C_3$-$C_{10}$ cycloalkyl; the alkyl and cycloalkyl are optionally substituted by 1-3 substituents selected from the group consisting of hydrogen, halogen and $C_1$-$C_6$ alkylamino;

$R_5$ and $R_6$ are independently $C_1$-$C_6$ alkyl respectively; the alkyl is optionally substituted by 1-3 substituents selected from the group consisting of hydrogen and halogen;

$R_8$ is selected from the group consisting of $C_3$-$C_{10}$ cycloalkyl; the cycloalkyl is optionally substituted by 1-3 substituents selected from the group consisting of hydrogen, halogen and hydroxyl;

$R_9$ is H;

$R_{10}$ and $R_{11}$ are independently selected from the group consisting of hydrogen, hydroxyl, $C_1$-$C_6$ alkyl, $C_3$-$C_{10}$ cycloalkyl, $C_3$-$C_{10}$ heterocycloalkyl, $C_3$-$C_{10}$ heteroaryl and $C_6$-$C_{12}$ aryl; the alkyl, cycloalkyl, heterocycloalkyl, heteroaryl and aryl are optionally substituted by 1-3 substituents selected from the group consisting of hydrogen, halogen, ($C_1$-$C_6$ alkyl)$_2$N— and $C_1$-$C_6$ alkyl;

or $R_{10}$ and $R_{11}$ and the N which they are respective connected form $C_3$-$C_{10}$ heterocycloalkyl optionally substituted by 1-3 substituents selected from the group consisting of hydrogen, halogen, hydroxyl, ($C_1$-$C_6$ alkyl)$_2$N—, $C_1$-$C_6$ alkoxy and $C_3$-$C_{10}$ heterocycloalkyl.

In another preferred embodiment, X is N;

Y is NH;

Z is selected from the group consisting of —N(H)C(O)R$_4$ and —OH;

$R_1$ and $R_3$ are independently selected from the group consisting of hydrogen and halogen;

$R_2$ is —CONR$_{10}$R$_{11}$;

$R_4$ is CH$_3$— or

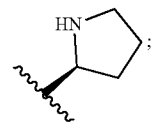 [SMILES: *[C@@H]1CCCN1]

$R_5$ and $R_6$ are independently $C_1$-$C_6$ alkyl respectively;

$R_{10}$ and $R_{11}$ are independently selected from the group consisting of hydrogen, $C_1$-$C_6$ alkyl and $C_3$-$C_{10}$ cycloalkyl; the alkyl and cycloalkyl are optionally substituted by 1-3 substituents selected from the group consisting of hydrogen, halogen, $(C_1\text{-}C_6 \text{ alkyl})_2N$— and $C_1\text{-}C_6$ alkyl;

or $R_{10}$ and $R_{11}$ and the N which they are respective connected form $C_3\text{-}C_{10}$ heterocycloalkyl, and the heterocycloalkyl is optionally substituted by 1-3 substituents selected from the group consisting of hydrogen, halogen, hydroxyl, $(C_1\text{-}C_6 \text{ alkyl})_2N$— and $C_1\text{-}C_6$ alkoxy.

In another preferred embodiment, X is N;
Y is NH;
Z is selected from the group consisting of —N(H)C(O)$R_4$ and —OH;
$R_1$ and $R_3$ are independently selected from the group consisting of hydrogen and halogen;
$R_2$ is —CONR$_{10}$R$_{11}$;
$R_4$ is methyl;
$R_5$ is methyl;
$R_6$ is n-butyl;
$R_{10}$ and $R_{11}$ are independently selected from the group consisting of hydrogen, $C_1\text{-}C_6$ alkyl and $C_3\text{-}C_{10}$ cycloalkyl; the alkyl and cycloalkyl are optionally substituted by 1-3 substituents selected from the group consisting of hydrogen, halogen, $(C_1\text{-}C_6 \text{ alkyl})_2N$— and $C_1\text{-}C_6$ alkyl;
or $R_{10}$ and $R_{11}$ and the N which they are respective connected form $C_3\text{-}C_{10}$ heterocycloalkyl, and the heterocycloalkyl is optionally substituted by 1-3 substituents selected from the group consisting of hydrogen, halogen, hydroxyl, $(C_1\text{-}C_6 \text{ alkyl})_2N$— and $C_1\text{-}C_6$alkoxy.

In another preferred embodiment, X is N;
Y is NH;
Z is selected from the group consisting of —N(H)C(O)$R_4$ and —OH;
$R_1$ and $R_3$ are independently selected from the group consisting of hydrogen and halogen;
$R_2$ is —CONR$_{10}$R$_{11}$;
$R_4$ is methyl;
$R_5$ is methyl;
$R_6$ is n-butyl;
$R_{10}$ and $R_{11}$ are independently selected from the group consisting of hydrogen, $C_1\text{-}C_6$ alkyl and $C_3\text{-}C_{10}$ cycloalkyl; the alkyl and cycloalkyl are optionally substituted by 1-3 substituents selected from the group consisting of hydrogen, halogen, $(C_1\text{-}C_6 \text{ alkyl})_2N$— and $C_1\text{-}C_6$ alkyl.

In another preferred embodiment, X is N;
Y is NH;
Z is selected from the group consisting of —N(H)C(O)$R_4$ and —OH;
$R_1$ and $R_3$ are independently selected from the group consisting of hydrogen and halogen;
$R_2$ is —COR$_{10}$;
$R_4$ is methyl;
$R_5$ is methyl;
$R_6$ is n-butyl;
$R_{10}$ is selected from the group consisting of hydroxyl, $C_1\text{-}C_6$ alkyl, $C_3\text{-}C_{10}$ cycloalkyl and $C_3\text{-}C_{10}$ heteroaryl, and the alkyl, cycloalkyl and heteroaryl are optionally substituted by 1-3 substituents selected from the group consisting of hydrogen, halogen and $C_1\text{-}C_6$ alkyl.

In another preferred embodiment, X is N;
Y is NH;
Z is selected from the group consisting of —N(H)C(O)$R_4$ and —OH;

$R_1$ and $R_3$ are independently selected from the group consisting of hydrogen and halogen;
$R_2$ is —COR$_{10}$;
$R_4$ is methyl;
$R_5$ is methyl;
$R_6$ is n-butyl;
$R_{10}$ is selected from the group consisting of $C_1\text{-}C_6$ alkyl and $C_3\text{-}C_{10}$ cycloalkyl.

In another preferred embodiment, X is N;
Y is NH;
Z is selected from the group consisting of —N(H)C(O)$R_4$ and —OH;
$R_1$ and $R_3$ are independently selected from the group consisting of hydrogen and halogen;
$R_2$ is —NR$_8$R$_9$;
$R_4$ is selected from the group consisting of CH$_3$— and

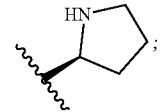 [SMILES: *[C@@H]1CCCN1]

$R_5$ is methyl;
$R_6$ is n-butyl;
$R_8$ is $C_3\text{-}C_{10}$ cycloalkyl, and the cycloalkyl is optionally substituted by 1-3 substituents selected from the group consisting of hydrogen, halogen and hydroxyl;
$R_9$ is hydrogen.

In another preferred embodiment, X is selected from the group consisting of N and CR$_7$;
Y is NH;
Z is selected from the group consisting of —N(H)C(O)$R_4$ and —OH;
$R_1$ and $R_3$ are independently selected from the group consisting of hydrogen and halogen;
$R_4$ is selected from the group consisting of CH$_3$—,

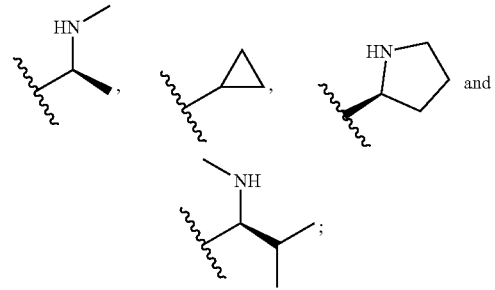

$R_5$ and $R_6$ are independently $C_1\text{-}C_6$ alkyl respectively;
$R_7$ is selected from the group consisting of hydrogen and halogen.

In another preferred embodiment, X is selected from the group consisting of N and CR$_7$;
Y is NH;
Z is selected from the group consisting of —N(H)C(O)$R_4$ and —OH;
$R_1$ and $R_3$ are independently selected from the group consisting of hydrogen and halogen;
$R_4$ is methyl;
$R_5$ is methyl;
$R_6$ is n-butyl;

$R_7$ is selected from the group consisting of hydrogen and halogen.

In another preferred embodiment, X is N;

$R_2$ is selected from the group consisting of —$CONR_{10}R_{11}$, —$COR_{10}$ and —$S(O)_2NR_{10}R_{11}$;

$R_{10}$ and $R_{11}$ are independently selected from the group consisting of hydrogen, hydroxyl, $C_1$-$C_6$ alkyl, $C_3$-$C_{10}$ cycloalkyl, $C_3$-$C_{10}$ heterocycloalkyl, $C_3$-$C_{10}$ heteroaryl and $C_6$-$C_{12}$ aryl, and the alkyl, cycloalkyl, heterocycloalkyl, heteroaryl and aryl are optionally substituted by 1-3 substituents selected from the group consisting of hydrogen, halogen, ($C_1$-$C_6$ alkyl)$_2$N— and $C_1$-$C_6$ alkyl;

or $R_{10}$ and $R_{11}$ and the N which they are connected form $C_3$-$C_{10}$ heterocycloalkyl, 6-12 membered fused heterocyclyl or $C_3$-$C_{10}$ heteroaryl, and the heterocycloalkyl is optionally substituted by 1-3 substituents selected from the group consisting of hydrogen, halogen, hydroxyl, ($C_1$-$C_6$ alkyl)$_2$N—, $C_1$-$C_6$ alkoxy and $C_3$-$C_{10}$ heterocycloalkyl.

In another preferred embodiment, X is N;

$R_2$ is selected from the group consisting of —$NR_8R_9$, —$OR_8$, —$SR_8$ and —$S(O)_2R_8$;

$R_8$ is selected from the group consisting of $C_3$-$C_{10}$ cycloalkyl, $C_3$-$C_{10}$ heterocycloalkyl, $C_3$-$C_{10}$ heteroaryl and $C_6$-$C_{12}$ aryl; the cycloalkyl, heterocycloalkyl, heteroaryl and aryl are optionally substituted by 1-3 substituents selected from the group consisting of hydrogen, halogen and hydroxyl;

$R_9$ is selected from the group consisting of hydrogen, hydroxyl, $C_1$-$C_6$ alkyl, $C_3$-$C_{10}$ cycloalkyl, $C_3$-$C_{10}$ heterocycloalkyl, $C_3$-$C_{10}$ heteroaryl and $C_6$-$C_{12}$ aryl, and the alkyl, cycloalkyl, heterocycloalkyl, heteroaryl, and aryl are optionally substituted by 1-3 substituents selected from the group consisting of hydrogen, halogen, ($C_1$-$C_6$ alkyl)$_2$N— and $C_1$-$C_6$ alkyl.

In another preferred embodiment, $R_2$ is selected from the group consisting of $C_3$-$C_{10}$ cycloalkyl and $C_3$-$C_{10}$ heterocycloalkyl; the cycloalkyl and heterocycloalkyl are optionally substituted by 1-3 substituents selected from the group consisting of hydrogen, =O and halogen.

In another preferred embodiment, the compound is selected from the group consisting of:

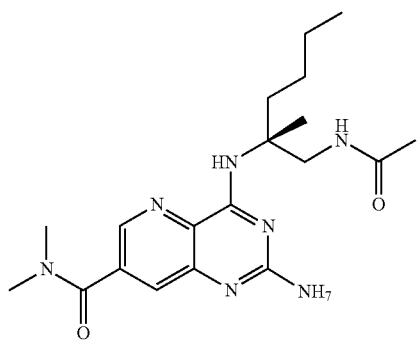

-continued

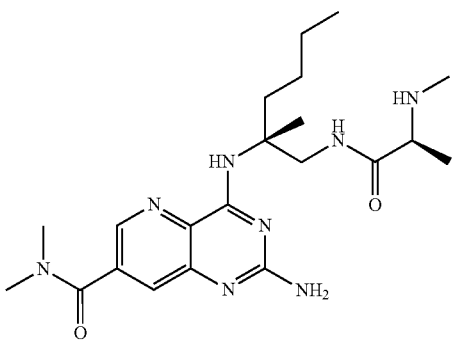

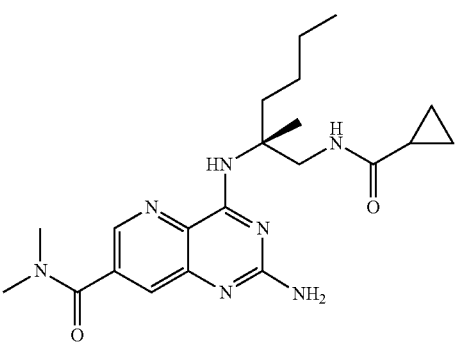

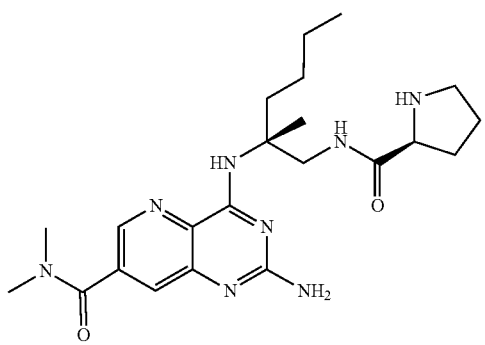

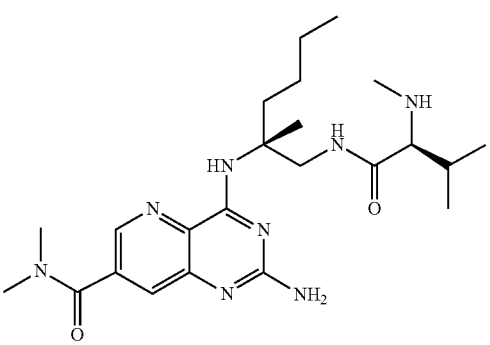

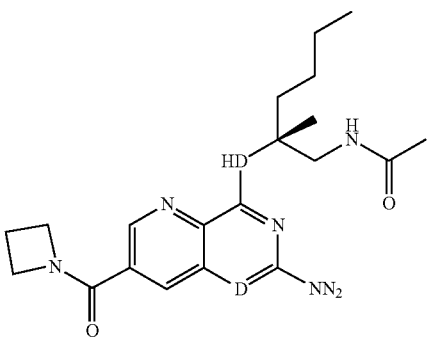

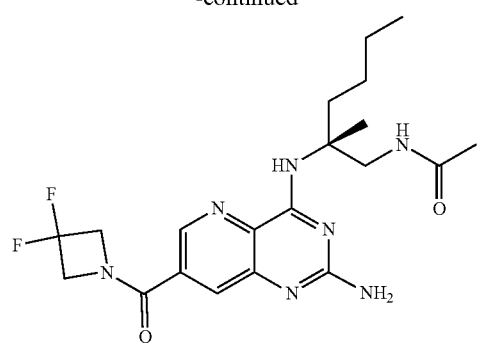
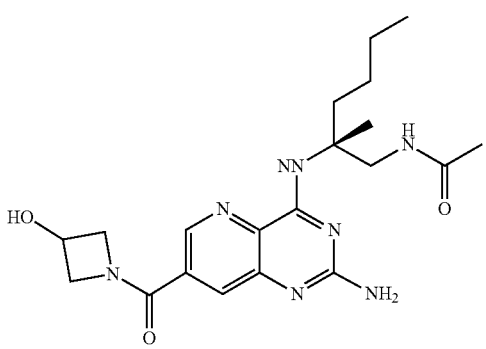
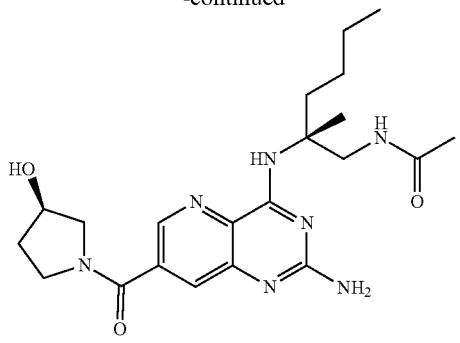
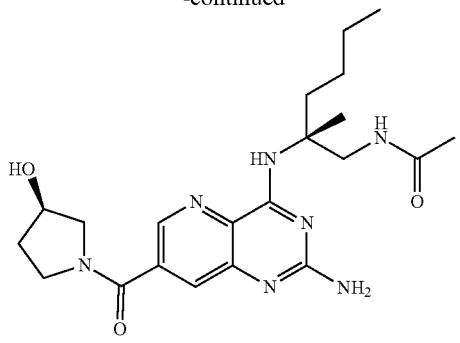

-continued
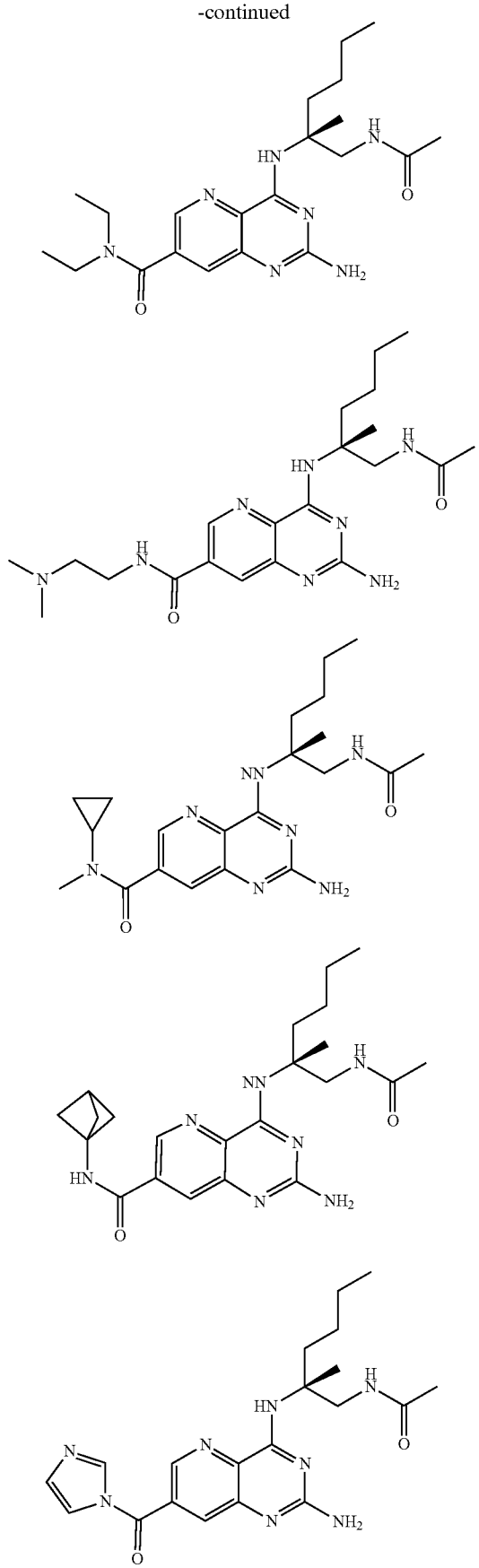
-continued
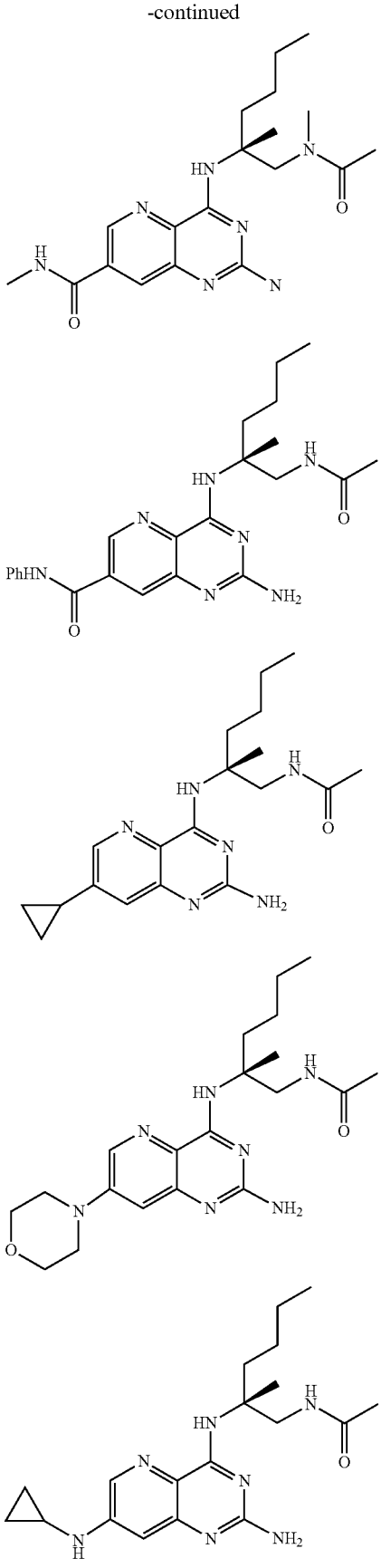

-continued
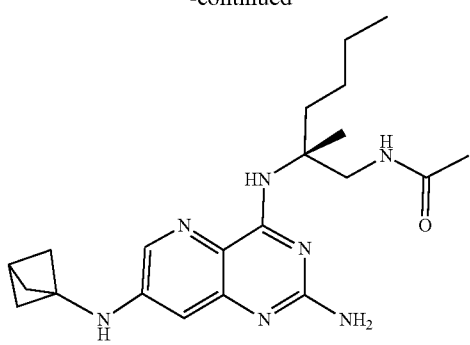
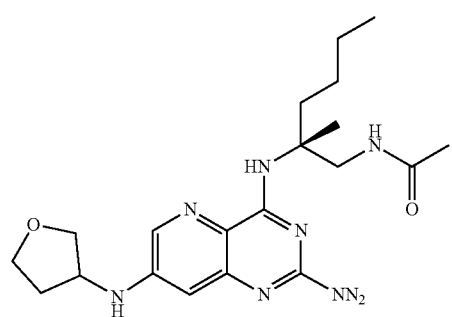
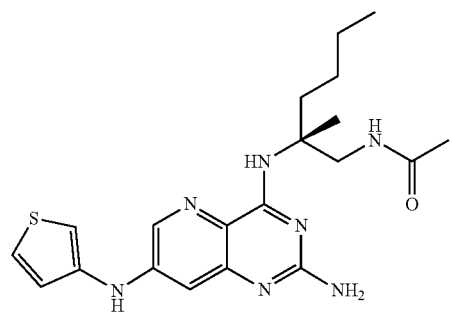
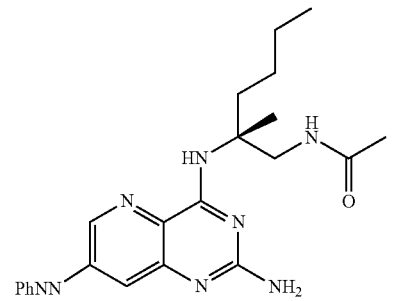
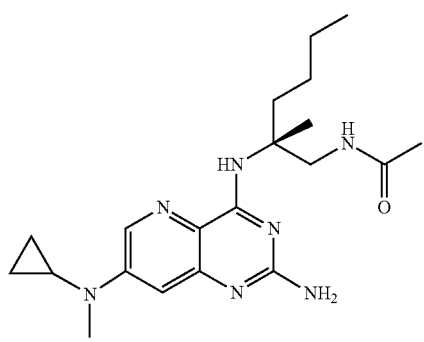
-continued
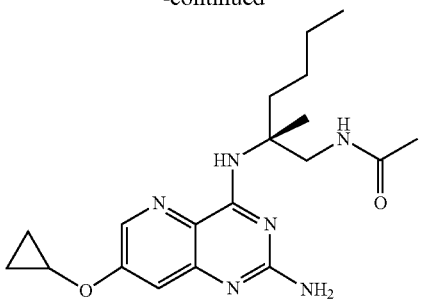
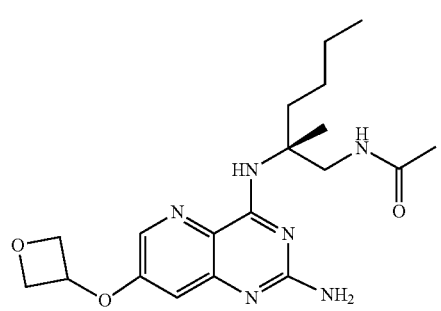
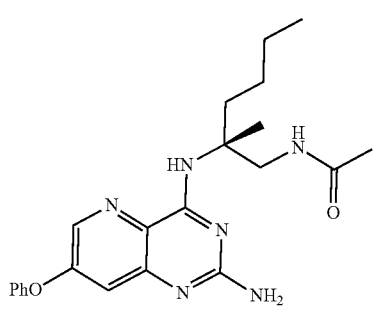
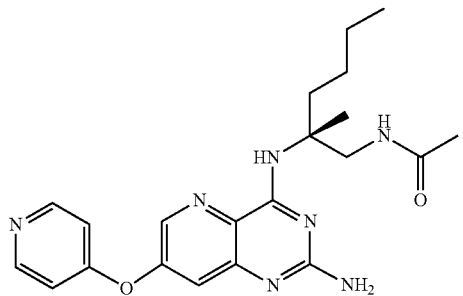
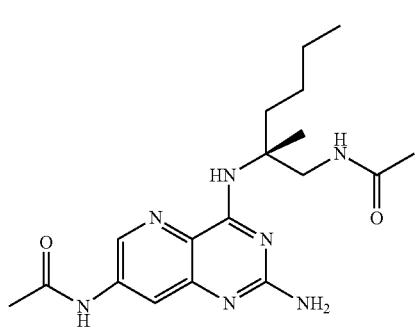

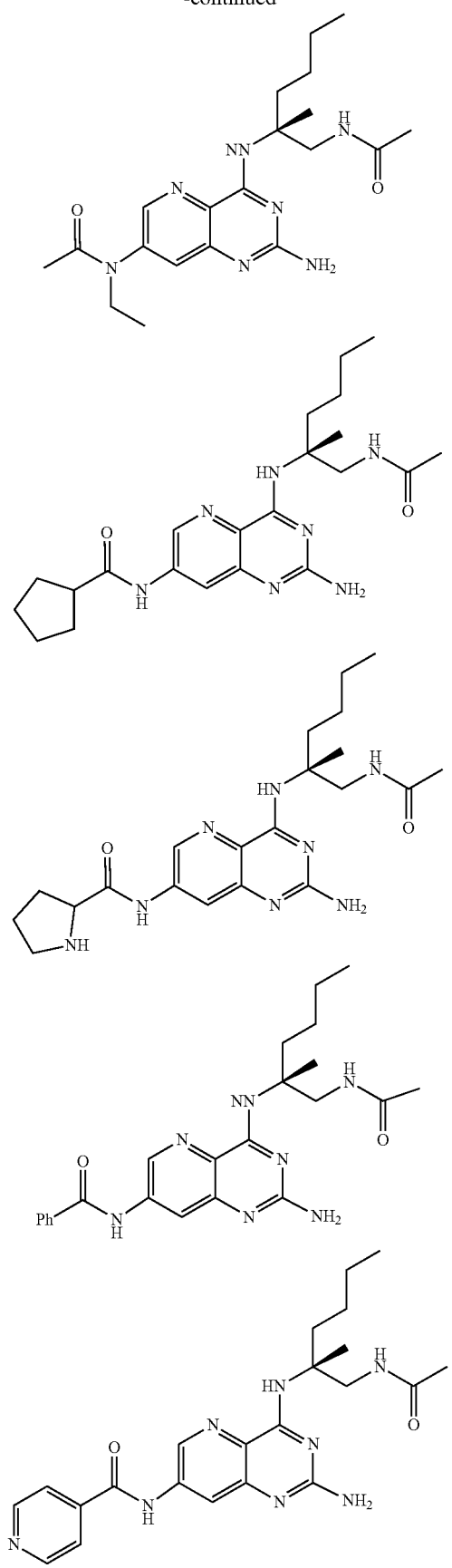
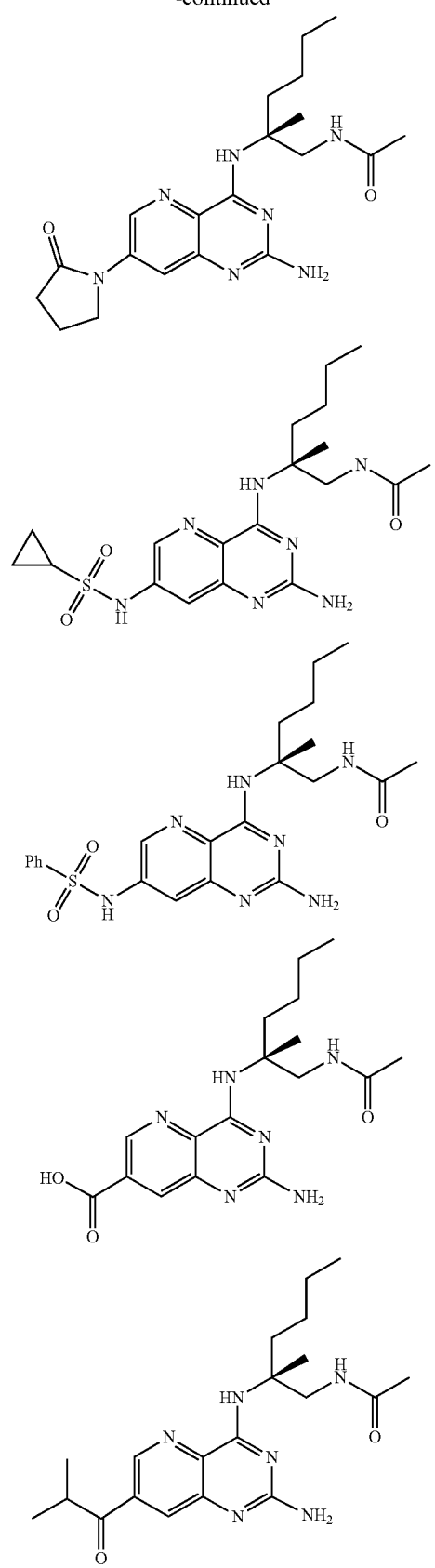

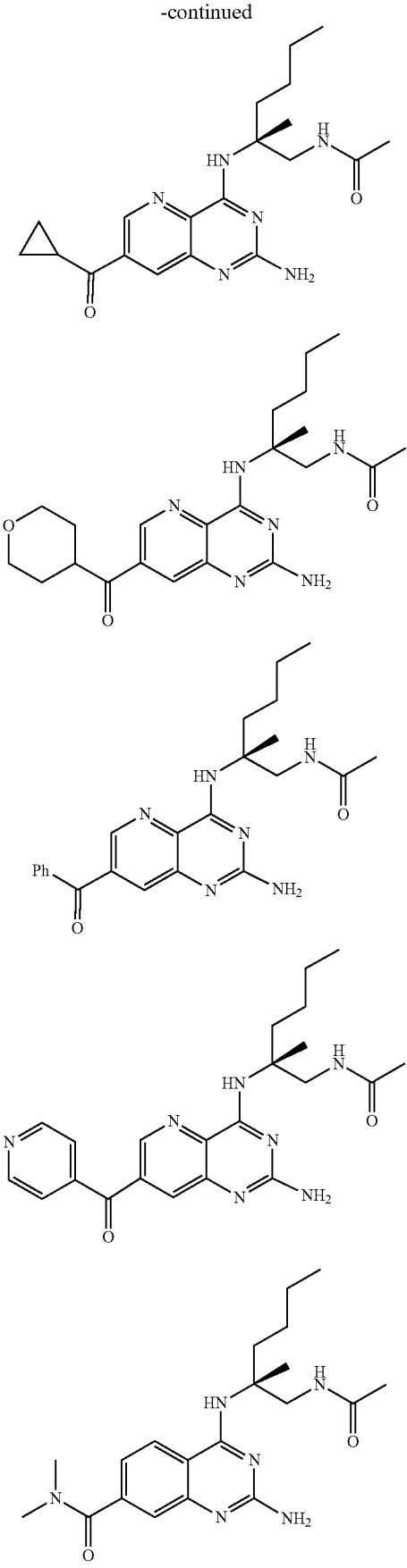
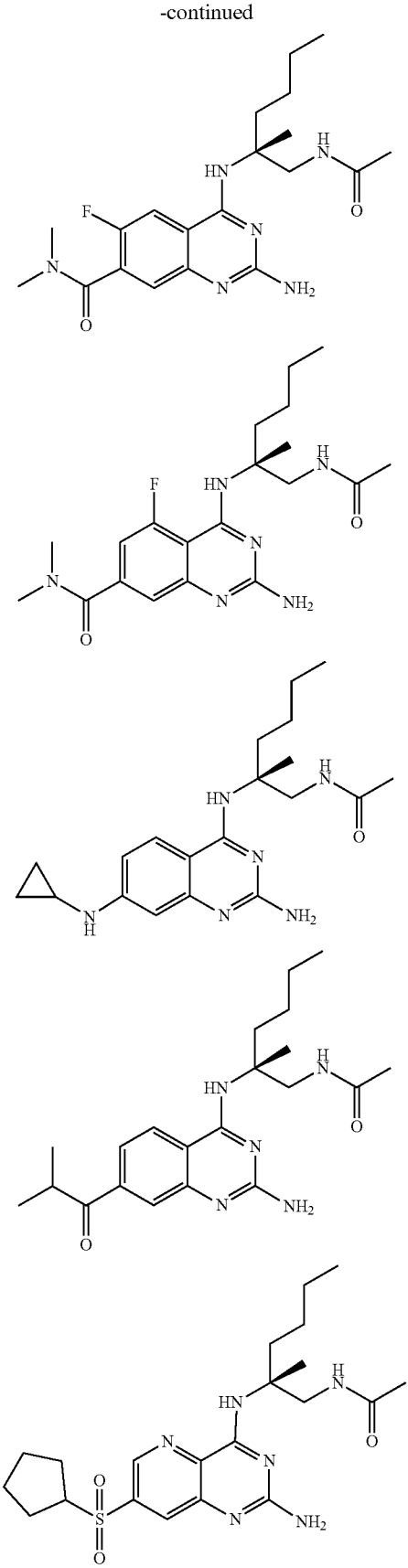

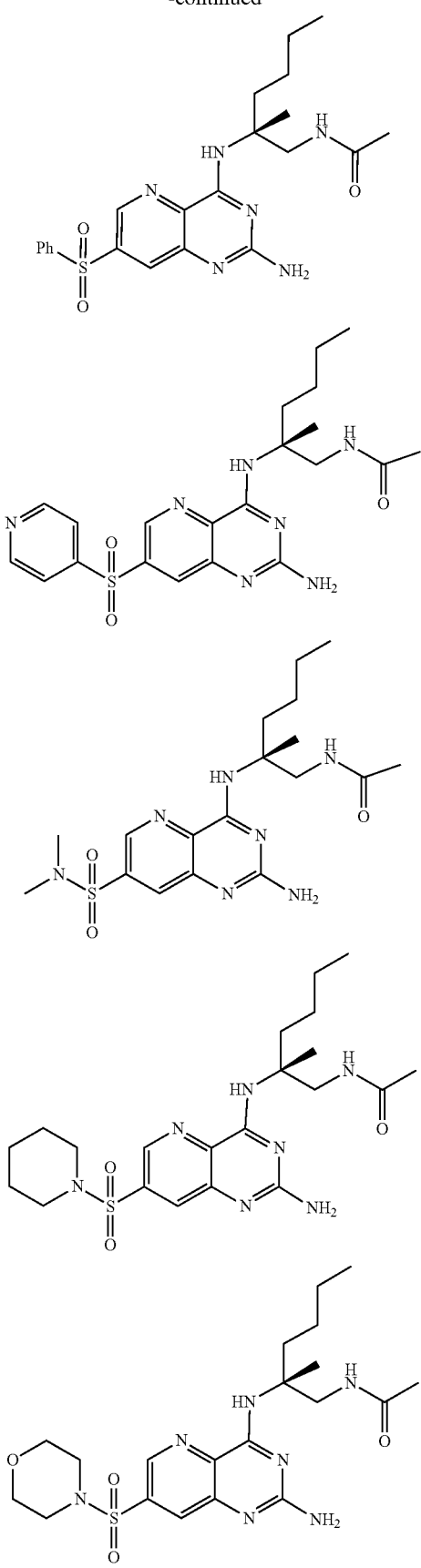
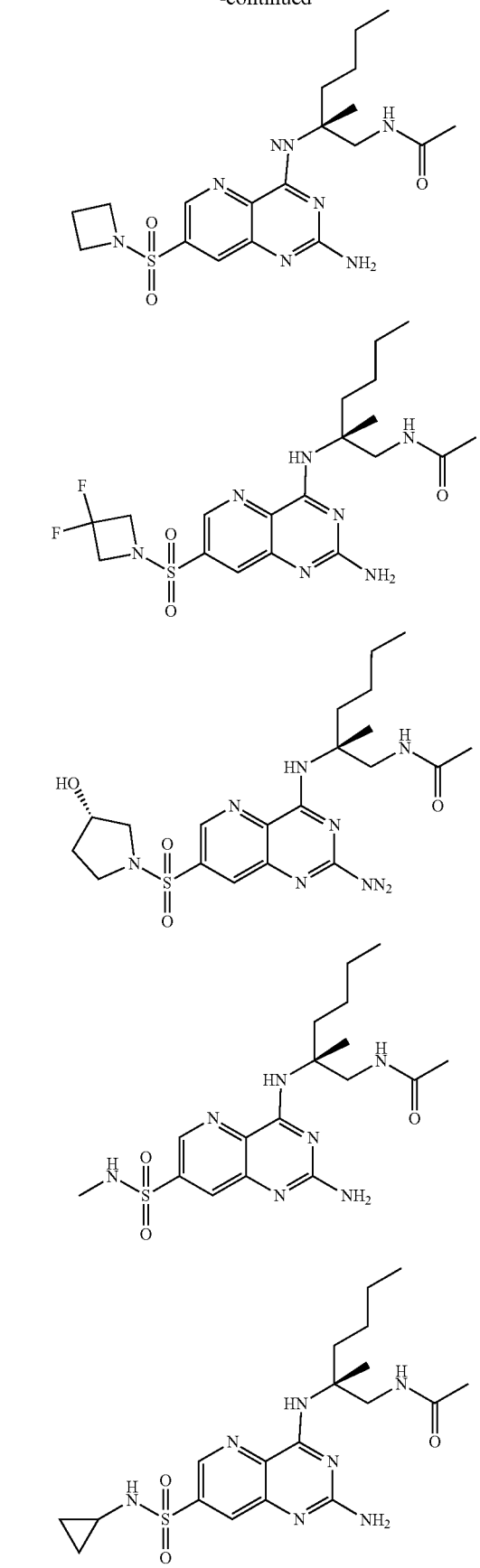

-continued
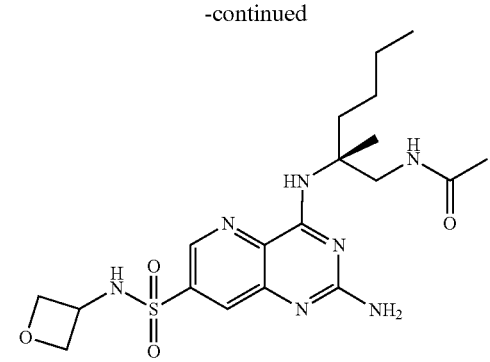
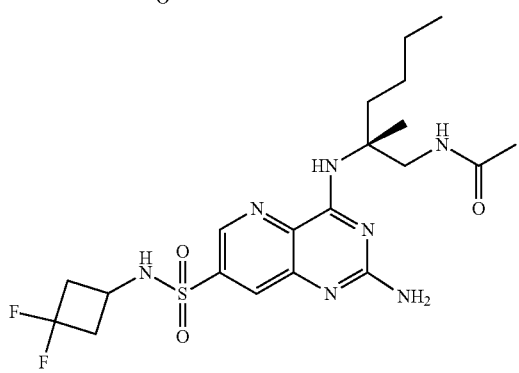
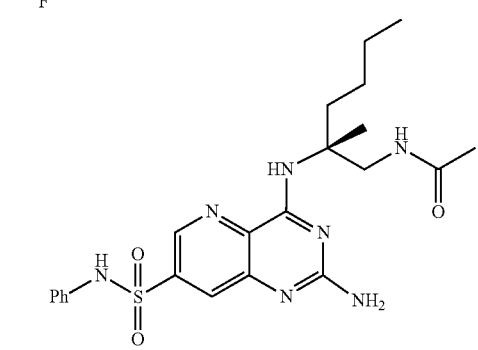
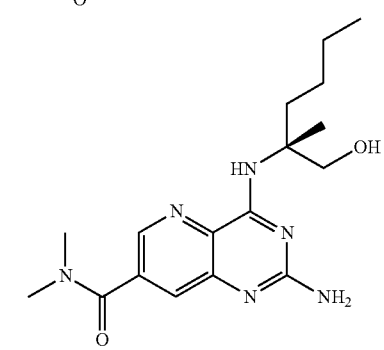
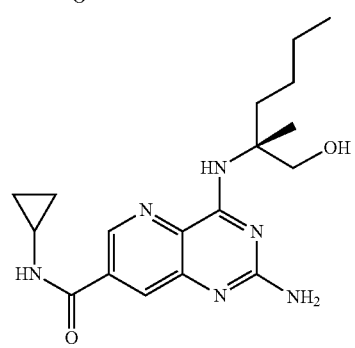
-continued
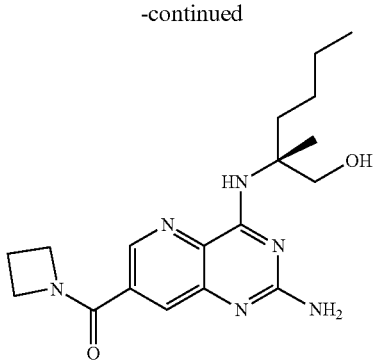
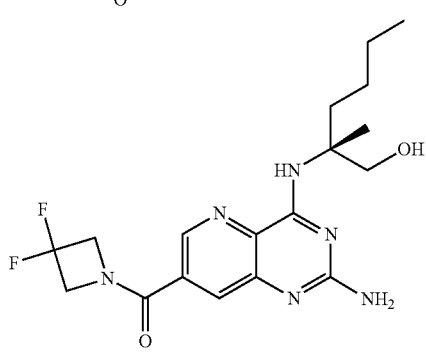
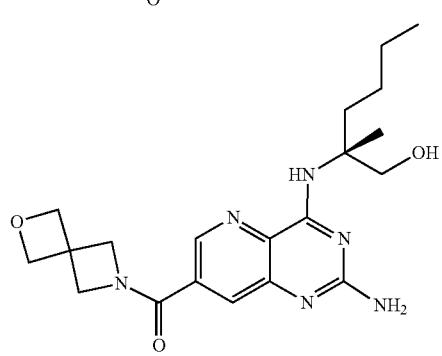
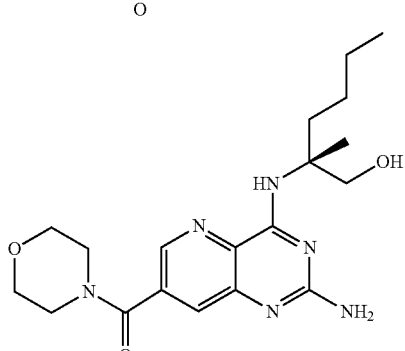
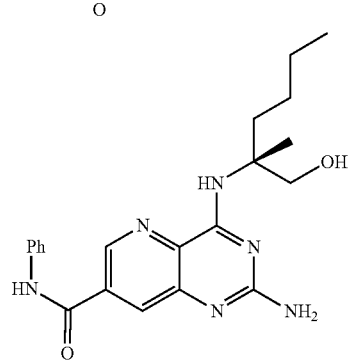

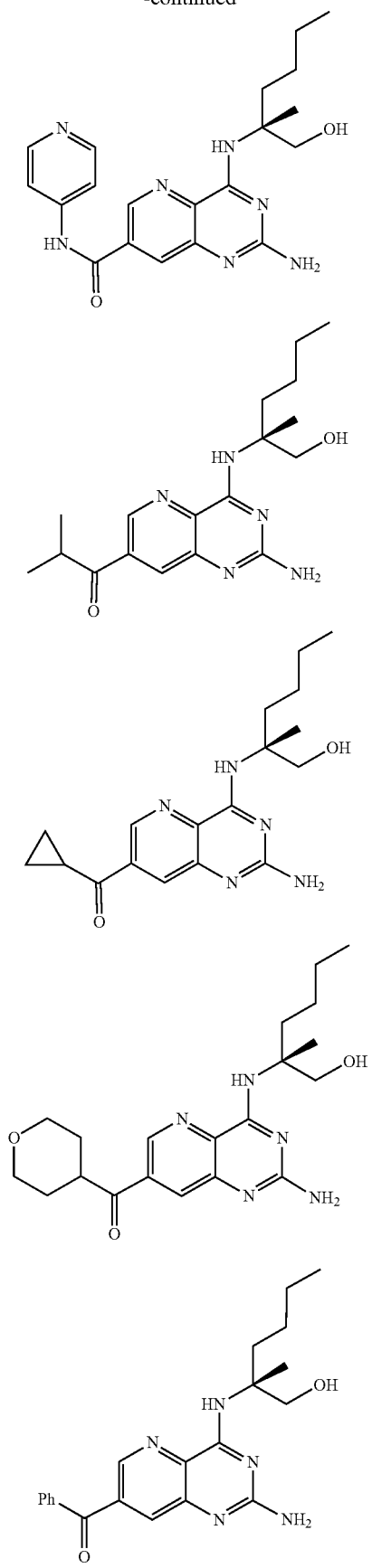
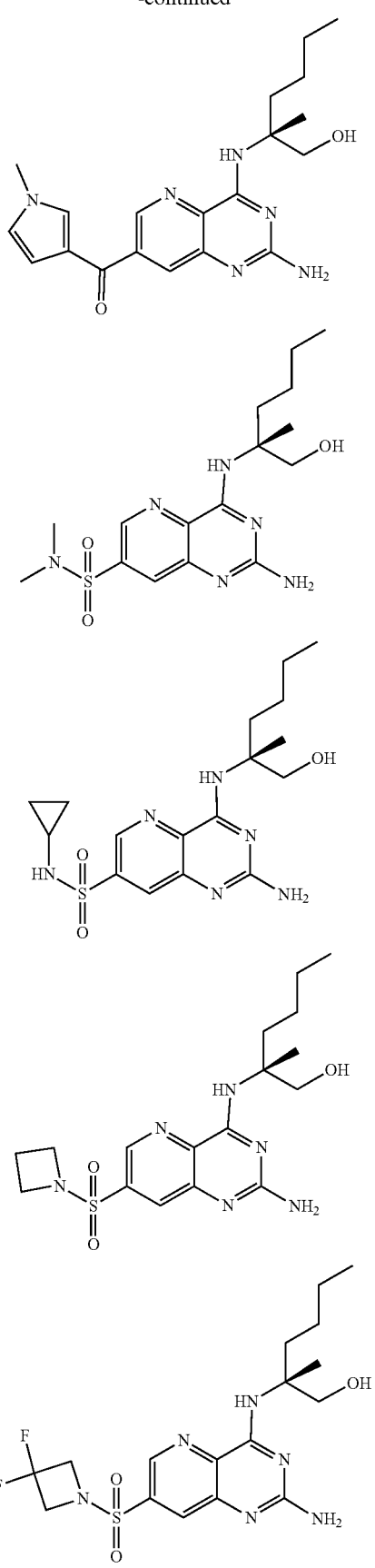

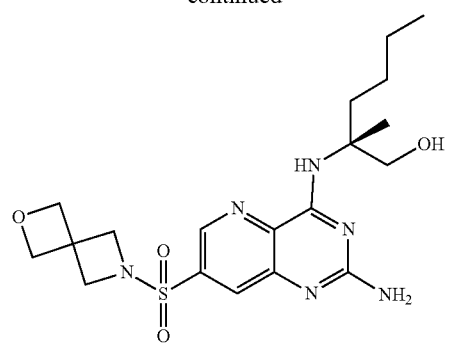
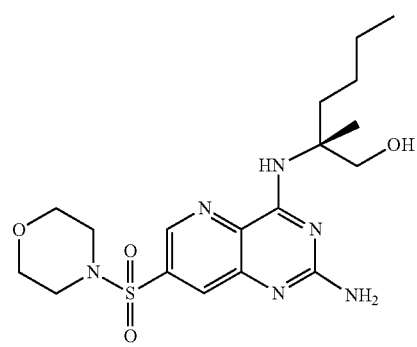
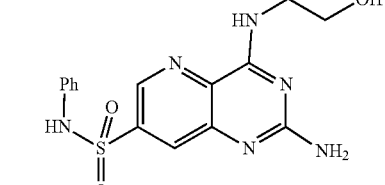
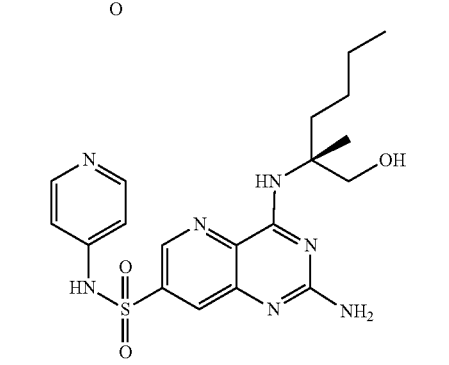
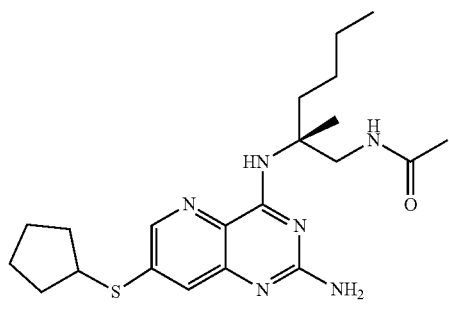
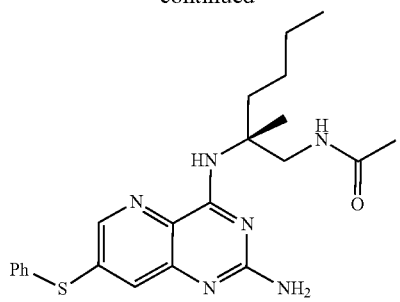
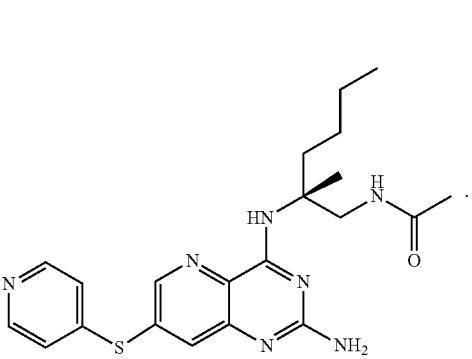
In another preferred embodiment, the compound is selected from the group consisting of:
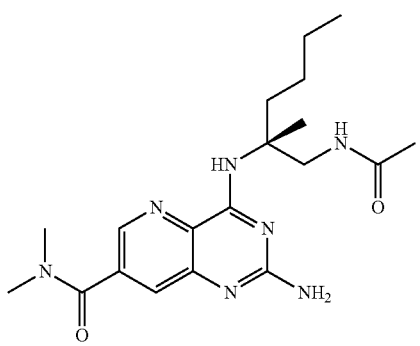
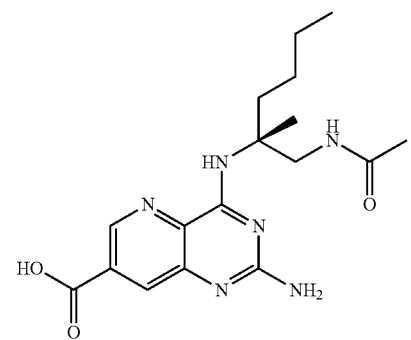

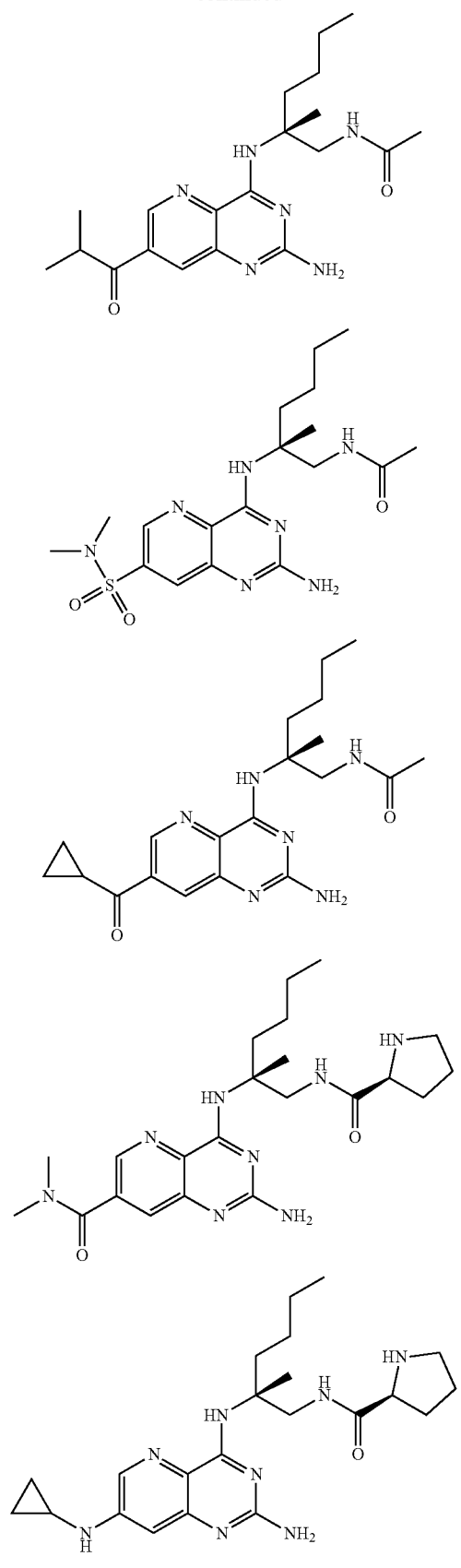
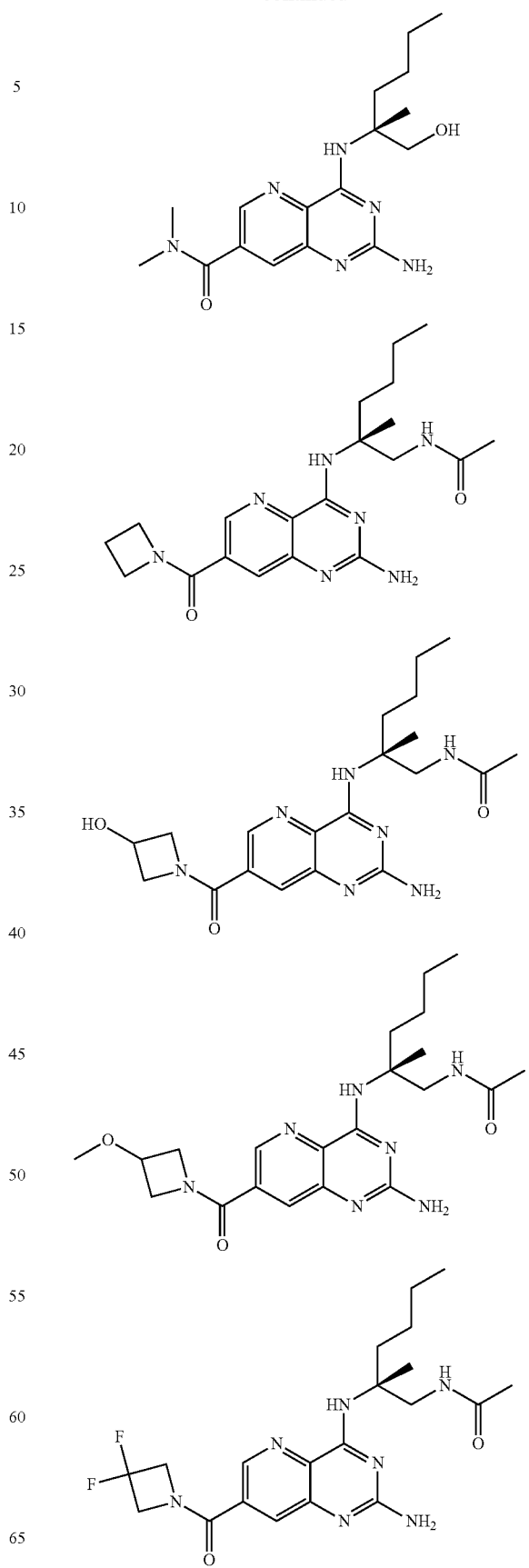

-continued

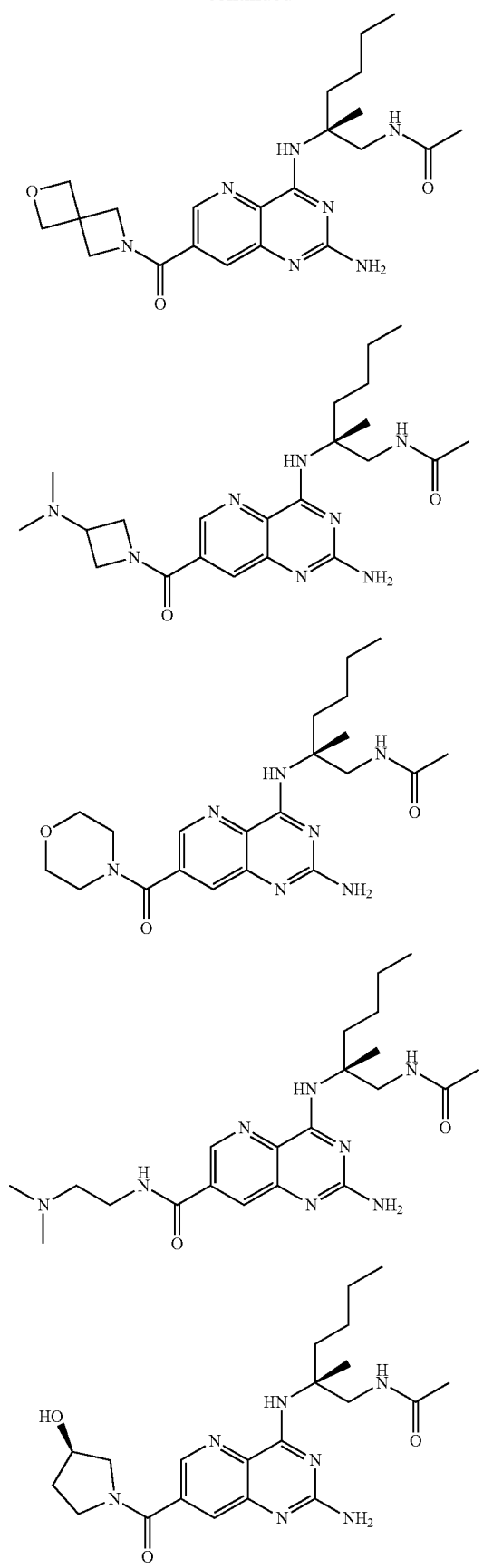

-continued

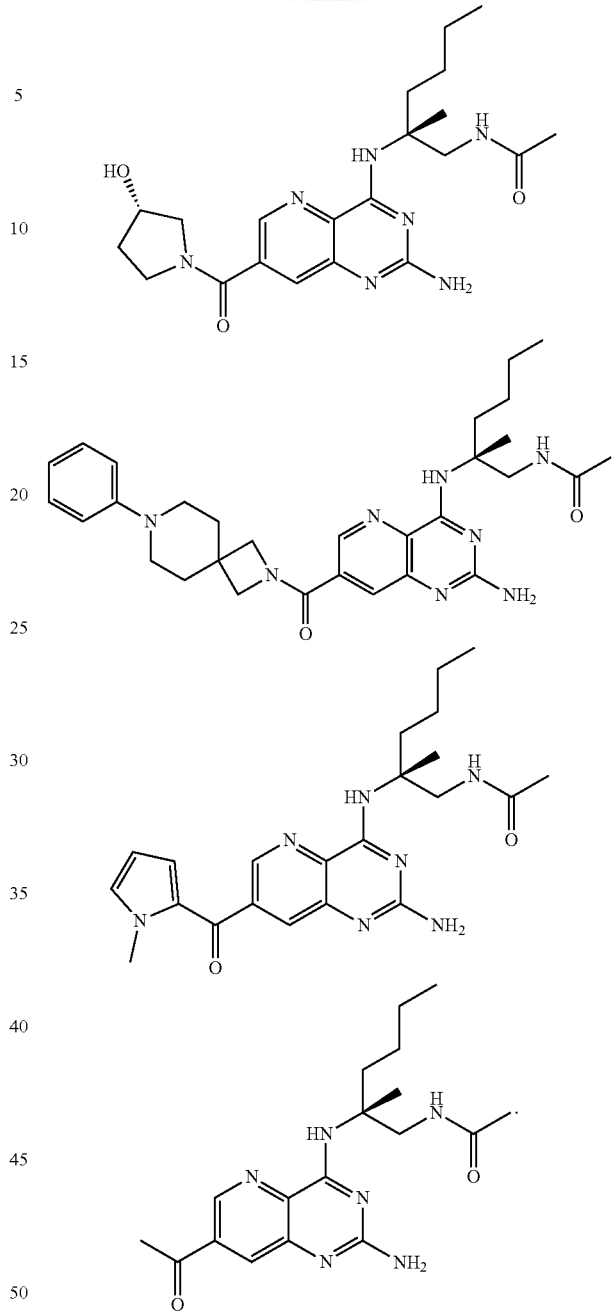

In the second aspect of the present invention, it provides a pharmaceutical composition comprising:
i) one or more of the compounds or stereoisomers or pharmaceutically acceptable salts thereof according to the first aspect of the present invention; and
ii) pharmaceutically acceptable carriers.

In the third aspect of the present invention, it provides a use of the compounds or stereoisomers or pharmaceutically acceptable salts thereof according to the first aspect of the present invention, wherein it is used for a use selected from the group consisting of:
1) preparation of anti-tumor drugs;
2) preparation of antiviral drugs;
3) preparation of anti-infection drugs;

4) preparation of drugs for the prevention and/or treatment of autoimmune-related diseases.

In another preferred embodiment, the tumor is selected from the group consisting of lung cancer, liver cancer, esophageal cancer, breast cancer, brain cancer, prostate cancer, melanoma and leukemia.

In another preferred embodiment, the virus is selected from the group consisting of influenza virus, coxsackie virus, hepatitis B virus (HBV), hepatitis C virus (HCV), human immunodeficiency virus (HIV), dengue virus, and polio virus.

In another preferred embodiment, the infection is an infection of a substance selected from the group consisting of viruses, Chlamydia, Mycoplasma, bacteria, fungi and parasites.

In another preferred embodiment, the autoimmune-related diseases are selected from the group consisting of rheumatoid arthritis, systemic lupus erythematosus, multiple sclerosis, insulin dependent diabetes, arteriosclerosis and inflammatory bowel disease.

In the fourth aspect of the present invention, it provides a TLR8 modulator comprising one or more of the compounds or stereoisomers or pharmaceutically acceptable salts thereof according to the first aspect of the present invention.

In the fifth aspect of the present invention, it provides a method for modulating TLR8 by administering to a subject in need thereof a modulating effective amount of one or more of the compounds, or stereoisomers or pharmaceutically acceptable salts thereof according to the first aspect of the present invention.

It should be understood that in the present invention, any of the technical features specifically described above and below (such as in the Examples) can be combined with each other, which will not redundantly be described one by one herein.

DETAILED DESCRIPTION OF THE INVENTION

After a long and intensive study, the present inventors unexpectedly prepared a class of compounds of formula I having significantly higher activity and selectivity for TLR8 through structural improvement in specific positions (especially $R_2$ positions). Compared with similar compounds known in the art, the compounds of the present invention have higher activity, better selectivity, better in vivo efficacy, better safety, better pharmacokinetics and better drugability. On this basis, the inventors have completed the present invention.

Terms

In the present invention, unless specifically indicated, the terms used have the general meaning well known to those skilled in the art.

In the present invention, the term "halogen" refers to F, Cl, Br or I.

In the present invention, "$C_1$-$C_6$ alkyl" refers to a linear or branched alkyl comprising 1 to 6 carbon atoms, such as methyl, ethyl, propyl, isopropyl, butyl, isobutyl, tert-butyl, neopentyl, tertpentyl, or the like.

In the present invention, the term "$C_3$-$C_{10}$ cycloalkyl" refers to a cyclic alkyl having 3 to carbon atoms on the ring, including but not limited to cyclopropyl, cyclobutyl, cyclopentyl, cyclohexyl, cycloheptyl, cyclooctyl, and other monocycloalkyl, spiro-cycloalkyl and bridged cycloalkyl.

In the present invention, the term "$C_1$-$C_6$ alkoxy" refers to a linear or branched alkoxy having 1 to 6 carbon atoms, including but not limited to methoxy, ethoxy, propoxy, isopropoxy, butoxy, and the like. Preferably $C_1$-$C_4$ alkoxy.

In the present invention, the term "heterocycloalkyl" is a 4-10 membered heterocyclyl containing 1, 2 or 3 heteroatoms selected from N, O or S, including (but not limited to) mono-heterocyclyl such as

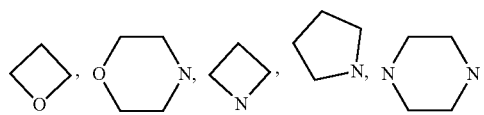

etc. and spiro heterocyclyl such as

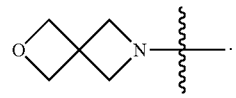 [SMILES: *N1CC2(COC2)C1]

In the present invention, the term "fused heterocyclyl" refers to a fused ring formed by sharing two adjacent carbon atoms by two structures selected from the group consisting of $C_3$-$C_{10}$ cycloalkyl, $C_3$-$C_{10}$ heterocycloalkyl, $C_3$-$C_{10}$ heteroaryl and $C_6$-$C_{12}$ aryl, and the fused heterocyclyl contains 1, 2, 3 or 4 heteroatoms selected from N, O and S, such as

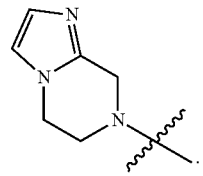 [SMILES: *N1CCn2ccnc2C1]

In the present invention, the term "aromatic ring" or "aryl" has the same meaning, preferably "$C_6$-$C_{10}$ aryl". The term "$C_6$-$C_{10}$ aryl" refers to an aromatic ring having 6 to 10 carbon atoms and having no heteroatoms on the ring, such as phenyl, naphthyl, etc.

In the present invention, the term "amino" has the following structure: —$NH_2$.

In the present invention, the term "$C_1$-$C_6$ alkylamino" has the following structure: $C_1$-$C_6$ alkyl-NH—.

In the present invention, the term "aromatic heterocycle" or "heteroaryl" has the same meaning and refers to a heteroaromatic group containing one to more heteroatoms. For example, "$C_3$-$C_{10}$ heteroaryl" refers to an aromatic heterocyclyl containing 1 to 4 heteroatoms selected from oxygen, sulfur or nitrogen and 3 to 10 carbon atoms. Non-limiting examples include: furyl, thienyl, pyridyl, pyrazolyl, pyrrolyl, N-alkylpyrrolyl, pyrimidinyl, pyrazinyl, imidazolyl, tetrazolyl and the like. The heteroaryl ring may be fused to an aryl, heterocyclic or cycloalkyl ring, wherein the ring connected to the parent structure is a heteroaryl ring. Heteroaryl groups can be optionally substituted or unsubstituted.

In the present invention, the term "halogenated" means substituted by halogen.

In the present invention, the term "substituted" means that one or more hydrogen atoms on a specific group are replaced with a specific substituent. The specific substituents are the substituents described correspondingly in the foregoing, or the substituents appearing in the respective Examples. Unless otherwise specified, a substituted group may have a substituent selected from a specific group at any substitutable position of the group, and the substituent may be the same or different at each position. Those skilled in the art will understand that the combinations of substituents contemplated by the present invention are those that are stable or chemically achievable. The substituents are, for example, but not limited to, halogen, hydroxyl, carboxyl (—COOH), $C_1$-$C_6$ alkyl, $C_3$-$C_8$ cycloalkyl, 3-12 membered heterocyclyl, aryl, heteroaryl, amino, $C_1$-$C_6$ alkoxy, and the like.

Compound

The invention provides a compound represented by formula I or a stereoisomer or a pharmaceutically acceptable salt thereof:

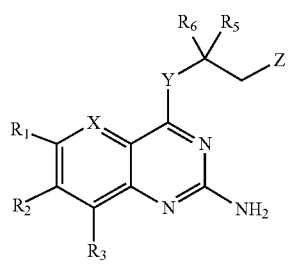

formula I wherein, each group is as defined above.

In another preferred embodiment, in the compound, any one of X, Y, Z, $R_1$, $R_2$, $R_3$, $R_4$, $R_5$, $R_6$, $R_7$, $R_8$, $R_9$, $R_{10}$ and $R_{11}$ is a corresponding group in the specific compound of the present invention, respectively.

The term "stereoisomer" or "optical isomer" means that the chiral carbon atom involved in the compound of the present invention may be in the R configuration, or in the S configuration, or a combination thereof.

As used herein, the term "pharmaceutically acceptable salt" refers to a salt formed by a compound of the present invention and an acid or base suitable for use as a medicine. Pharmaceutically acceptable salts include inorganic salts and organic salts. A preferred class of salts is the salts of the compounds of the invention formed with acids. Suitable acids for forming salts include, but are not limited to, inorganic acids such as hydrochloric acid, hydrobromic acid, hydrofluoric acid, sulfuric acid, nitric acid, phosphoric acid; organic acids such as formic acid, acetic acid, trifluoroacetic acid, propionic acid, oxalic acid, malonic acid, succinic acid, fumaric acid, maleic acid, lactic acid, malic acid, tartaric acid, citric acid, picric acid, benzoic acid, methylsulfonic acid, ethanesulfonic acid, p-toluenesulfonic acid, benzenesulfonic acid, naphthalenesulfonic acid; and amino acids such as proline, phenylalanine, aspartic acid and glutamic acid.

Another preferred class of salts are salts of the compounds of the invention formed with bases, such as alkali metal salts (for example sodium or potassium salts), alkaline earth metal salts (for example magnesium or calcium salts), ammonium salts (such as lower grades alkanol ammonium salts and other pharmaceutically acceptable amine salts), such as methylamine salt, ethylamine salt, propylamine salt, dimethylamine salt, trimethylamine salt, diethylamine salt, triethylamine salt, tert-butylamine salt, ethylenediamine salt, hydroxyethylamine salt, dihydroxyethylamine salt, tris-hydroxyethylamine salt, and an amine salt formed from morpholine, piperazine, and lysine, respectively.

Pharmaceutical Composition and Method for Administration

The present invention also provides a pharmaceutical composition comprising:
i) one or more of the above compounds or the stereoisomers or the pharmaceutically acceptable salts thereof; and
ii) pharmaceutically acceptable carriers.

The pharmaceutical composition of the present invention comprises a safe and effective amount of a compound of the present invention or a pharmacologically acceptable salt thereof, and a pharmacologically acceptable excipient or carrier.

The term "safe and effective amount" means that the amount of compound is sufficient to significantly improve the condition without causing serious side effects. Generally, the pharmaceutical composition contains 0.1-2000 mg of the compound of the present invention/dose, more preferably, 0.1-200 mg of the compound of the present invention/dose. Preferably, the "dose" is a capsule or tablet.

"Pharmaceutically acceptable carrier" means one or more compatible solid or liquid fillers or gelatinous materials which are suitable for human use and should be of sufficient purity and sufficiently low toxicity. "Compatibility" means that each component in the composition can be admixed with the compounds of the present invention and with each other without significantly reducing the efficacy of the compounds. Some examples of pharmaceutically acceptable carriers include cellulose and the derivatives thereof (such as sodium carboxymethyl cellulose, sodium ethyl cellulose, cellulose acetate, etc.), gelatin, talc, solid lubricants (such as stearic acid, magnesium stearate), calcium sulfate, vegetable oils (such as soybean oil, sesame oil, peanut oil, olive oil, etc.), polyols (such as propylene glycol, glycerol, mannitol, sorbitol, etc.), emulsifiers (such as Tween®), wetting agent (such as sodium dodecyl sulfate), coloring agents, flavoring agents, stabilizers, antioxidants, preservatives, pyrogen-free water, etc.

The pharmaceutical composition is an injection, a capsule, a tablet, a pill, a powder, or a granule.

The methods of administration of the compounds or pharmaceutical compositions of the present invention are not particularly limited, and representative methods of administration include, but are not limited to, oral, rectal, parenteral (intravenous, intramuscular or subcutaneous), and topical administration.

Solid dosage forms for oral administration include capsules, tablets, pills, powders and granules. In these solid dosage forms, the active ingredient is mixed with at least one conventional inert excipient (or carrier), such as sodium citrate or dicalcium phosphate, or mixed with any of the following components: (a) fillers or compatibilizer, for example, starch, lactose, sucrose, glucose, mannitol and silicic acid; (b) binders, for example, hydroxymethyl cellulose, alginate, gelatin, polyvinylpyrrolidone, sucrose and arabic gum; (c) humectants, such as, glycerol; (d) disintegrating agents such as agar, calcium carbonate, potato starch or tapioca starch, alginic acid, certain composite silicates, and sodium carbonate; (e) retarding solvents, for example, wax, (f) absorption accelerators, for example, quaternary ammonium compound; (g) wetting agents, for example, cetyl alcohol and glyceryl monostearate; (h) adsorbents, for example, kaolin; and (i) lubricants, for example, talc, calcium stearate, magnesium stearate, solid polyethylene glycol, sodium dodecyl sulfate or mixture thereof. In capsules, tablets and pills, the dosage forms may also contain buffering agents.

Solid dosage forms such as tablets, dragees, capsules, pills and granules can be prepared with coatings and shells such as enteric coatings and other materials known in the art. They may contain opacifying agents and the release of the active compound or compound in such compositions may be released in a portion of the digestive tract in a delayed manner. Examples of embedding components that can be employed are polymeric materials and waxy materials. If necessary, the active compound may also be in microencapsulated form with one or more of the above-mentioned excipients.

Liquid dosage forms for oral administration include pharmaceutically acceptable emulsions, solutions, suspensions, syrups or tinctures. In addition to the active compound, the liquid dosage form may contain inert diluents conventionally used in the art, such as water or other solvents, solubilizers and emulsifiers, for example, ethanol, isopropanol, ethyl carbonate, ethyl acetate, propylene glycol, 1,3-butanediol, dimethylformamide and oils, especially cottonseed oil, peanut oil, corn germ oil, olive oil, castor oil and sesame oil or mixtures of these substances.

In addition to these inert diluents, the compositions may contain adjuvants such as wetting agents, emulsifying and suspending agents, sweetening agents, flavoring agents and spices.

In addition to the active compound, the suspension may contain suspending agent, for example, ethoxylated isooctadecanol, polyoxyethylene sorbitol and dehydrated sorbitan ester, microcrystalline cellulose, aluminum methoxide and agar, or the mixture thereof etc.

The compositions for parenteral injection may comprise physiologically acceptable sterile aqueous or anhydrous solutions, dispersions, suspensions or emulsions, and sterile powders which can be re-dissolved into sterile injectable solutions or dispersions. Suitable aqueous and non-aqueous carriers, diluents, solvents or excipients include water, ethanol, polyols and any suitable mixtures thereof.

Dosage forms for the compounds of the invention for topical administration include ointments, powders, patches, sprays and inhalants. The active ingredient is mixed under sterile conditions with a physiologically acceptable carrier and any preservatives, buffers, or propellants which may be required if necessary.

The compounds of the invention can be administered alone or in combination with other pharmaceutically acceptable compounds.

The treatment method of the present invention can be administered alone or in combination with other treatment means or therapeutic drugs.

When the pharmaceutical composition is used, a safe and effective amount of the compound of the present invention is applied to a mammal in need of treatment (such as a human), wherein the dosage at the time of administration is the pharmaceutically effective dosage, for people having a body weight of 60 kg, the daily dose is usually 0.1~2000 mg, preferably 0.1~500 mg. Of course, specific doses should also consider factors such as the administration route, the health of the patient, etc., which are all within the skill of the skilled physician.

Indications

The compounds of the present invention have extremely high activity and selectivity to TLR8, so the compounds of the present invention and the pharmaceutical compositions containing the compounds of the present invention as the main active ingredient can be used to treat, prevent and alleviate related diseases. According to the prior art, the compounds of the present invention can be used to treat (but not limited to) autoimmunity, inflammation, allergies, asthma, graft rejection, graft-versus-host diseases, infections, tumors, and immunodeficiency, etc.

Compared with the prior art, the present invention has the following main advantages:
1) The compound has significantly higher activity and selectivity to TLR8.
2) The compound has higher activity, better selectivity, better in vivo efficacy, better safety, better pharmacokinetics and better drugability.
3) The present invention also provides a pharmaceutical composition containing the compound and the use of the compound or composition in the field of anti-tumor, anti-virus, anti-infection, autoimmune and other diseases.

The present invention will be further illustrated below with reference to the specific examples. It should be understood that these examples are only to illustrate the invention but not to limit the scope of the invention. Experimental methods in which the specific conditions are not specified in the following examples are usually in accordance with conventional conditions such as the conditions described in Sambrook et al., Molecular Cloning: Laboratory Manual (New York: Cold Spring Harbor Laboratory Press, 1989), or in accordance with the conditions recommended by the manufacturer. Unless indicated otherwise, parts and percentage are calculated by weight.

Unless otherwise defined, all professional and scientific terminology used in the text have the same meanings as known to the skilled in the art. In addition, any methods and materials similar or equal with the record content can apply to the methods of the invention. The method of the preferred embodiment described herein and the material are only for demonstration purposes.

Example 1 Preparation of Compound A

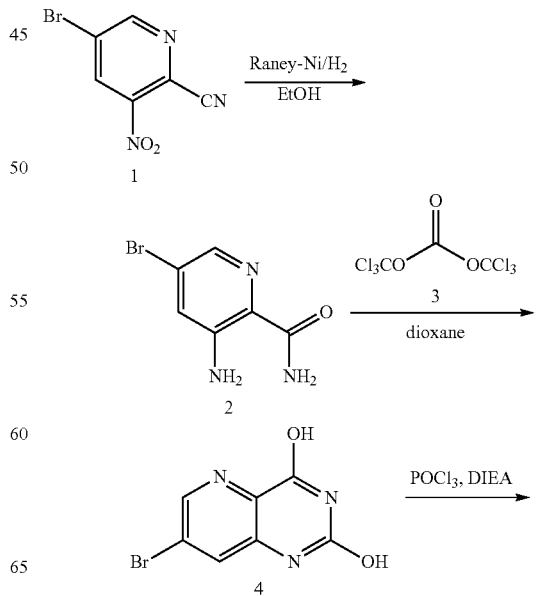

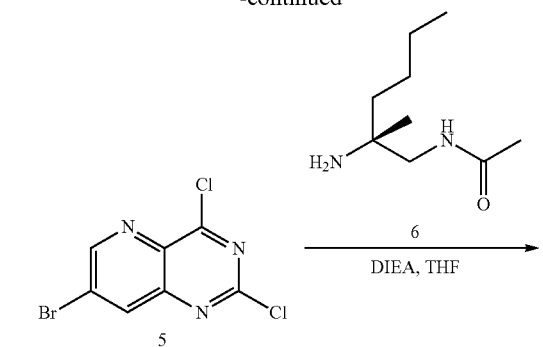

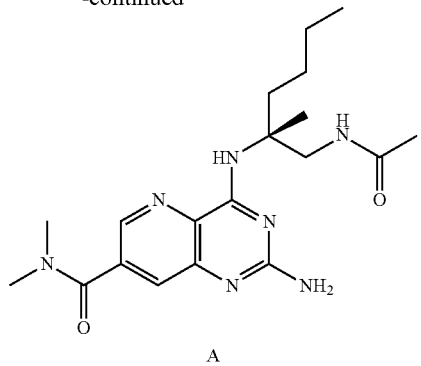

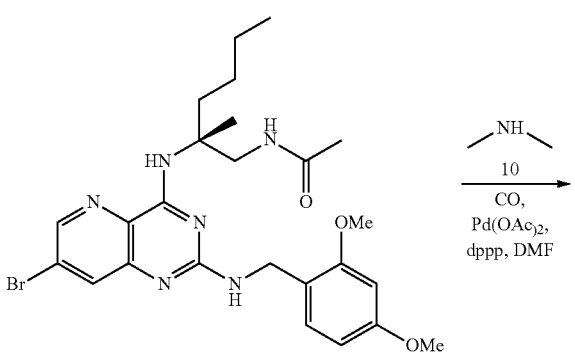

Step 1. Compound 2

1.5 g of Raney nickel was added to anhydrous ethanol (50 mL), then compound 1 (3.0 g, 13 mmol) was added, the air in the system was replaced with hydrogen, and the reaction was stirred at room temperature for 30 hours under a hydrogen atmosphere (hydrogen balloon). After replacing hydrogen in the system with air, the reaction solution was filtered, and the filtrate was concentrated and purified by silica gel column chromatography (developing agent: petroleum ether/ethyl acetate=10/1) to obtain compound 2 (yellow solid, 1.3 g, yield 46%).

LCMS: $[M+H]^+=216.0$, $[M+H]^+=218.0$.

Step 2. Compound 4

Compound 2 (800 mg, 3.7 mmol) and triphosgene (1.1 g, 3.7 mmol) were dissolved in 1,4-dioxane (10 mL), the reaction solution was heated to 100° C. and stirred for 2 hours. After the reaction solution was cooled to room temperature, a yellow solid was obtained by filtration and washed with 1,4-dioxane to obtain compound 4 (yellow solid, 870 mg, yield 97%).

LCMS: $[M+H]^+=242.0$, $[M+H]^+=243.9$.

Step 3. Compound 5

Compound 4 (500 mg, 2.08 mmol) was dissolved in phosphorus oxychloride (10 mL), N,N-diisopropylethylamine (DIEA, 538 mg, 4.16 mmol) was added, the reaction solution was heated to 130° C. and stirred for 3 hours. The reaction solution was cooled to room temperature, concentrated, ice water was added, extracted with ethyl acetate (3×100 mL), the organic phase was washed with saturated sodium chloride solution (100 mL), dried over anhydrous sodium sulfate, concentrated the organic phase and purified with silica gel column chromatography (developing agent: petroleum ether/ethyl acetate=3/1) to obtain compound 5 (yellow solid, 522 mg, yield 91%).

LCMS: $[M+H]^+=277.9$, $[M+H]^+=279.9$, $[M+H]^+=281.9$, $[M+H]^+=283.9$.

Step 4. Compound 7

Compound 5 (100 mg, 0.36 mmol), compound 6 (123 mg, 0.72 mmol, referring patent WO2018233648) and DIEA (231 mg, 1.79 mmol) were dissolved in tetrahydrofuran (5 mL), the reaction solution was heated to 40° C. and stirred for 16 hours. After the reaction solution was cooled to room temperature, ethyl acetate (30 mL) was added, the obtained solution was washed with water (30 mL) and saturated sodium chloride solution (2×30 mL) respectively, the organic phase was dried over anhydrous sodium sulfate, concentrated, and purified by silica gel column chromatography (developing agent: dichloromethane/methanol=20/1) to obtain compound 7 (yellow oil, 100 mg, yield 67%).

LCMS: $[M+H]^+=414.1$, $[M+H]^+=416.0$.

Step 5. Compound 9

Compound 7 (100 mg, 0.24 mmol) was dissolved in 2,4-dimethoxybenzamine (1 mL), heated to 100° C. and stirred for 2 hours. The reaction solution was purified by silica gel column chromatography (developing agent: dichloromethane/methanol=10/1) to obtain compound 9 (yellow oil, 60 mg, yield 46%).

LCMS: [M+H]$^+$=545.2, [M+H]$^+$=547.2.

Step 6. Compound 11

Compound 9 (600 mg, 1.10 mmol) was dissolved in DMF (20 mL), and then DPPP (227 mg, 0.55 mmol), palladium acetate (123 mg, 0.55 mmol) and a solution of compound 10 in THF (2M, 2.5 mL, 5 mmol) were sequentially added. The air in the reaction solution was replaced three times with carbon monoxide, the reaction solution was heated to 80° C. under a carbon monoxide atmosphere and stirred for 16 hours, then the temperature was raised to 120° C. and stirred for 8 hours. After cooling to room temperature, the reaction solution was diluted with ethyl acetate (300 mL), the organic phase was washed with water (100 mL) and saturated sodium chloride solution (100 mL) sequentially, dried over anhydrous sodium sulfate, concentrated the organic phase and purified by silica gel column chromatography (developing agent: dichloromethane/methanol=100/3) to obtain compound 11 (200 mg, yield 34%).

LCMS: [M+H]$^+$=538.4.

Step 7. Compound A

Compound 11 (390 mg, 0.72 mmol) was dissolved in dichloromethane (20 mL), then trifluoroacetic acid (4 mL) was added, and the reaction solution was stirred at room temperature for 2 hours. The reaction solution was concentrated to remove trifluoroacetic acid, the residue was dissolved with ethyl acetate (200 mL), and the organic phase was washed with saturated sodium bicarbonate aqueous solution (100 mL) and saturated sodium chloride solution (100 mL) sequentially, dried over anhydrous sodium sulfate. The organic phase was concentrated and purified by silica gel column chromatography (developing agent: dichloromethane/ethyl acetate/methanol=5/5/1) to obtain compound A (yellow solid, 133.8 mg, yield 49%).

LCMS: [M+H]$^+$=388.3

$^1$H NMR (400 MHz, CDCl$_3$) δ 8.41 (d, J=2.0 Hz, 1H), 7.66 (d, J=2.0 Hz, 1H), 7.19 (br s, 1H), 6.61 (br s, 1H), 5.19 (br s, 2H), 3.84-3.69 (m, 2H), 3.16 (s, 3H), 3.02 (s, 3H), 2.10-2.06 (m, 1H), 2.00 (s, 3H), 1.75-1.65 (m, 1H), 1.46 (s, 3H), 1.42-1.24 (m, 4H), 0.90 (t, J=7.2 Hz, 3H).

Example 2 Preparation of Compound B

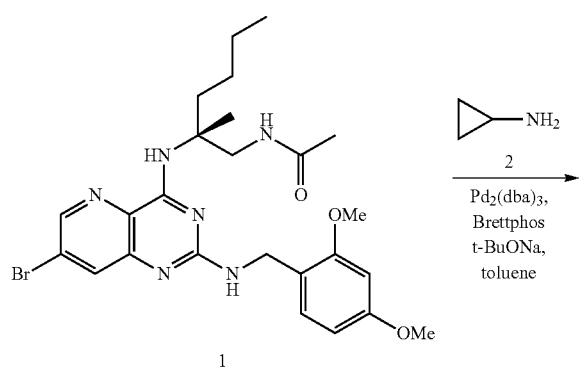

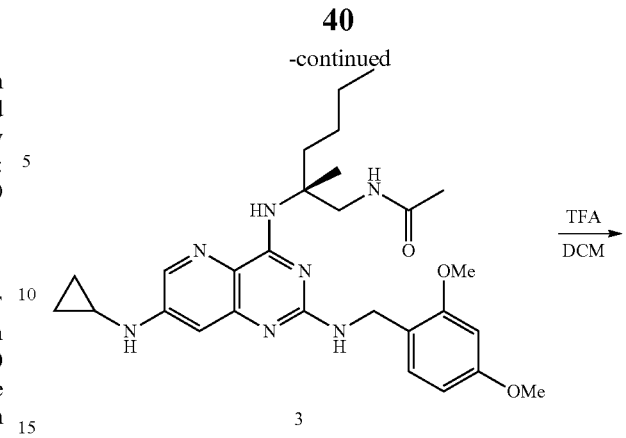

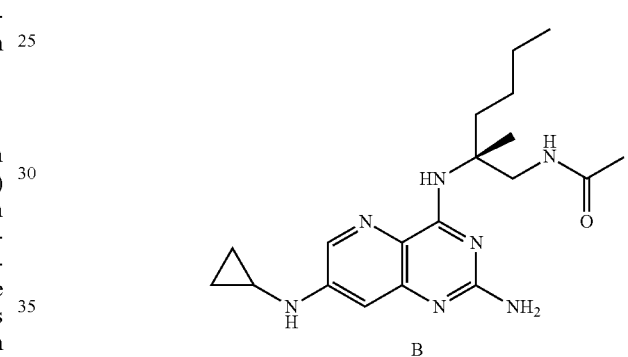

Step 1. Compound 3

Compound 1 (50 mg, 0.092 mmol), compound 2 (52 mg, 0.092 mmol), Pd$_2$(dba)$_3$ (17 mg, 0.018 mmol), BrettPhos (10 mg, 0.018 mmol) and sodium tert-butoxide (26 mg, 0.276 mmol) were added to 5 mL of toluene at room temperature. After replacing with nitrogen, the temperature was raised to 80° C. to react for 18 hours. After concentration of the reaction solution, the reaction solution was purified by silica gel column chromatography (developing agent: dichloromethane/methanol=100/5) to obtain compound 3 (25 mg, 52%) as a light yellow oil.

LCMS: [M+H]$^+$=522.3.

Step 2. Compound B

Compound 3 (25 mg, 0.048 mmol) was dissolved in dichloromethane (2 mL), trifluoroacetic acid (1 mL) was added, and stirred at room temperature for 1 hour. The reaction solution was concentrated and purified by reversed-phase column chromatography (0.05% formic acid/acetonitrile/water) to obtain compound B (11.2 mg, yield 63%) as a white solid.

LCMS: [M+H]$^+$=372.3

$^1$H NMR (400 MHz, MeOD) δ 8.54 (s, 1H), 8.03 (d, J=2.2 Hz, 1H), 6.84 (d, J=2.3 Hz, 1H), 3.90 (d, J=13.8 Hz, 1H), 3.55 (d, J=13.8 Hz, 1H), 2.49 (td, J=6.5, 3.4 Hz, 1H), 2.19-2.10 (m, 1H), 1.96-1.79 (m, 4H), 1.50-1.27 (m, 7H), 0.88 (ddd, J=11.4, 10.0, 5.8 Hz, 5H), 0.57-0.49 (m, 2H).

Example 3 Preparation of Compound C

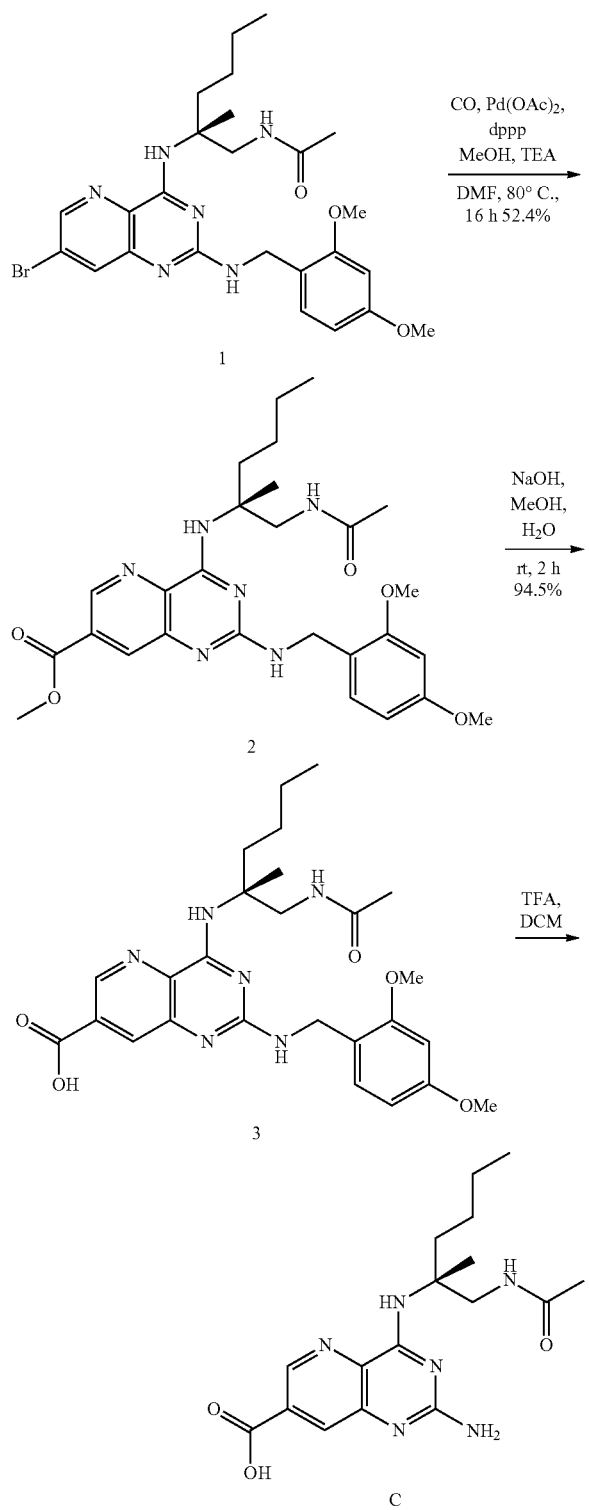

Step 1. Compound 2

Compound 1 (50 mg, 0.092 mmol, 1.0 eq) was dissolved in DMF/methanol (4 mL/1 mL), then palladium acetate (5 mg, 0.018 mmol, 0.2 eq), 1,3-bis(diphenylphosphine) propane (10 mg, 0.018 mmol, 0.2 eq) and triethylamine (40 mg, 0.368 mmol, 4 eq) were added sequentially. The reaction solution was heated to 80° C. under a carbon monoxide atmosphere of 1 atmosphere and reacted for 16 hours. After cooling to room temperature, the reaction solution was poured into water (40 mL) and then extracted with ethyl acetate (20 mL×2). The organic phases were combined and washed with saturated brine, dried over anhydrous sodium sulfate, and the crude product obtained after concentration was purified by preparative thin layer chromatography to obtain compound 2 (25 mg, 52.4%).

LCMS: [M+H]⁺=525.2

Step 2. Compound 3

Compound 2 (25 mg, 0.048 mmol, 1 eq) was dissolved in methanol (2 mL), and then sodium hydroxide aqueous solution (2 M, 1 mL) was added. The reaction solution was stirred at room temperature for 2 hours, then the pH value was adjusted to be 5-6 with 2 M aqueous hydrochloric acid solution, extracted with ethyl acetate (10 mL×2). The organic phases were combined and washed with saturated brine, dried over anhydrous sodium sulfate, and the crude product obtained after concentration was purified by preparative thin layer chromatography to obtain compound 3 (23 mg, 94.5%).

LCMS: [M+H]⁺=511.3

Step 3. Compound C

Compound 3 (30 mg, 0.059 mmol) was dissolved in DCM (2 mL), then trifluoroacetic acid (1 mL) was added, and reacted at room temperature for 2 hours. After the reaction was completed, the reaction solution was concentrated, the residue was purified by pre-HPLC (0.05% formic acid/acetonitrile/water) to obtain compound C (4.3 mg, 20%) as a white solid.

LCMS: [M+H]⁺=361.2

¹H NMR (400 MHz, CD₃OD) δ 8.86 (s, 1H), 8.70-8.24 (m, 2H), 4.50-3.71 (m, 2H), 2.67-2.11 (m, 1H), 1.99 (s, 3H), 1.89-1.80 (m, 1H), 1.71-1.35 (m, 7H), 1.05-0.89 (m, 3H).

Example 4 Preparation of Compound D

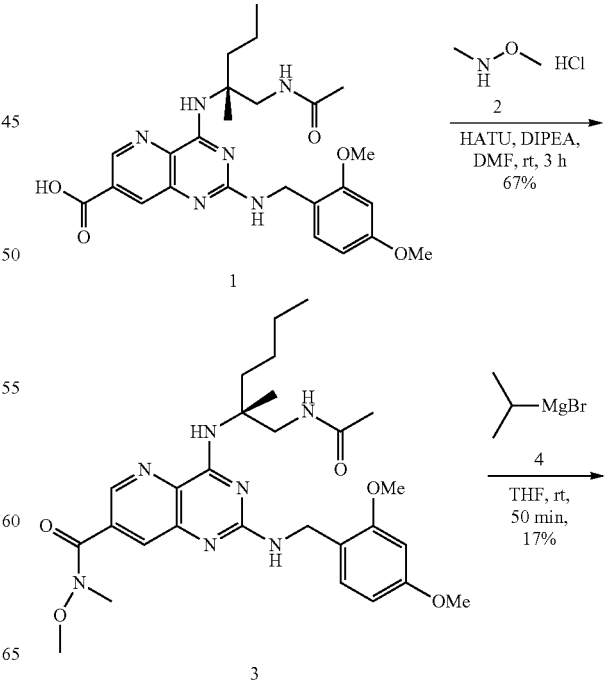

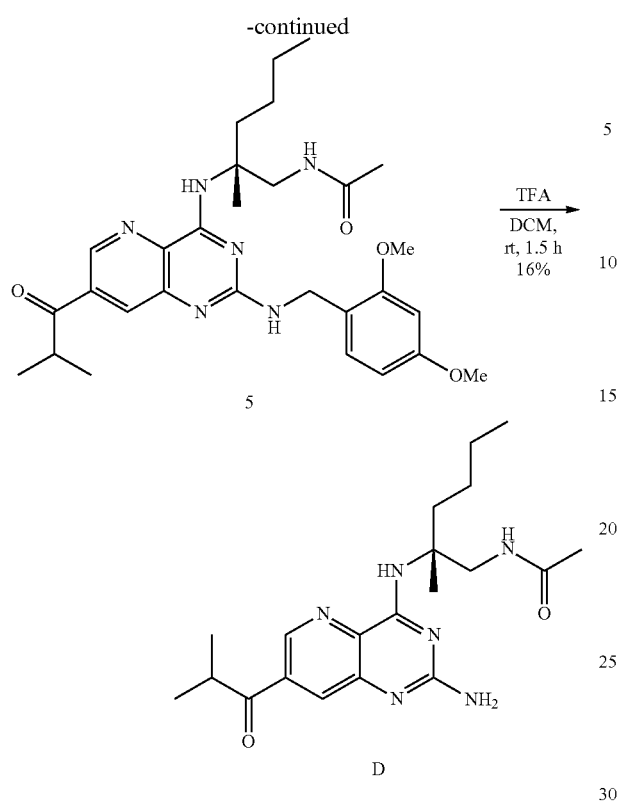

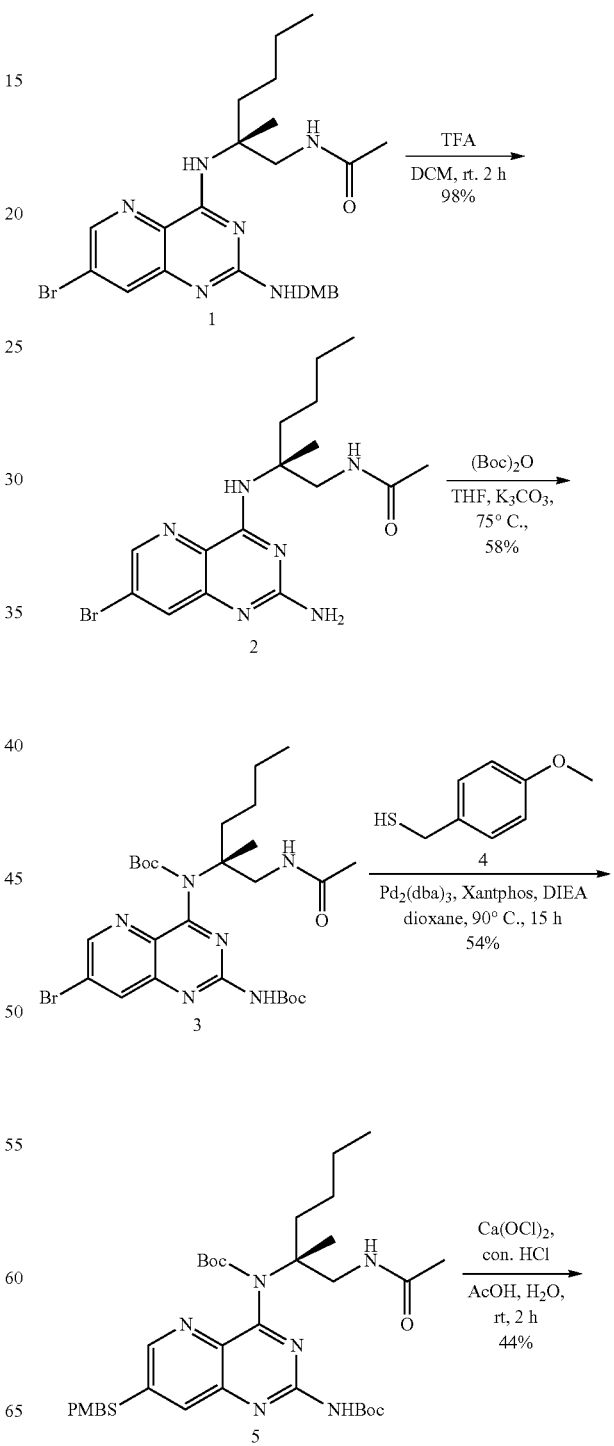

$^1$H NMR (400 MHz, CDCl$_3$) δ 8.89 (d, J=2.0 Hz, 1H), 8.17 (d, J=2.0 Hz, 1H), 7.52 (s, 1H), 6.35 (s, 1H), 3.87 (dd, J=14.0, 5.6 Hz, 1H), 3.68 (dd, J=14.0, 6.0 Hz, 1H), 3.55-3.50 (m, 1H), 2.11-2.05 (m, 1H), 2.01 (s, 3H), 1.77 (s, 1H), 1.49 (s, 3H), 1.40-1.29 (m, 4H), 1.25 (d, J=6.8 Hz, 6H), 0.90 (t, J=7.0 Hz, 3H).

Example 5 Preparation of Compound E

Step 1. Compound 3

Compound 1 (260 mg, 0.509 mmol, 1.0 eq) was dissolved in DMF (7 mL), then compound 2 (124 mg, 1.273 mmol, 2.5 eq), HATU (290 mg, 0.763 mmol, 1.5 eq) and DIEA (394 mg, 3.055 mmol, 6.0 eq) were sequentially added, and the reaction solution was stirred at room temperature for 3 hours. The reaction solution was diluted with ethyl acetate (50 mL), then washed with water and saturated brine sequentially, dried over anhydrous sodium sulfate and concentrated, and the residue was purified by silica gel preparative plate (dichloromethane/methanol=10/1) to obtain compound 3 (190 mg, 67%) as a brown solid.

LCMS: [M+H]$^+$=554.3.

Step 2. Compound 5

Compound 3 (118 mg, 0.213 mmol, 1.0 eq) was dissolved in tetrahydrofuran (8 mL), compound 4 (1 M, 2.13 mL, 2.13 mmol, 10.0 eq) was added at room temperature, and the reaction solution was stirred at room temperature for 50 minutes. The reaction solution was poured into a saturated aqueous ammonium chloride solution and then extracted with ethyl acetate (3×20 mL). The organic phases were combined and washed with saturated brine, dried over anhydrous sodium sulfate and concentrated, and the residue was purified by silica gel preparative plate (dichloromethane/methanol=10/1) to obtain compound 5 (20 mg, 17%) as a yellow solid.

LCMS: [M+H]$^+$=537.3.

Step 3. Compound D

Compound 5 (20 mg, 0.0372 mmol, 1.0 eq) was dissolved in dichloromethane (0.5 mL), then trifluoroacetic acid (1.5 mL) was added, and the reaction solution was stirred at room temperature for 1.5 hours. The reaction solution was concentrated, and the residue was purified by pre-HPLC (0.1% formic acid/acetonitrile/water) to obtain compound D (2.3 mg, 16%) as a yellow solid.

LCMS: [M+H]$^+$=387.3

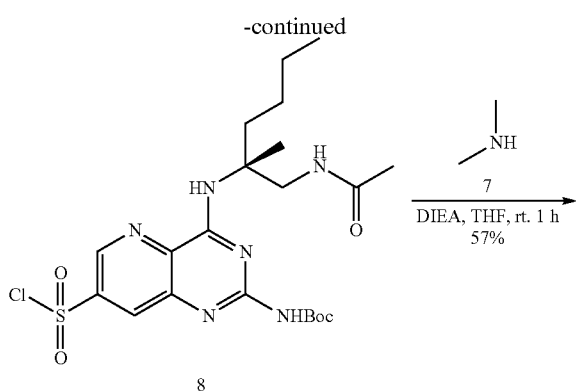

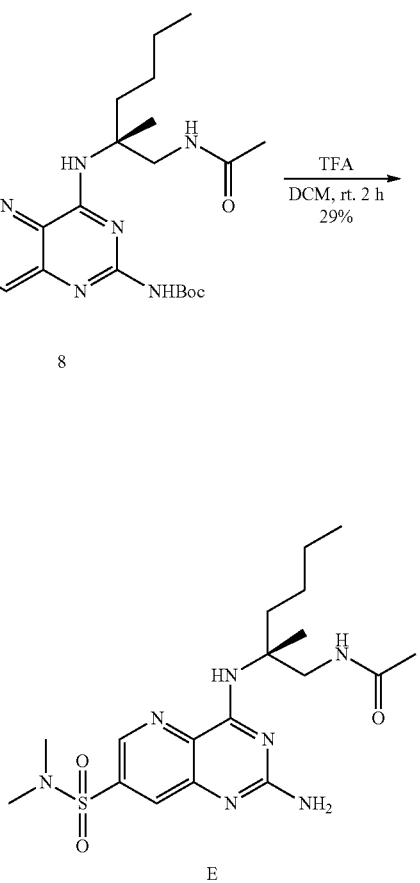

Step 1. Compound 2

Compound 1 (400 mg, 0.78 mmol, 1.0 eq) was dissolved in DCM (10 mL), then trifluoroacetic acid (5 mL) was added, and stirred at room temperature for 2 hours, after the reaction was completed, concentrated, pH was adjusted to be >7 with sodium bicarbonate solution, extracted with ethyl acetate, and the organic phase was dried over anhydrous sodium sulfate and concentrated to obtain compound 2 (300 mg, 98%) as a yellow solid.

LCMS: $[M+H]^+=395.1$.

Step 2. Compound 3

Compound 2 (300 mg, 0.76 mmol, 1.0 eq), (BOC)$_2$O (497 mg, 2.28 mmol, 3.0 eq) and potassium carbonate (315 mg, 2.28 mmol, 3.0 eq) were dissolved in tetrahydrofuran (30 mL), then heated to 75° C. to react for 18 hours. The reaction solution was concentrated after the reaction was completed, the residue was purified by silica gel column chromatography (ethyl acetate/petroleum ether=70/30) to obtain compound 3 (260 mg, 58%) as a yellow solid.

LCMS: $[M+H]^+=595.1$.

Step 3. Compound 5

Compound 3 (260 mg, 0.44 mmol, 1.0 eq), Pd$_2$(dba)$_3$ (40 mg, 0.044 mmol, 0.1 eq), XantPhos(25 mg, 0.044 mmol, 0.1 eq), DIPEA (170 mg, 1.32 mmol, 3.0 eq) and compound 4 (101 mg, 0.66 mmol, 1.5 eq) were dissolved in dioxane (15 mL), replaced with nitrogen, then the temperature was raised to 90° C. to react for 15 hours. The reaction solution was concentrated after the reaction was completed, and the residue was purified by silica gel column chromatography (ethyl acetate/petroleum ether=2/1) to obtain compound 5 (160 mg, 54%) as a yellow solid.

LCMS: $[M+H]^+=669.1$

Step 4. Compound 6

Compound 5 (150 mg, 0.22 mmol, 1.0 eq) was dissolved in acetic acid (5 mL) and water (1.5 mL), replaced with nitrogen, then sufficient chlorine gas (20 mL concentrated hydrochloric acid was added dropwise to 20 g of calcium hypochlorite to generate chlorine gas) was introduced, stirred at room temperature for 2 hours, quenched with ice water after the reaction was completed, pH was adjusted to be >7 with saturated sodium bicarbonate solution, extracted with ethyl acetate, the organic phase was dried over anhydrous sodium sulfate, concentrated to obtain crude compound 6 (50 mg, 44%) as a yellow solid, which was directly used in the next step.

LCMS: $[M+H]^+=515.0$

Step 5. Compound 8

Compound 6 (50 mg, 0.1 mmol, 1.0 eq) and DIEA (39 mg, 0.3 mmol, 3.0 eq) were dissolved in tetrahydrofuran (5 mL), then compound 7 (2 M in tetrahydrofuran solution, 0.5 mL, 1 mmol, 10.0 eq) was added and stirred at room temperature for 1 hour.

The reaction was completed and quenched with water, extracted with ethyl acetate, the organic phase was dried over anhydrous sodium sulfate and concentrated, and the residue was purified by silica gel column chromatography (dichloromethane/methanol=10/1) to obtain compound 8 (30 mg, 54%) as a yellow solid.

LCMS: $[M+H]^+=524.1$

Step 6. Compound E

Compound 8 (30 mg, 0.06 mmol, 1.0 eq) was dissolved in trifluoroacetic acid (3 mL) and dichloromethane (3 mL) and reacted at room temperature for 2 hours. After the reaction was completed, the reaction solution was concentrated, and the residue was purified by pre-HPLC (0.05% formic acid/acetonitrile/water) to obtain compound E (7.3 mg, 29%) as a white solid.

LCMS: $[M+H]^+=424.2$

1H NMR (400 MHz, CD$_3$OD) δ 8.66 (d, J=2.0 Hz, 1H), 7.93 (d, J=2.0 Hz, 1H), 3.95-3.92 (m, 1H), 3.61-3.58 (m, 1H), 2.78 (s, 6H), 2.23-2.17 (m, 1H), 1.95 (s, 3H), 1.87-1.80 (m, 1H), 1.49 (s, 3H), 1.37-1.31 (m, 4H), 0.92-0.89 (m, 3H).

Example 6 Preparation of Compound F
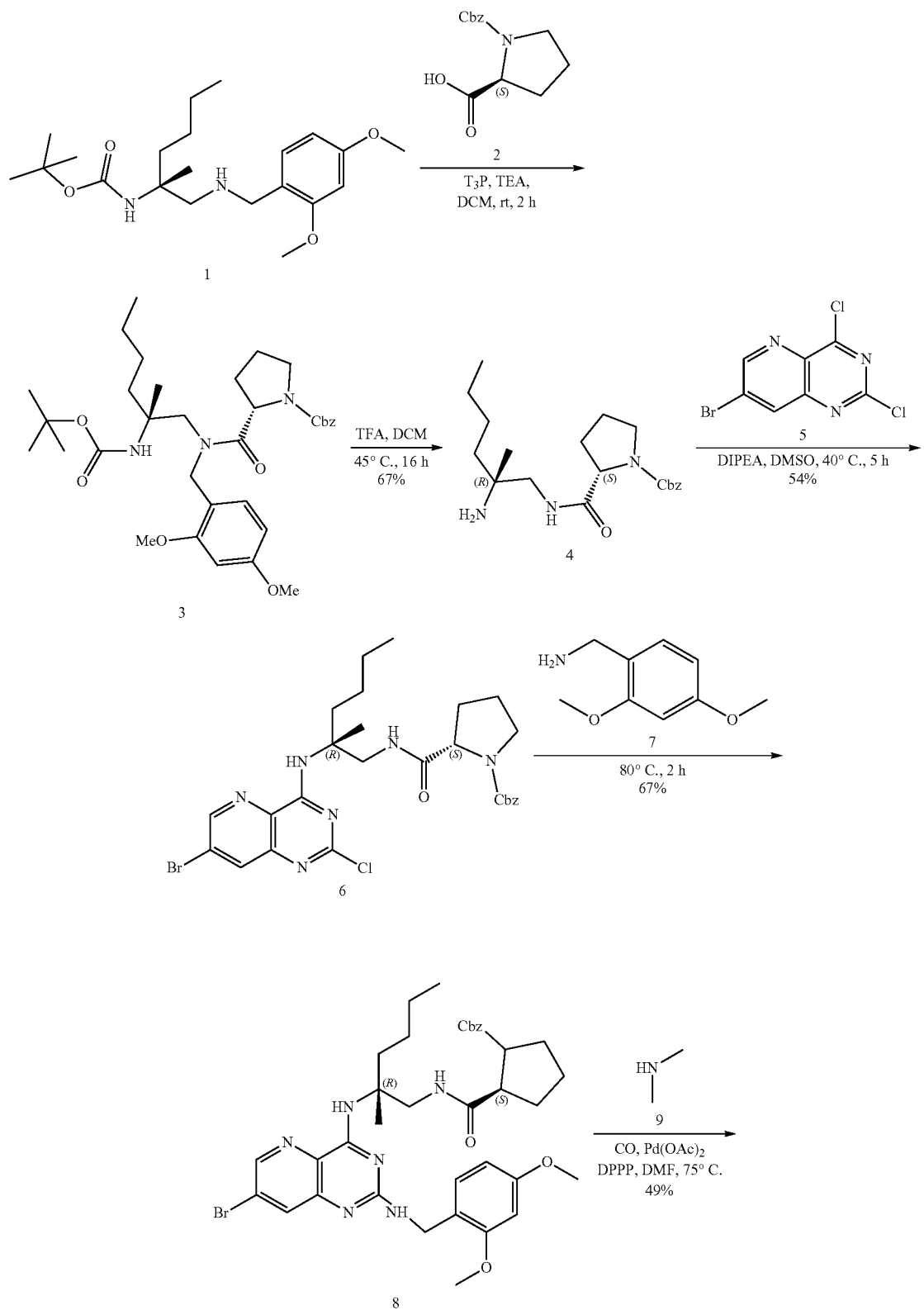

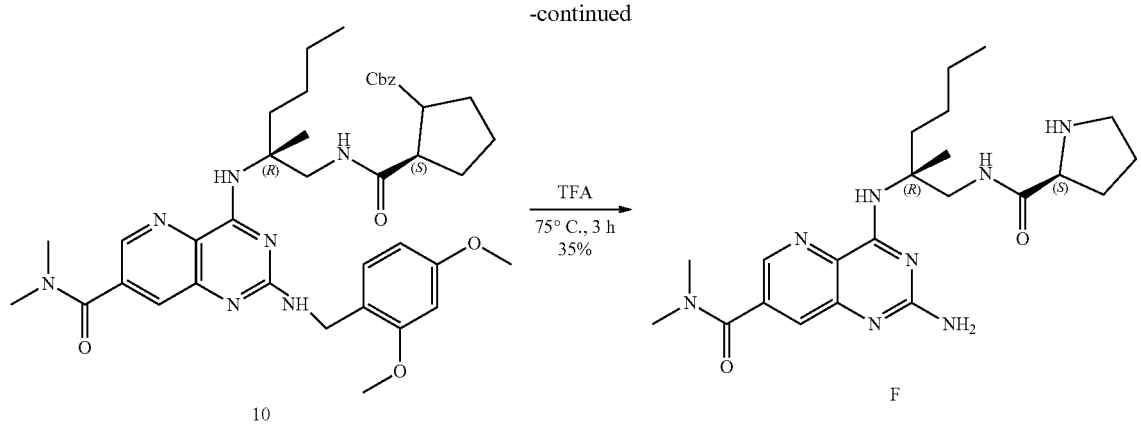

Step 1. Compound 3

Compound 1 (2 g, 5.3 mmol, 1.0 eq) was dissolved in DCM (30 mL), and then triethylamine (2.7 g, 26.3 mmol, 5.0 eq), compound 2 (1.44 g, 5.8 mmol, 1.1 eq) and 1-propyl phosphate anhydride (5 g, 15.8 mmol, 3.0 eq) were added. The reaction solution was stirred at room temperature for 2 hours. The reaction solution was concentrated, and the residue was purified by silica gel column chromatography (petroleum ether/ethyl acetate=3/1) to obtain compound 3 (2.4 g, 75%) as a brown oil.

LCMS: [M+Na]$^+$=634.3

Step 2. Compound 4

Compound 3 (0.5 g, 0.82 mmol, 1.0 eq) was dissolved in a mixture of dichloromethane (2.0 mL) and trifluoroacetic acid (2.0 mL), and the reaction solution was stirred at 45° C. for 16 hours. Cooled to room temperature, saturated sodium bicarbonate solution was added to the reaction solution to adjust pH to be 7-8, and the aqueous phase was extracted with dichloromethane (20×3 mL). The organic phases were combined and dried over anhydrous sodium sulfate, and the residue obtained after concentration was purified by silica gel column chromatography (dichloromethane/methanol=50:1-10:1) to obtain compound 4 (200 mg, 67%) as a white solid.

LCMS: [M+H]$^+$=362.2.

Step 3. Compound 6

Compound 4 (200 mg, 0.55 mmol, 1.0 eq) was dissolved in dimethyl sulfoxide (5 mL), and then compound 5 (462 mg, 1.66 mmol, 3 eq) and DIPEA (214 mg, 1.66 mmol, 3 eq) were sequentially added. The reaction solution was reacted at 40° C. for 5 hours. Cooled to room temperature, 50 ml of water was added, and the reaction solution was extracted with ethyl acetate (3×15 mL). The organic phases were combined and dried over anhydrous sodium sulfate, and the residue obtained after concentration was purified by silica gel column chromatography (petroleum ether/ethyl acetate=20/1-2/1) to obtain compound 6 (180 mg, 54%) as a white solid.

LCMS: [M+H]$^+$=603.1

Step 4. Compound 8

Compound 6 (180 mg, 0.29 mmol, 1.0 eq) was dissolved in compound 7 (0.5 mL), and the reaction solution was heated to 80° C. under nitrogen protection and stirred for 2 hours. Cooled to room temperature, the reaction mixture was purified by silica gel column chromatography (dichloromethane/methanol=100/1) to obtain a crude product, and the crude product was purified by silica gel column chromatography (petroleum ether/ethyl acetate=100/1-1/1) again to obtain compound 8 (140 mg, 67%) as a white solid.

LCMS: [M+H]$^+$=734.2

Step 5. Compound 10

Compound 8 (34 mg, 0.1 mmol, 1.0 eq) was dissolved in DMF (10 mL), and then DPPP (42 mg, 0.1 mmol, 1.0 eq), palladium acetate (23 mg, 0.1 mmol, 1.0 eq) and a solution of compound 9 in THF (2 M, 2 mL, 4 mmol, 40 eq) were sequentially added. After replacing with carbon monoxide for three times, the mixture was heated to 75° C. under a carbon monoxide atmosphere and stirred for 16 hours. After cooling to room temperature, the reaction solution was diluted with ethyl acetate (100 mL), washed with water and saturated brine, dried over anhydrous sodium sulfate and concentrated. The residue was separated and purified by silica gel column chromatography (EA:MeOH=30:1) to obtain compound 10 (36 mg, 39%).

LCMS: [M+H]$^+$=727.4

Step 6. Compound F

Compound 10 (34 mg, 0.046 mmol, 1.0 eq) was dissolved in trifluoroacetic acid (3 mL) at room temperature. The reaction solution was stirred at 75° C. for 3 hours. The reaction solution was concentrated to remove trifluoroacetic acid, the residue was dissolved with ethyl acetate (200 mL), the organic phase was washed with saturated sodium bicarbonate aqueous solution and saturated brine sequentially, and dried over anhydrous sodium sulfate and concentrated. The crude product was purified by pre-HPLC (0.05% formic acid/acetonitrile/water) to obtain F (7.1 mg, 35%) as a yellow solid.

LCMS: [M+H]$^+$=443.3

$^1$H NMR (400 MHz, MeOD) δ 8.40 (s, 1H), 7.65 (s, 1H), 4.24-4.15 (m, 1H), 4.00 (d, J=13.7 Hz, 1H), 3.84 (d, J=13.7 Hz, 1H), 3.30-3.21 (m, 2H), 3.15 (s, 3H), 3.04 (s, 3H), 2.40-2.20 (m, 2H), 1.96 (br s, 3H), 1.80-1.65 (m, 1H), 1.48 (s, 3H), 1.43-1.22 (m, 4H), 0.91 (t, J=7.2 Hz, 3H).

Example 7 Preparation of Compound G

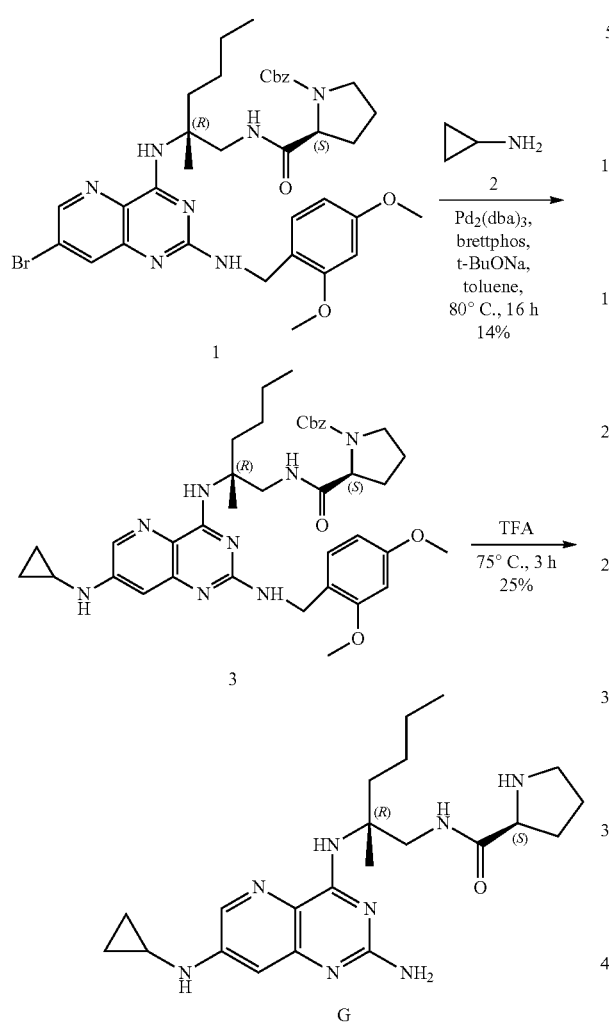

Step 1. Compound 3

Compound 1 (75 mg, 0.1 mmol, 1 eq), compound 2 (30 mg, 0.5 mmol, 5 eq), Pd$_2$(dba)$_3$ (27 mg, 0.05 mmol, 0.5 eq), BrettPhos (46 mg, 0.05 mmol, 0.5 eq) and sodium tert-butoxide (30 mg, 0.3 mmol, 3 eq) were added to toluene (10 mL) at room temperature, after replacing with nitrogen, the temperature was raised to 80° C. to react for 16 hours. After concentration of the reaction solution, the reaction solution was purified by silica gel column chromatography (dichloromethane/methanol=100/5) to obtain compound 3 (10 mg, 14%) as a pale yellow oil.

LCMS: [M+H]$^+$=711.1

Step 2. Compound G

Compound 3 (10 mg, 0.014 mmol, 1.0 eq) was dissolved in trifluoroacetic acid (2 mL), and the reaction solution was heated to 75° C. and reacted for 3 hours. After the reaction was completed, the reaction solution was concentrated firstly, then saturated sodium bicarbonate aqueous solution was added to adjust the pH to be >7, and then ethyl acetate (50 mL*3) was used for extraction. The organic phases were combined and dried over anhydrous sodium sulfate and concentrated. The residue was purified by pre-HPLC (0.1% FA/acetonitrile/water) to obtain compound G (1.5 mg, 25%) as a white solid.

LCMS: [M+H]$^+$=427.3

$^1$H NMR (400 MHz, CD$_3$OD) δ 8.54 (br s, 1H), 8.01 (s, 1H), 6.86 (s, 1H), 4.61 (s, 1H), 4.09-3.90 (m, 2H), 3.73 (d, J=13.6 Hz, 1H), 3.18-3.12 (m, 2H), 2.50 (s, 1H), 2.26-2.17 (m, 2H), 1.88-1.73 (m, 4H), 1.47-1.33 (m, 7H), 0.95-0.81 (m, 4H), 0.54 (s, 2H).

Example 8 Preparation of Compound H

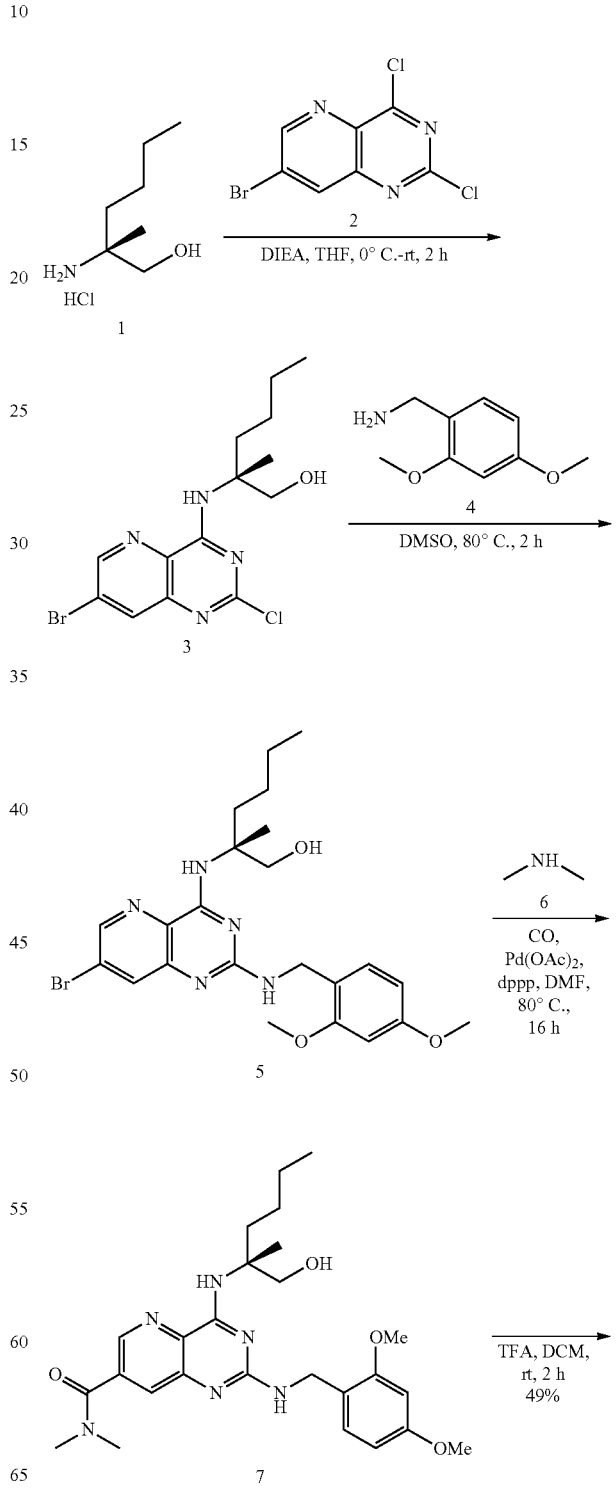

53
-continued

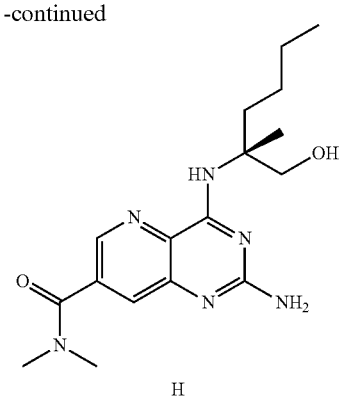

H

Step 1. Compound 3

Compound 1 (5.5 g, purity 55%, 18.37 mmol, 1.0 eq) was dissolved in tetrahydrofuran (100 mL), DIEA (11.87 g, 91.84 mmol, 5.0 eq) was added, and the reaction solution was stirred at room temperature for 0.5 h. A solution of compound 2 (5.12 g, 18.37 mmol, 1.1 eq) in tetrahydrofuran (100 mL) was added to the reaction solution, and then the reaction solution was stirred overnight at room temperature. The reaction solution was concentrated, and the obtained residue was purified by silica gel column chromatography (dichloromethane/methanol=20/1) to obtain compound 3 (4.2 g, 61%) as a yellow solid.

LCMS: [M+H]$^+$=375.0

Step 2. Compound 5

Compound 3 (4.2 g, 11.24 mmol, 1.0 eq) was dissolved in DMSO (20 mL), then compound 4 (15 g, 89.92 mmol, 8.0 eq) was added, and the reaction solution was stirred at 80° C. for 2 hours. After cooling to room temperature, water (80 mL) was added to the reaction solution, the pH value was adjusted to between 7 and 8 with citric acid aqueous solution (1M) and then extracted with EA (3×100 mL). The organic phases were combined and washed with saturated brine, dried over anhydrous sodium sulfate and concentrated. The obtained residue was purified by silica gel column chromatography (dichloromethane/methanol=10/1) to obtain compound 5 (3.52 g, 62%) as a yellow solid.

LCMS: [M+H]$^+$=504.2.

Step 3. Compound 7

Compound 5 (3.02 g, 5.99 mmol, 1.0 eq) was dissolved in DMF (50 mL), then DPPP (1.23 g, 3.0 mmol, 0.5 eq), palladium acetate (671 mg, 3.0 mmol, 0.5 eq) and a solution of compound 6 in THF (2 M, 48 mL, 96 mmol, 16 eq) were rapidly added. The system was replaced with carbon monoxide for three times and then heated to 80° C. under a carbon monoxide atmosphere of one atmosphere and stirred for 16 hours. The reaction solution was cooled to room temperature, diluted with ethyl acetate (300 mL), washed with water and saturated brine sequentially, dried over anhydrous sodium sulfate and concentrated. The obtained residue was separated and purified by silica gel column chromatography (DCM-DCM:MeOH=100:3) to obtain a crude product 7 (2.75 g, 92%).

LCMS: [M+H]$^+$=497.2

Step 4. Compound H

Compound 7 (2.66 g, 5.36 mmol, 1.0 eq) was dissolved in dichloromethane (20 mL) and then trifluoroacetic acid (20 mL) was added. The reaction solution was stirred at 25° C. for 2 hours. The reaction solution was concentrated, methanol was added, and then concentrated, and this operation was performed three times. The obtained residue was dissolved in ethyl acetate (300 mL), the obtained ethyl acetate solution was adjusted to pH 8 with Na$_2$CO$_3$ aqueous solution, the extracted organic phase was washed with saturated brine, and dried over anhydrous sodium sulfate and concentrated. The obtained crude product was purified by silica gel column chromatography (DCM to DCM:MeOH=10:1) to obtain compound H (1.07 g, 58%) as a pale yellow solid.

LCMS: [M+H]$^+$=347.1

$^1$H NMR (400 MHz, CDCl$_3$) δ 8.44 (s, 1H), 7.75 (s, 1H), 7.62 (s, 1H), 6.72 (br, 2H), 3.89-3.76 (m, 2H), 3.14 (s, 3H), 3.00 (s, 3H), 2.01-1.94 (m, 1H), 1.79-1.73 (m, 1H), 1.45 (s, 3H), 1.42-1.25 (m, 4H), 0.91 (t, J=7.2 Hz, 3H).

Example 9 Preparation of Compound I

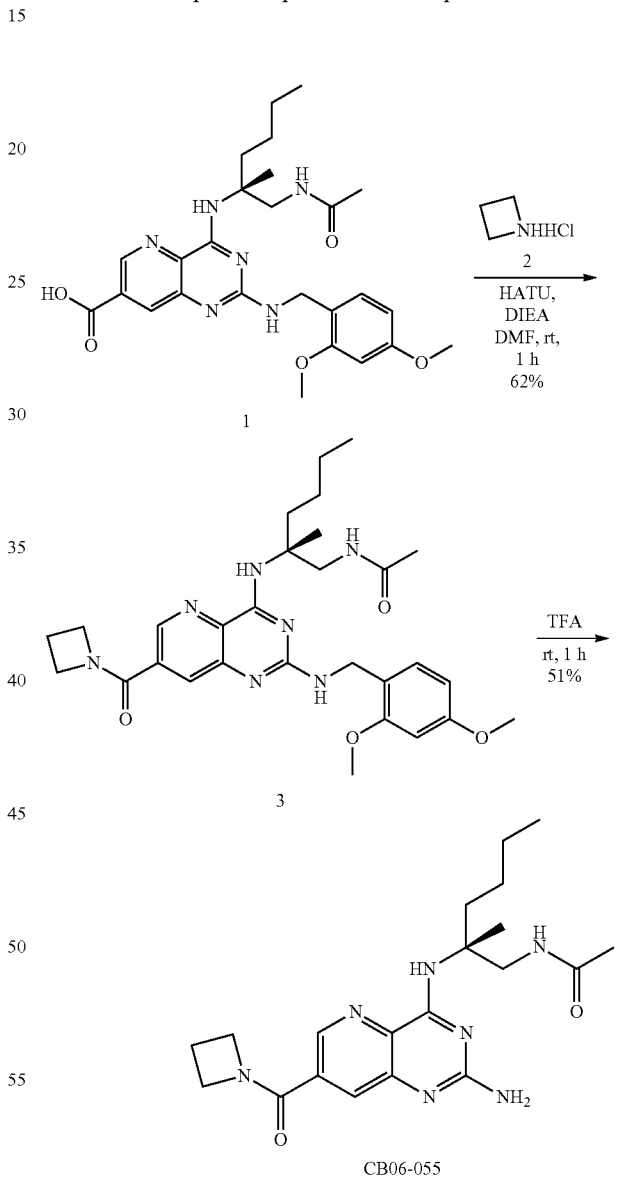

Step 1. Compound 3

Compound 1 (30 mg, 0.059 mmol, 1.0 eq) was dissolved in DMF (3 mL), and then HATU (34 mg, 0.09 mmol, 1.5 eq), DIEA (23 mg, 0.18 mmol, 3.0 eq) and compound 2 (7.2 mg, 0.076 mmol, 1.3 eq) were added to react at room temperature for 1 hour. The reaction solution was diluted with water and then extracted with ethyl acetate (50 mL*3). The organic phases were combined and washed with saturated brine, dried over anhydrous sodium sulfate and concentrated, and the residue was purified by silica gel column chromatography (dichloromethane/methanol=100/8) to obtain compound 3 (20 mg, 62%) as a yellow solid.

LCMS: [M+H]⁺=550.3

Step 2. Compound I

Compound 3 (20 mg, 0.036 mmol, 1.0 eq) was dissolved in trifluoroacetic acid (3 mL) and reacted at room temperature for 1 hour. After the reaction was completed, the reaction solution was concentrated, the residue was purified by pre-HPLC (0.05% FA/acetonitrile/water) to obtain compound I (7.3 mg, 51%) as a white solid.

LCMS: [M+H]⁺=400.3

¹H NMR (400 MHz, CD₃OD) δ 8.59 (d, J=2.0 Hz, 1H), 7.80 (d, J=2.0 Hz, 1H), 4.42 (t, J=7.6 Hz, 2H), 4.24 (t, J=7.6 Hz, 2H), 3.93 (d, J=13.6 Hz, 1H), 3.63 (d, J=13.6 Hz, 1H), 2.45-2.27 (m, 2H), 2.24-2.17 (m, 1H), 1.95 (s, 3H), 1.83-1.76 (m, 1H), 1.47 (s, 3H), 1.41-1.26 (m, 4H), 0.90 (t, J=6.8 Hz, 3H).

Example 10 Preparation of Compound J eq), DIEA (90 mg, 0.696 mmol, 11.8 eq) and compound 2 (38.6 mg, 0.352 mmol, 6.0 eq) were added to react at room temperature for 3 hours. The reaction solution was diluted with water and then extracted with ethyl acetate (50 mL*3). The organic phases were combined and washed with saturated brine, dried over anhydrous sodium sulfate and concentrated, and the residue was purified by silica gel column chromatography (dichloromethane/methanol=10/1) to obtain compound 3 (20 mg, 60%).

LCMS: [M+H]⁺=566.4

Step 2. Compound J

Compound 3 (20 mg, 0.035 mmol) was dissolved in DCM (3 mL), then trifluoroacetic acid (1 mL) was added dropwise, and the reaction solution was stirred at room temperature for 2 hours. After the reaction was completed, the reaction solution was concentrated, and the residue was purified by pre-HPLC (0.05% formic acid/acetonitrile/water) to obtain compound J (7.3 mg, 51%) as a white solid.

LCMS: [M+H]⁺=416.3

¹H NMR (400 MHz, CD₃OD) δ 8.63 (s, 1H), 8.43 (s, 1H), 7.84 (s, 1H), 4.70-4.62 (m, 2H), 4.48-4.39 (m, 1H), 4.23-4.15 (m, 1H), 4.00-3.96 (m, 1H), 3.93 (d, J=14.0 Hz, 1H), 3.60 (d, J=14.0 Hz, 1H), 2.26-2.14 (m, 1H), 1.95 (s, 3H), 1.88-1.76 (m, 1H), 1.49 (s, 3H), 1.36-1.26 (m, 4H), 0.90 (t, J=6.8 Hz, 3H).

Example 11 Preparation of Compound K

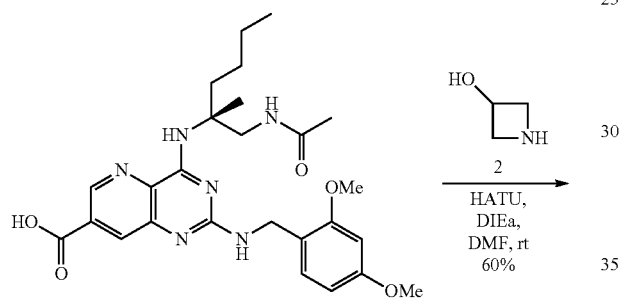

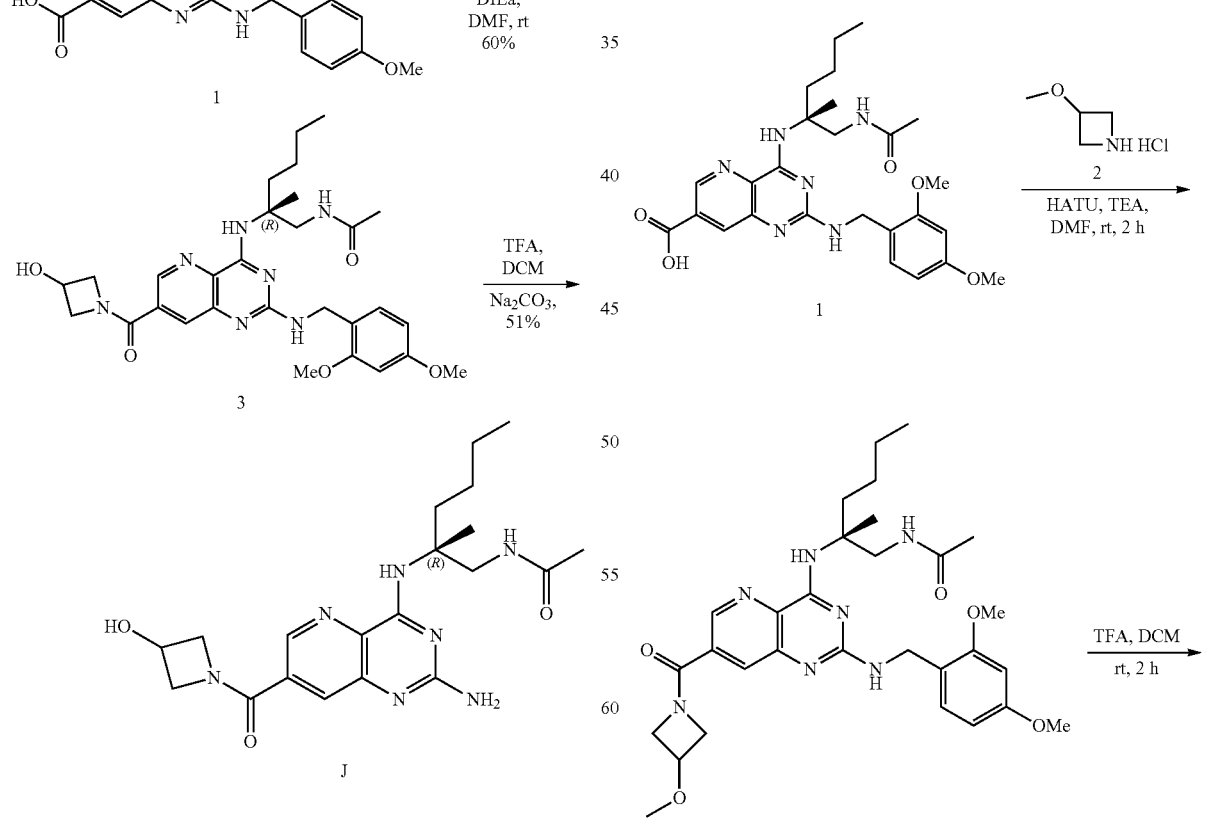

Step 1. Compound 3

Compound 1 (30 mg, 0.059 mmol, 1.0 eq) was dissolved in DMF (3 mL), and then HATU (67 mg, 0.176 mmol, 3.0

-continued

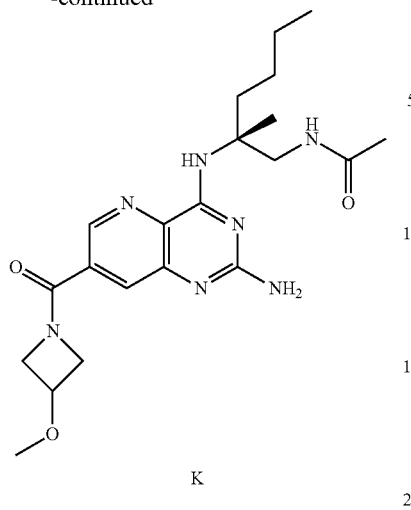

K

Step 1. Compound 3
Compound 1 (33 mg, 0.065 mmol, 1.0 eq) was dissolved in anhydrous DMF (5 mL), then HATU (32 mg, 0.084 mmol, 1.3 eq), triethylamine (0.3 mL, 0.194 mmol, 3.0 eq) and compound 2 (12 mg, 0.084 mmol, 1.5 eq) were added. The reaction solution was stirred at room temperature for 2 hours. The reaction solution was added with 20 ml of water and extracted with ethyl acetate (3×20 mL). The organic phases were combined and washed with saturated brine, and dried over anhydrous sodium sulfate and concentrated. The residue was purified by silica gel column chromatography (petroleum ether/ethyl acetate=2/1) to obtain compound 3 (30 mg, 80%) as a yellow oil.
LCMS: [M+H]$^+$=580.3

Step 2. Compound K
Compound 3 (30 mg, 0.052 mmol, 1.0 eq) was dissolved in dichloromethane (1 mL), then trifluoroacetic acid (3 mL) was added. The reaction solution was stirred at room temperature for 2 hours. The residue obtained by concentration of the reaction solution was purified by pre-HPLC (0.1% ammonia/acetonitrile/water) to obtain compound K (5.8 mg, 21%) as a white solid.
LCMS: [M+H]$^+$=430.2
$^1$H NMR (400 MHz, DMSO) δ 8.45 (s, 1H), 7.87 (br s, 1H), 7.67 (s, 1H), 7.14 (br s, 1H), 6.53 (br s, 2H), 4.49-4.45 (m, 1H), 4.30-4.26 (m, 2H), 4.18-4.16 (m, 1H), 3.88 (d, J=7.3 Hz, 1H), 3.74 (dd, J=13.6, 5.5 Hz, 1H), 3.49-3.44 (m, 1H), 3.22 (s, 3H), 2.10-2.04 (m, 1H), 1.82 (s, 3H), 1.76-1.71 (m, 1H), 1.37 (s, 3H), 1.27-1.23 (m, 4H), 0.84 (t, J=6.5 Hz, 3H).

Example 12 Preparation of Compound L

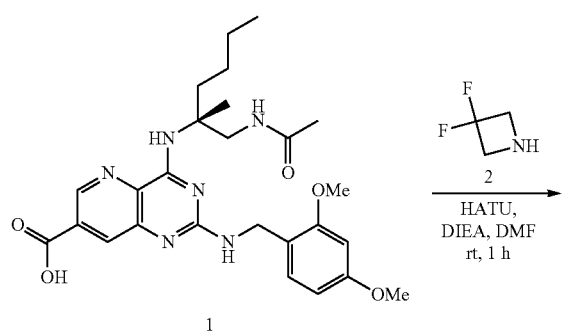

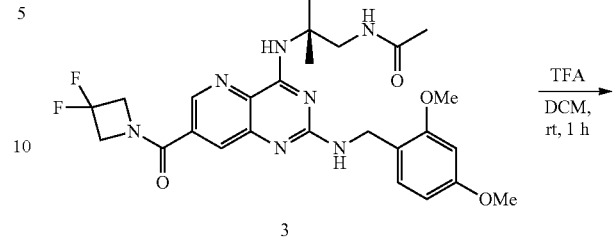

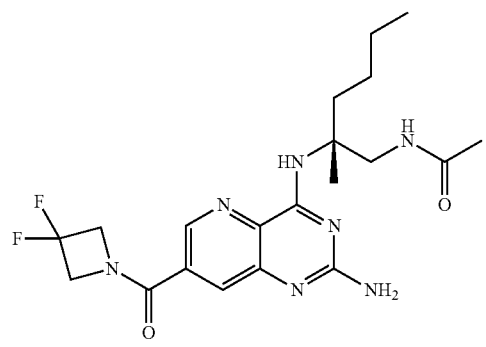

L

Step 1. Compound 3
Compound 2 (7 mg, 0.08 mmol, 1.3 eq) was dissolved in DMF (3 mL), and HATU (30 mg, 0.08 mmol, 1.3 eq) and compound 1 (30 mg, 0.06 mmol, 1.0 eq) were added, then DIEA (23 mg, 0.17 mmol, 3.0 eq) was added into the reaction solution, and the reaction solution was stirred at room temperature for 1 hour. The reaction solution was diluted with water, extracted with ethyl acetate (3×30 mL), washed with saturated brine (30 mL), dried over anhydrous sodium sulfate, filtered and concentrated. The residue was purified by silica gel column chromatography (dichloromethane/methanol=20/1) to obtain compound 3 (30 mg, 87%) as a white solid.
LCMS: [M+H]$^+$=586.3

Step 2. Compound L
Compound 3 (30 mg, 0.05 mmol, 1.0 eq) was dissolved in dichloromethane (1 mL) and then trifluoroacetic acid (5 mL) was added. The mixture was stirred at room temperature for 1 hour. The reaction solution was concentrated, and the residue was purified by reversed-phase column chromatography (0.05% FA/CH$_3$CN/H$_2$O) to obtain compound L (14.3 mg, 66%) as a white solid.
LCMS: [M+H]$^+$=436.2.
$^1$H NMR (400 MHz, CD$_3$OD) δ 8.61 (d, J=2.0 Hz, 1H), 7.83 (d, J=2.0 Hz, 1H), 4.83-4.74 (m, 2H), 4.58 (s, 2H), 3.92 (d, J=14.0 Hz, 1H), 3.62 (d, J=14.0 Hz, 1H), 2.23-2.17 (m, 1H), 1.95 (s, 3H), 1.84-1.77 (m, 1H), 1.47 (s, 3H), 1.40-1.27 (m, 4H), 0.90 (t, J=6.8 Hz, 3H).

Example 13 Preparation of Compound M

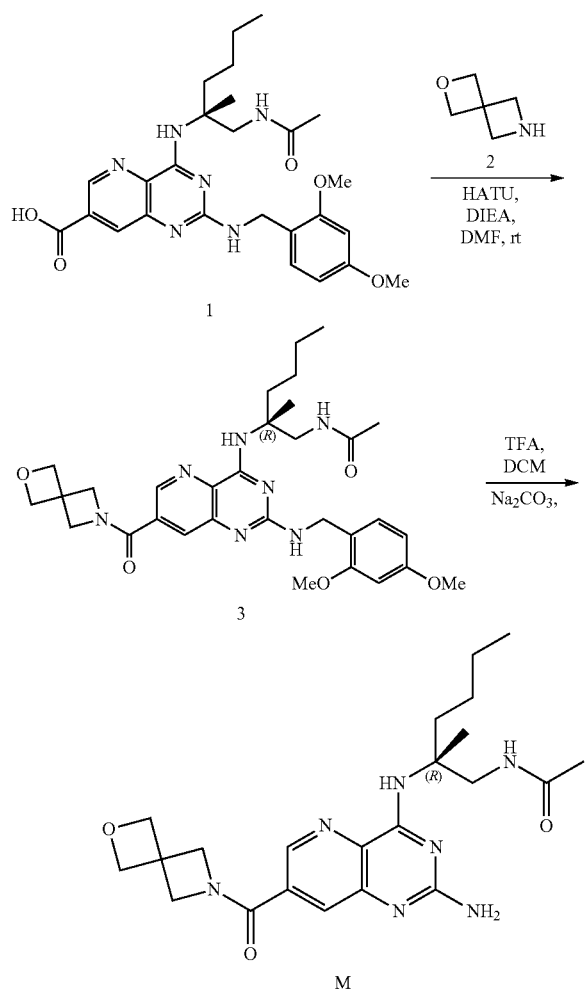

Step 1. Compound 3

Compound 1 (30 mg, 0.059 mmol, 1.0 eq) was dissolved in DMF (3 mL), and then HATU (67 mg, 0.176 mmol, 3.0 eq), DIEA (76 mg, 0.18 mmol, 3.0 eq) and compound 2 (35 mg, 0.352 mmol, 6.0 eq) were added to react at room temperature for 1 hour. The reaction solution was diluted with water and then extracted with ethyl acetate (50 mL*3). The organic phases were combined and washed with saturated brine, dried over anhydrous sodium sulfate and concentrated, and the residue was purified by silica gel column chromatography (dichloromethane/methanol=10/1) to obtain compound 3 (30 mg, 85%).

LCMS: [M+H]$^+$=592.4

Step 2. Compound M

Compound 3 (20 mg, 0.036 mmol, 1.0 eq) was dissolved in DCM (3 mL), then trifluoroacetic acid (1 mL) was added dropwise, and the reaction solution was stirred at room temperature for 2 hours. After the reaction was completed, the reaction solution was concentrated, the residue was purified by pre-HPLC (0.05% formic acid/acetonitrile/water) to obtain compound M (6.6 mg, 41%) as a white solid.

LCMS: [M+H]$^+$=442.3

$^1$H NMR (400 MHz, CD$_3$OD) δ 8.57 (s, 1H), 7.79 (s, 1H), 4.83-4.81 (m, 4H), 4.57 (s, 2H), 4.37 (s, 2H), 3.93 (d, J=13.6 Hz, 1H), 3.62 (d, J=13.6 Hz, 1H), 2.26-2.15 (m, 1H), 1.95 (s, 3H), 1.86-1.74 (m, 1H), 1.47 (s, 3H), 1.43-1.20 (m, 4H), 0.90 (t, J=6.8 Hz, 3H).

Example 14 Preparation of Compound N

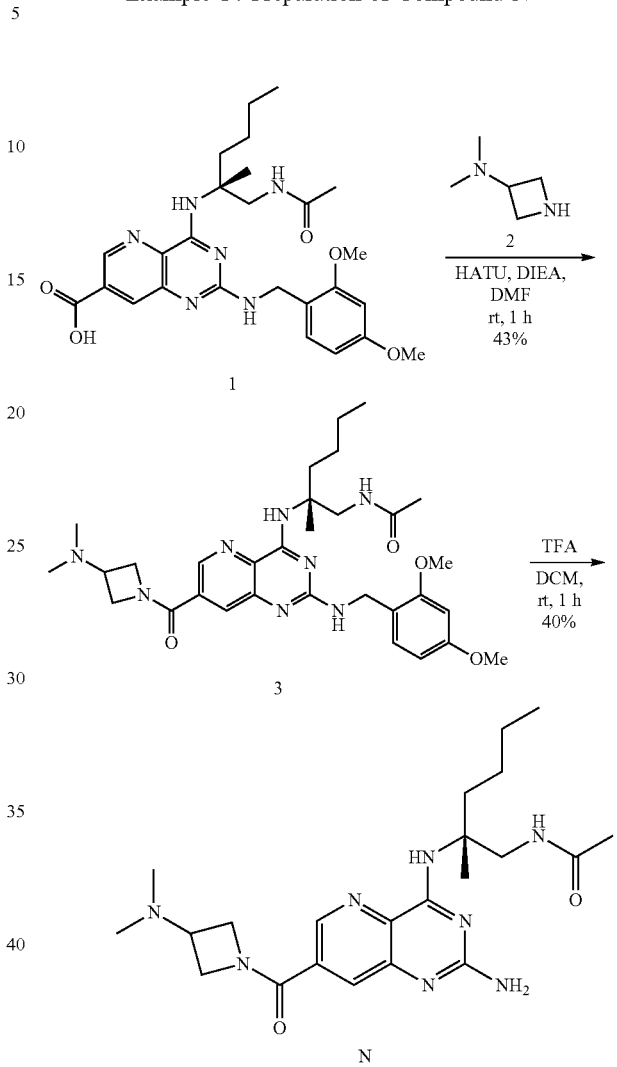

Step 1. Compound 3

Compound 2 (10 mg, 0.1 mmol, 1.3 eq) was dissolved in DMF (3 mL), and HATU (38 mg, 0.1 mmol, 1.3 eq) and compound 1 (40 mg, 0.08 mmol, 1.0 eq) were added, then DIEA (30 mg, 0.23 mmol, 3.0 eq) was added into the reaction solution, and the reaction solution was stirred at room temperature for 1 hour. The reaction solution was diluted with water, extracted with ethyl acetate (3×30 mL), washed with saturated brine (30 mL), dried over anhydrous sodium sulfate, filtered and concentrated. The residue was purified by silica gel column chromatography (dichloromethane/methanol=20/1) to obtain compound 3 (20 mg, 43%) as a white solid.

LCMS: [M+H]$^+$=593.3

Step 2. Compound N

Compound 3 (20 mg, 0.03 mmol, 1.0 eq) was dissolved in dichloromethane (1 mL) and then trifluoroacetic acid (5 mL) was added. The mixture was stirred at room temperature for 1 hour. The reaction solution was concentrated, and the residue was purified by reversed-phase column chromatography (0.05% FA/CH$_3$CN/H$_2$O) to obtain compound N (6.0 mg, 40%) as a white solid.

LCMS: [M+H]$^+$=443.3.

$^1$H NMR (400 MHz, CD$_3$OD) δ 8.64 (s, 1H), 7.85 (s, 1H), 4.61 (s, 1H), 4.45 (s, 1H), 4.32-4.18 (m, 2H), 4.05-4.03 (m, 1H), 3.95-3.92 (m, 1H), 3.62-3.59 (m, 1H), 2.24 (s, 6H), 2.21-2.17 (m, 1H), 1.95 (s, 3H), 1.86-1.81 (m, 1H), 1.49 (s, 3H), 1.37-1.29 (m, 4H), 0.92-0.89 (m, 3H).

Example 15 Preparation of Compound P

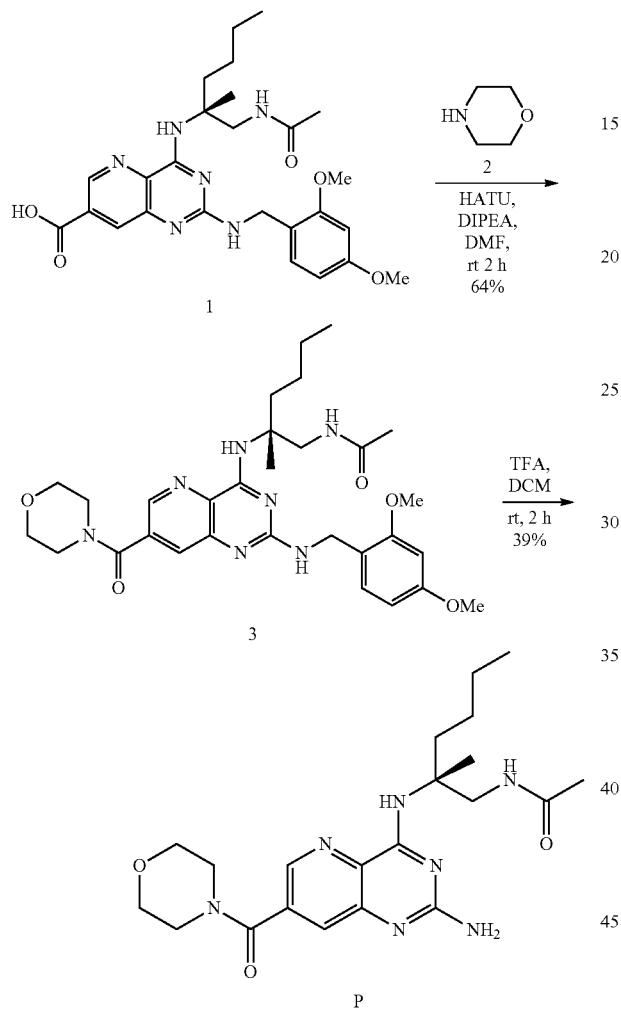

Step 1. Compound 3

Compound 1 (30 mg, 0.0587 mmol, 1.0 eq) was dissolved in DMF (1.5 mL), then compound 2 (8 mg, 0.0881 mmol, 1.5 eq), HATU (29 mg, 0.0763 mmol, 1.3 eq) and DIEA (23 mg, 0.176 mmol, 3.0 eq) were sequentially added, and the reaction solution was stirred at room temperature for 2 hours. The reaction solution was diluted with ethyl acetate (30 mL), then washed with water and saturated brine sequentially, dried over anhydrous sodium sulfate and concentrated, and the residue was purified by silica gel preparative plate (dichloromethane/methanol=10/1) to obtain compound 3 (22 mg, 64%) as a yellow solid.

LCMS: [M+H]$^+$=580.3

Step 2. Compound P

Compound 3 (22 mg, 0.0379 mmol, 1.0 eq) was dissolved in dichloromethane (0.5 mL), then trifluoroacetic acid (1.5 mL) was added, and the reaction solution was stirred at room temperature for 2 hours. The reaction solution was concentrated and the residue was purified by pre-HPLC (0.1% formic acid/acetonitrile/water) to obtain compound P (6.4 mg, 39%) as a white solid.

LCMS: [M+H]$^+$=430.3

$^1$H NMR (400 MHz, CD$_3$OD) δ 8.49 (d, J=1.8 Hz, 1H), 8.36 (s, 1H), 7.70 (d, J=1.8 Hz, 1H), 3.97-3.87 (m, 1H), 3.79 (s, 4H), 3.66 (s, 2H), 3.61-3.55 (m, 1H), 3.48 (s, 2H), 2.22-2.17 (m, 1H), 1.95 (s, 3H), 1.89-1.83 (m, 1H), 1.50 (s, 3H), 1.36-1.29 (m, 4H), 0.91 (t, J=7.2 Hz, 3H).

Example 16 Preparation of Compound Q

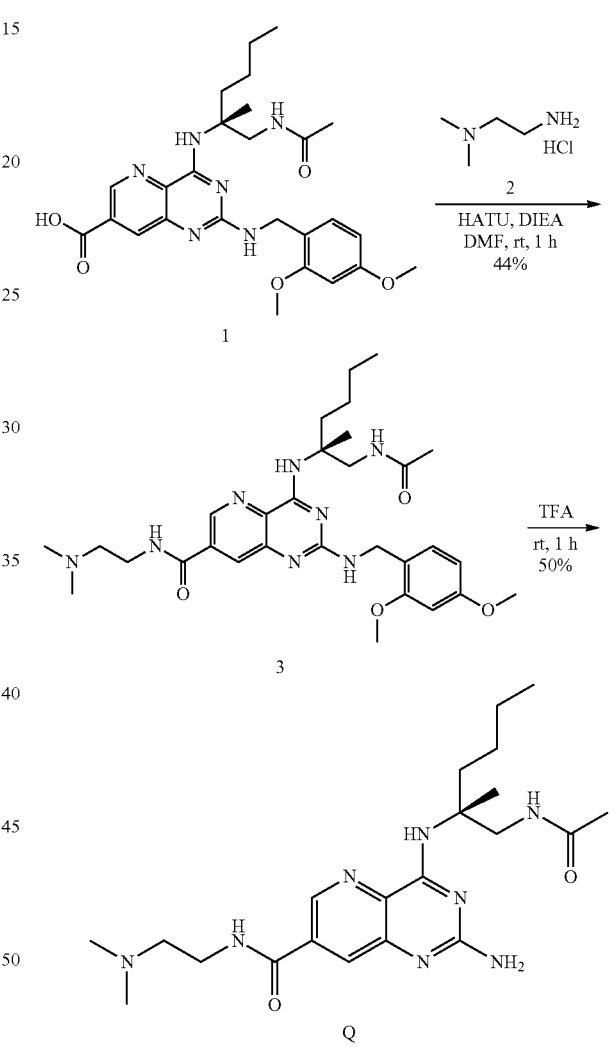

Step 1. Compound 3

Compound 1 (30 mg, 0.059 mmol, 1.0 eq) was dissolved in DMF (3 mL), and then HATU (34 mg, 0.09 mmol, 1.5 eq), DIEA (23 mg, 0.18 mmol, 3.0 eq) and compound 2 (10.9 mg, 0.088 mmol, 1.5 eq) were added to react at room temperature for 1 hour. The reaction solution was diluted with water and then extracted with ethyl acetate (50 mL*3). The organic phases were combined and washed with saturated brine, dried over anhydrous sodium sulfate and concentrated, and the residue was purified by silica gel column chromatography (dichloromethane/methanol=100/8) to obtain compound 3 (15 mg, 44%) as a yellow solid.

LCMS: [M+H]$^+$=581.3

Step 2. Compound Q

Compound 3 (15 mg, 0.026 mmol, 1.0 eq) was dissolved in trifluoroacetic acid (3 mL) and reacted at room temperature for 1 hour. After the reaction was completed, the reaction solution was concentrated, and the residue was purified by pre-HPLC (0.05% FA/acetonitrile/water) to obtain compound Q (5.7 mg, 50%) as a white solid.

LCMS: [M+H]$^+$=431.2

$^1$H NMR (400 MHz, CD$_3$OD) δ 8.82 (s, 1H), 8.06 (s, 1H), 3.95-3.92 (m, 1H), 3.76 (br s, 2H), 3.62-3.58 (m, 1H), 3.24 (br s, 2H), 2.86 (s, 6H), 2.24-2.17 (m, 1H), 1.95 (s, 3H), 1.88-1.81 (m, 1H), 1.50 (s, 3H), 1.37-1.32 (m, 4H), 0.90 (t, J=6.8 Hz, 3H)

Example 17 Preparation of Compound R

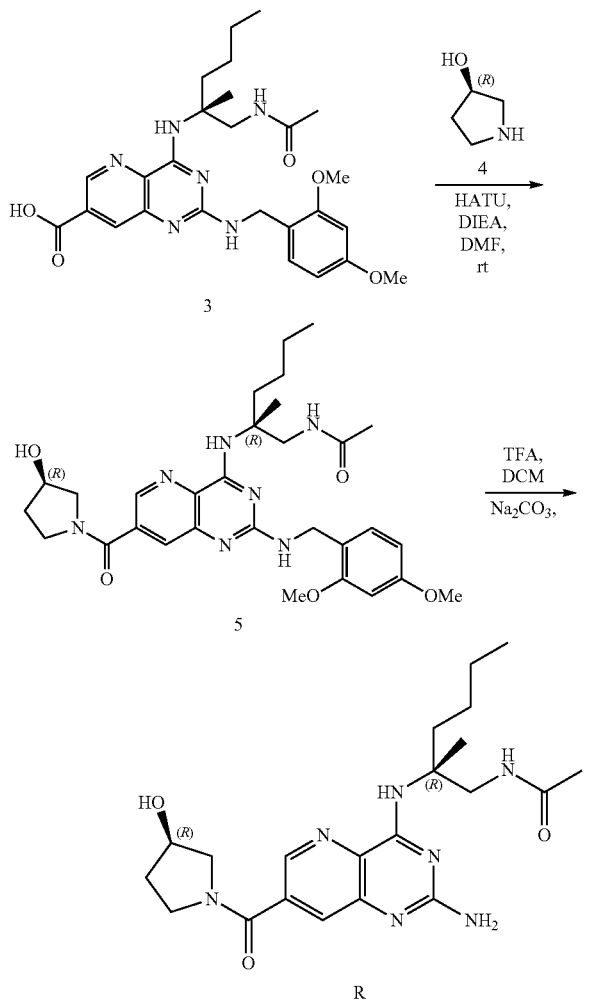

Step 1. Compound 5

Compound 1 (30 mg, 0.059 mmol, 1.0 eq) was dissolved in DMF (3 mL), and then HATU (67 mg, 0.176 mmol, 3.0 eq), DIEA (76 mg, 0.18 mmol, 3.0 eq) and compound 4 (35 mg, 0.352 mmol, 6.0 eq) were added to react at room temperature for 1 hour. The reaction solution was diluted with water and then extracted with ethyl acetate (50 mL*3). The organic phases were combined and washed with saturated brine, dried over anhydrous sodium sulfate and concentrated, and the residue was purified by silica gel column chromatography (dichloromethane/methanol=10/1) to obtain compound 5 (30 mg, 88%).

LCMS: [M+H]$^+$=580.3

Step 2. Compound R

Compound 5 (30 mg, 0.051 mmol, 1.0 eq)) was dissolved in DCM (3 mL), then trifluoroacetic acid (1 mL) was added dropwise to react at room temperature for 2 hours. After the reaction was completed, the reaction solution was concentrated, the residue was purified by pre-HPLC (0.05% formic acid/acetonitrile/water) to obtain compound R (9.1 mg, 41%) as a white solid.

LCMS: [M+H]$^+$=430.3

$^1$H NMR (400 MHz, CD$_3$OD) δ 8.54 (d, J=4.4 Hz, 1H), 7.76 (d, J=7.2 Hz, 1H), 4.46 (d, J=44 Hz, 1H), 3.94 (d, J=13.6 Hz, 1H), 3.80-3.53 (m, 4H), 3.36-3.37 (m, 1H), 2.23-1.90 (m, 6H), 1.85-1.79 (m, 1H), 1.49 (s, 3H), 1.43-1.21 (m, 4H), 0.91 (t, J=6.8 Hz, 3H)

Example 18 Preparation of Compound S

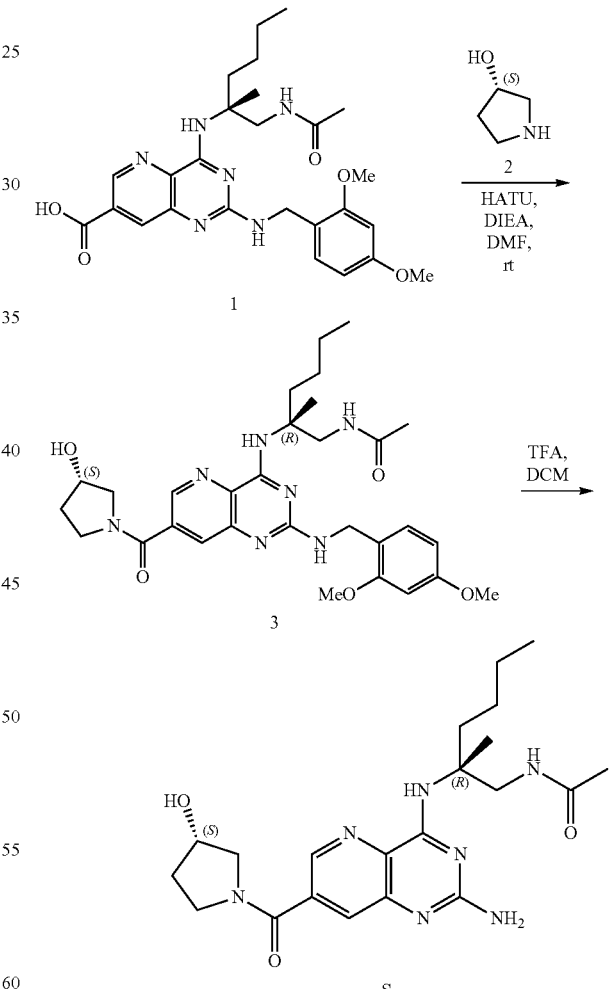

Step 1. Compound 3

Compound 1 (30 mg, 0.059 mmol, 1.0 eq) was dissolved in DMF (3 mL), and then HATU (67 mg, 0.176 mmol, 3.0 eq), DIEA (76 mg, 0.18 mmol, 3.0 eq) and compound 2 (35 mg, 0.352 mmol, 6.0 eq) were added to react at room temperature for 1 hour. The reaction solution was diluted with water and then extracted with ethyl acetate (50 mL*3). The organic phases were combined and washed with saturated brine, dried over anhydrous sodium sulfate and concentrated, and the residue was purified by silica gel column chromatography (dichloromethane/methanol=10/1) to obtain compound 3 (30 mg, 88%).

LCMS: [M+H]$^+$=580.3

Step 2. Compound S

Compound 3 (20 mg, 0.036 mmol, 1.0 eq)) was dissolved in DCM (3 mL), and trifluoroacetic acid (1 mL) was added dropwise to react at room temperature for 2 hours. After the reaction was completed, the reaction solution was concentrated, and the residue was purified by pre-HPLC (0.05% FA/acetonitrile/water) to obtain compound S (19 mg, 86%) as a white solid.

LCMS: [M+H]$^+$=430.3

$^1$H NMR (400 MHz, CD$_3$OD) δ 8.47-8.45 (m, 1H), 7.70-7.68 (m, 1H), 4.45 (d, J=44 Hz, 1H), 3.94 (d, J=14.0 Hz, 1H), 3.82-3.47 (m, 4H), 3.31-3.30 (m, 1H), 2.25-1.92 (m, 6H), 1.82-1.74 (m, 1H), 1.47 (s, 3H), 1.40-1.24 (m, 4H), 0.90 (t, J=6.8 Hz, 3H).

Example 19 Preparation of Compound T

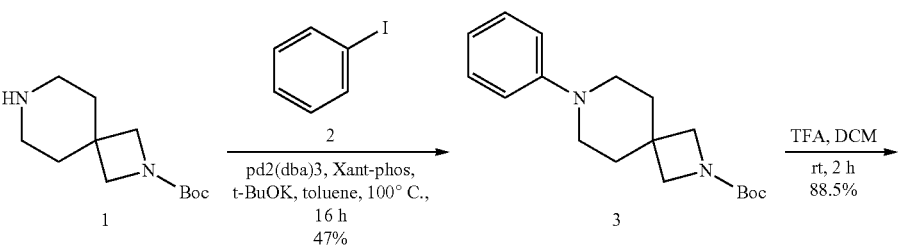

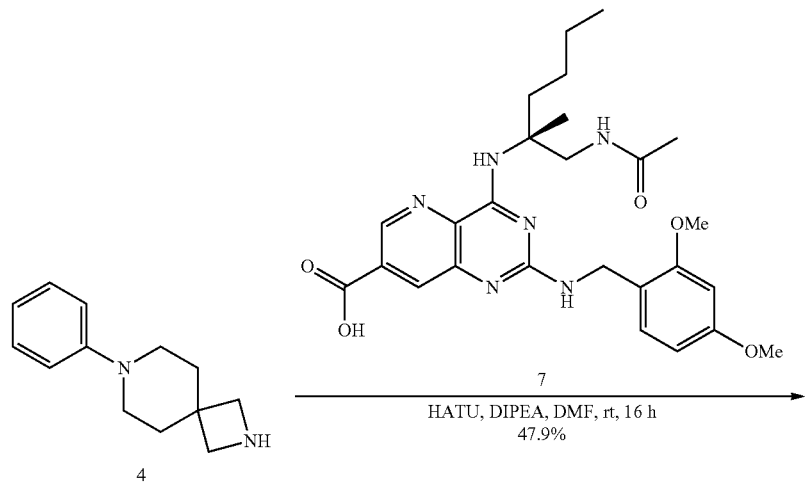

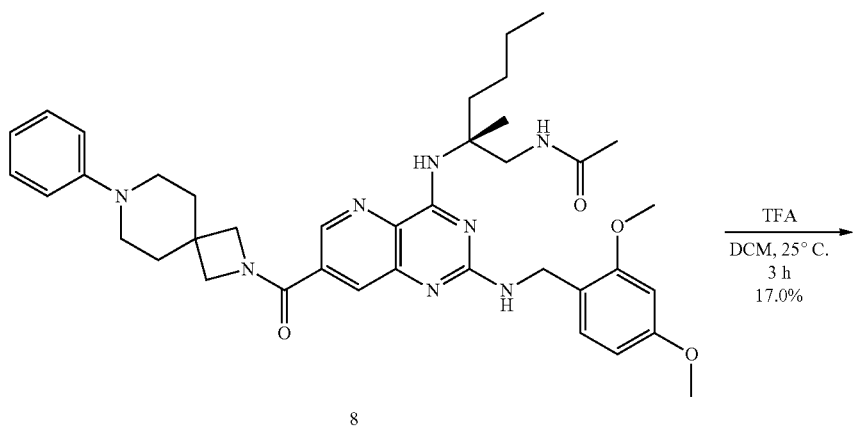

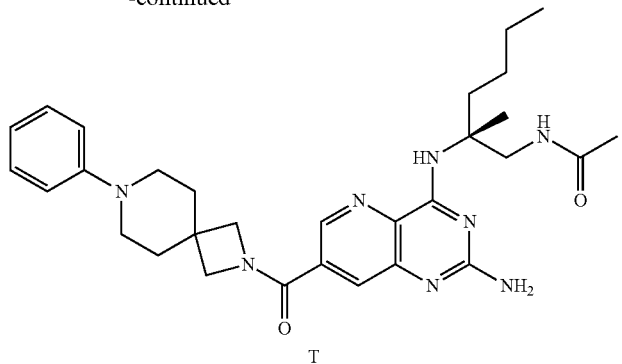

T

Step 1. Compound 3

Compound 1 (1.2 g, 5.4 mmol, 1.1 eq) was dissolved in toluene (20 mL), and then compound 2 (1 g, 4.9 mmol, 1.0 eq), Pd$_2$(dba)$_3$ (450 mg, 0.5 mmol, 0.1 eq), XantPhos (290 mg, 0.5 mmol, 0.1 eq) and potassium tert-butoxide (1.2 g, 10 mmol, 2 eq) were sequentially added. The reaction solution was stirred at 100° C. for 16 hours. The crude product obtained by concentrating the reaction solution was purified by flash column chromatography to obtain compound 3 (760 mg, 47%) as a white solid.

LCMS: [M+H]$^+$=303.2

Step 2. Compound 4

Compound 3 (76 mg, 0.25 mmol, 1 eq) was dissolved in dichloromethane (5 mL), and then trifluoroacetic acid (1 mL) was added. The reaction solution was stirred at room temperature for 2 hours. Saturated sodium bicarbonate was added to adjust the pH value to be 7-8, and then extracted with dichloromethane (10 mL×2). The organic phases were combined and washed with saturated brine, dried over anhydrous sodium sulfate, and concentrated to obtain compound 4 (45 mg, 88.5%).

LCMS: [M+H]$^+$=203.2

Step 3. Compound 8

Compound 7 (23 mg, 0.045 mmol, 1.0 eq) was dissolved in DMF (2 mL), and then compound 4 (18 mg, 0.090 mmol, 2.0 eq), HATU (21 mg, 0.054 mmol, 1.2 eq) and DIPEA (12 mg, 0.090 mmol, 2 eq) were sequentially added. The reaction solution was stirred at room temperature for 16 hours and then poured into water (20 mL). The mixture was extracted with ethyl acetate (10 mL×2), and the organic phases were combined and washed with saturated brine, dried over anhydrous sodium sulfate, and the crude product obtained after concentration was purified by preparative thin layer chromatography (dichloromethane/methanol=10:1) to obtain compound 8 (15 mg, 47.9%).

LCMS: [M+H]$^+$=695.4

Step 4. Compound T

Compound 8 (15 mg, 0.022 mmol, 1 eq) was dissolved in dichloromethane (4 mL), and then trifluoroacetic acid (1 mL) was added. The reaction solution was stirred at room temperature for 3 hours and then saturated sodium bicarbonate was added to adjust the pH value to be 7-8. The mixture was extracted with ethyl acetate (10 mL×2), and the organic phases were combined and washed with saturated brine, dried over anhydrous sodium sulfate, and the crude product obtained after concentration was purified by HPLC (0.1% formic acid/acetonitrile/water) to obtain compound T (2.0 mg, 17.0%) as a white solid.

LCMS: [M+H]=545.3

$^1$H NMR (400 MHz, CDCl$_3$) δ 8.66 (s, 1H), 7.84 (s, 1H), 7.25-7.21 (m, 2H), 6.93 (d, J=8.0 Hz, 2H), 6.87 (t, J=8.0 Hz, 1H), 6.59 (s, 1H), 5.43-5.26 (m, 2H), 4.08 (s, 2H), 3.99 (s, 2H), 3.89-3.82 (m, 1H), 3.75-3.69 (m, 1H), 3.20-3.00 (m, 4H), 2.09 (t, J=8.0 Hz, 1H), 2.00 (s, 3H), 1.96-1.91 (m, 3H), 1.74-1.67 (m, 1H), 1.46 (s, 3H), 1.40-1.21 (m, 6H), 0.90 (t, J=4.0 Hz, 3H).

Example 20 Preparation of Compound U

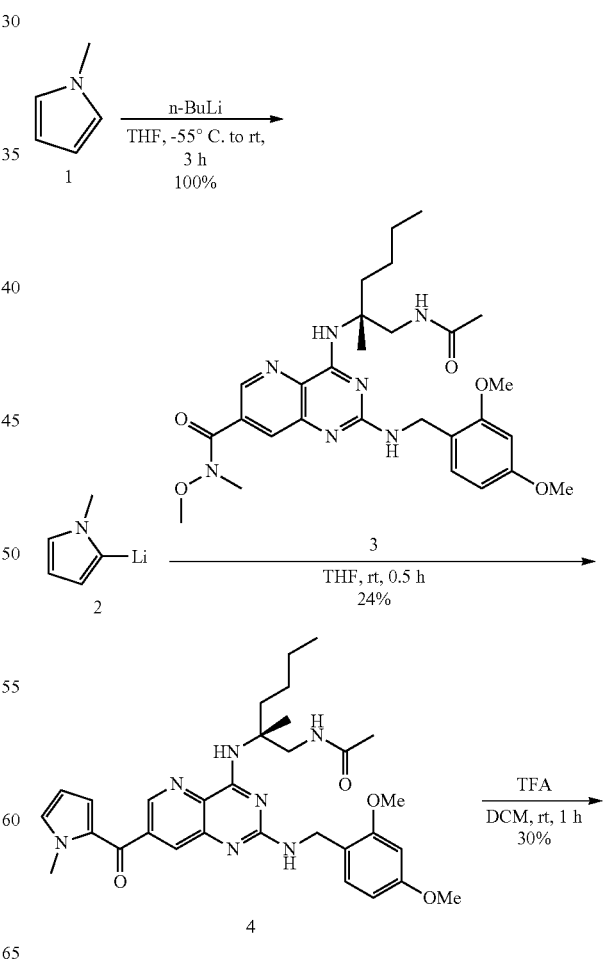

-continued

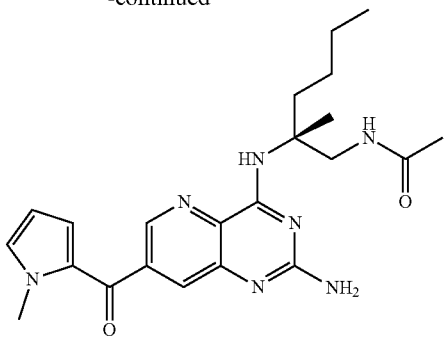

U

Step 1. Compound 2

Compound 1 (500 mg, 6.164 mmol, 1.0 eq) was dissolved in tetrahydrofuran (7 mL), cooled to −55° C., and then n-butyllithium (2.4 M, 2.56 mL, 1.0 eq) solution was added dropwise. The reaction solution was stirred at −55° C. for 5 minutes, then the temperature was raised to room temperature and stirred at room temperature for 3 hours to obtain a solution of intermediate 2 (0.65 M, 9.5 mL, 6.164 mmol, 100%) in tetrahydrofuran, which was directly used for the next reaction.

Step 2. Compound 4

Compound 3 (100 mg, 0.180 mmol, 1.0 eq) was dissolved in tetrahydrofuran (5 mL), a solution of compound 2 in tetrahydrofuran (0.65 M, 2.77 mL, 1.806 mmol, 10.0 eq) was added at room temperature, and the reaction solution was stirred at room temperature for 0.5 h. The reaction solution was poured into ice water and then extracted with ethyl acetate (3×10 mL). The organic phases were combined and washed with saturated brine, dried over anhydrous sodium sulfate and concentrated, and the residue was purified by silica gel preparative plate (dichloromethane/methanol=12/1) to obtain compound 4 (25 mg, 24%) as a yellow solid.

LCMS: [M+H]$^+$=574.4

Step 3. Compound U

Compound 4 (25 mg, 0.0436 mmol, 1.0 eq) was dissolved in dichloromethane (0.7 mL), then trifluoroacetic acid (2 mL) was added, and the reaction solution was stirred at room temperature for 1 hour. The reaction solution was concentrated, and the residue was dissolved with dichloromethane (20 mL), then washed with sodium carbonate aqueous solution (0.5 M, 20 mL) and saturated brine sequentially, dried over anhydrous sodium sulfate and concentrated. The obtained crude compound was purified by pre-HPLC (0.1% ammonia/acetonitrile/water) to obtain compound U (5.6 mg, 30%) as a yellow solid.

LCMS: [M+H]$^+$=424.1

$^1$H NMR (400 MHz, CDCl$_3$) δ 8.76 (d, J=1.6 Hz, 1H), 8.06 (d, J=2.0 Hz, 1H), 7.72 (s, 1H), 7.00 (s, 1H), 6.73 (d, J=4.0 Hz, 1H), 6.48 (s, 1H), 6.20-6.18 (m, 1H), 5.99 (br s, 2H), 4.06 (s, 3H), 3.90-3.87 (m, 1H), 3.71-3.68 (m, 1H), 2.11-2.05 (m, 1H), 2.02 (s, 3H), 1.81-1.75 (m, 1H), 1.50 (s, 3H), 1.42-1.27 (m, 4H), 0.91 (t, J=6.8 Hz, 3H).

Example 21 Preparation of Compound V

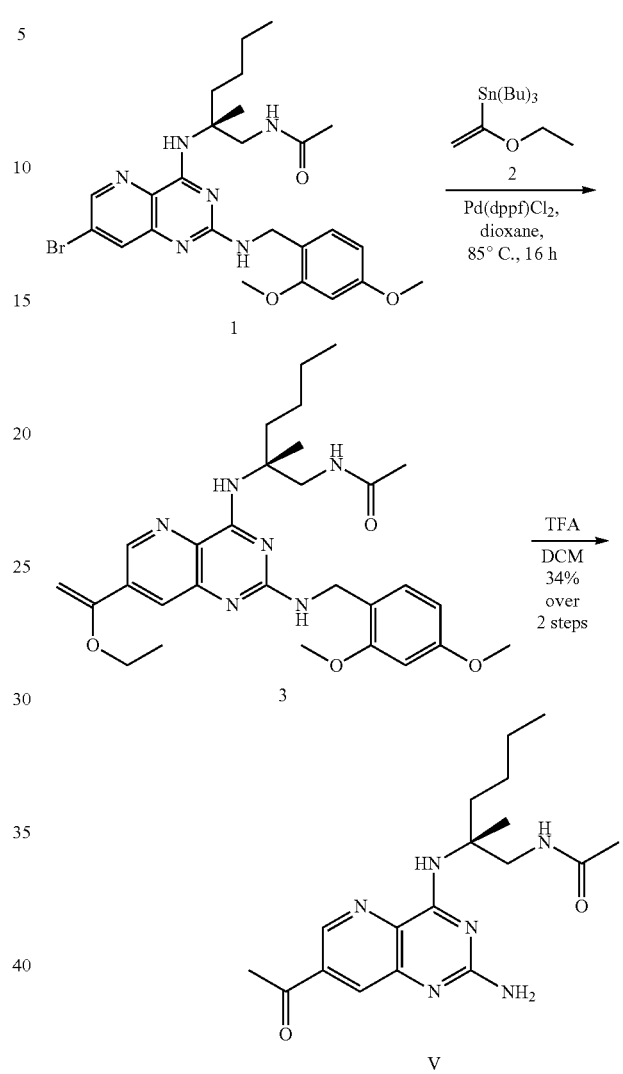

Step 1. Compound 3

Compound 1 (100 mg, 0.183 mmol, 1.0 eq), compound 2 (200 mg, 0.550 mmol, 3.0 eq), Pd(dppf)Cl$_2$ (134 mg, 0.183 mmol, 1.0 eq) were dissolved in dioxane (20 mL), the mixture was replaced with nitrogen for three times, then the mixture was heated to 85° C. under nitrogen atmosphere and stirred for 16 hours. After cooling to room temperature, the reaction solution was concentrated, and the residue was separated and purified by silica gel column chromatography (PE:EA=10:1 to EA) to obtain a crude product 3 (200 mg).

LCMS: [M+H]$^+$=537.3

Step 2. Compound V

Compound 3 (200 mg, 0.183 mmol, crude) was dissolved in DCM (10 mL), then trifluoroacetic acid (5 mL) was added dropwise, and the reaction solution was stirred overnight at room temperature. After the reaction was completed, the reaction solution was concentrated, the residue was separated and purified by silica gel column chromatography (DCM/MeOH=10/1) to obtain a crude product (100 mg), and the crude product was purified by pre-HPLC (0.05% formic acid/acetonitrile/water) to obtain compound V (22.6 mg, the total yield of two steps was 34%)

LCMS: [M+H]$^+$=359.2 .

$^1$H NMR (400 MHz, CD$_3$OD) δ 8.93 (s, 1H), 8.14 (s, 1H), 3.94 (d, J=14.0 Hz, 1H), 3.60 (d, J=14.0 Hz, 1H), 2.69 (s, 3H), 2.26-2.13 (m, 1H), 1.94 (s, 3H), 1.88-1.75 (m, 1H), 1.49 (s, 3H), 1.42-1.23 (m, 4H), 0.90 (t, J=6.4 Hz, 3H).

Example 22 Screening Experiment for Receptor Binding Activity In Vitro of Human Toll-Like Receptor 7 (TLR7) and Human Toll-Like Receptor 8 (TLR8)

1. Experimental Purpose

The ability of the compounds of the present invention to activate TLR7 and TLR8 respectively was evaluated by using receptor binding experiments in vitro.

2. Experimental Principle

HEK-Blue™ hTLR7 (article number: hkb-htlr7) and HEK-Blue™ hTLR8 (article number: hkb-htlr8) cells were purchased from InvivoGen company. HEK-Blue™ hTLR7/8 cells can indicate the activation of TLR7/8 by detecting the activation level of NF-κB signaling pathway. HEK-Blue™ hTLR7/8 cells are derived from human embryonic kidney 293 cells, stably expressing human TLR7 or human TLR8, respectively, and can induce expression of secretory alkaline phosphatase (SEAP) to report gene system. The expression of SEAP reporter gene is regulated by IFN-β simplified promoter, which is composed of 5 NF-κB binding sequences and AP-1 binding sequences. Therefore, when TLR7/8 is activated in these two cells, NF-κB and AP-1 will be activated, and SEAP expression and extracellular secretion will be induced. By detecting the activity of SEAP outside the cell, the activation level of TLR7/8 can be indicated.

3. Experimental Steps (1) The compound was added to the cell culture plate after a 3-fold gradient dilution, with a total of 10 concentrations, with two duplicates wells for each concentration. Negative control wells were added with 0.5 μl DMSO per well, positive control wells were added with 0.5 μl, 2.0 mg/ml (5.7 mM) R848 (structural formula is

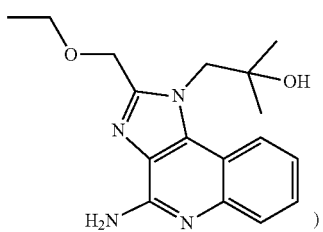 [SMILES: CCOCc1nc2c(N)nc3ccccc3c2n1CC(C)(C)O]

) per well;

(2) HEK-Blue™ hTLR7/8 cells were digested separately, counted, and the cells at 5.0×10$^4$ cells per well were added to a 96-well cell culture plate containing compounds; (3) The cells added with the compound were placed in a 5% CO$_2$ incubator at 37° C. for 24 hours;

(4) Compound activity detection: took 20 l/well cell culture supernatant and added it to 96-well plate containing 180 μl QUANTI-BLUE™ reagent. Incubated at 37° C. for one hour, and the optical density absorption value (OD$_{650}$) at 650 nm was detected with a multifunctional microplate reader;

(5) Cell activity detection: operated according to the Celltiter-Glo instructions, and the chemiluminescence signal (RLU) was detected by a multifunctional microplate reader Envision;

(6) Data analysis:

Compound activity: OD$_{650}$ value was analyzed by GraphPad Prism software, and the dose effect curve of the compound was fitted to calculate the EC$_{50}$ value of the compound.

Cell activity detection: cell activity was analyzed by GraphPad Prism software, and the dose effect curve of the compound was fitted to calculate the CC$_{50}$ value of the compound to the cell.

4. Experimental Results:

TABLE 1

Screening results of hTLR7 and hTLR8 receptor binding activity in vitro

| Compounds tested | hTLR7 EC$_{50}$ (uM) | hTLR8 EC$_{50}$ (uM) | hTLR8 CC$_{50}$ (uM) |
|---|---|---|---|
| R848 (Positive control) | 0.103 | 0.755 | >71 |
| Compound A | >33 | 0.052 | >33 |
| Compound B | 28.38 | 0.029 | >33 |
| Compound T | >33 | 0.207 | >33 |
| Compound V | >33 | 0.049 | >33 |
| Compound X | 11.9 | 0.040 | >33 |

From the above experimental results, it can be seen that the compounds of the present invention show a specific activation ability for TLR8 in the TLR7 and TLR8 in vitro receptor binding activity experiments, and no cytotoxicity is observed. Compound X is a known compound in the literature, and its structure is

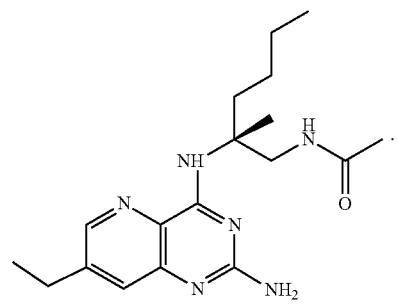 [SMILES: CCCC[C@](C)(CNC(C)=O)Nc1nc(N)nc2cc(CC)cnc12]

From the above test results, it can be seen that compounds A, B and V of the present invention have higher selectivity for TLR8 activation than compound X.

Example 23 Human Peripheral Blood Mononuclear Cells (PBMC) Experiment

1. Experimental Purpose

The human peripheral blood mononuclear cell (PBMC) experiment and the IL-12p40 ELISA detection method are used to detect the IL-12p40 inducing activity of the compound of the present invention in human PBMC.

2. Experimental Principle

Toll-like receptors (TLRs) are a series of switches that regulate the human immune system and occupy an important position in both innate (non-specific) and specific immunity. TLR8 is mainly expressed in monocytes, macrophages and myeloid dendritic cells. TLR8 is expressed on the Endosome intima of the cell and recognizes single-stranded RNA with high GU (guanylate/uridonic acid) content. After TLR8 signaling pathway is activated, it will activate the secretion of a series of downstream cytokines (IL-12, TNF-alpha, IFN-gamma, etc.), causing antiviral immune response. In this experiment, the compound was used to stimulate human PBMC, and the level of IL-12p40 protein in the culture supernatant was detected to evaluate the activation level of the compound on the TLR8 signaling pathway.

3. Experimental Steps (1) The compound was added to the cell plate after a 3-fold gradient dilution, with a total of 8 concentrations, and two duplicate wells for each concentration. Negative control wells were added with 1 μl DMSO each well and positive control wells were added with 1 μl, 5.0 mg/ml (14.25 mM) of R848 each well;

(2) The frozen human PBMC was put into a 37° C. water bath pot, after it was melted, transferred to a 15 ml centrifuge tube, 10 ml of preheated RPMI1640 medium was gradually added, mixed well, centrifuged at 200×g for 15 min, and the supernatant was removed.

Resuspended, cell number was counted, and the cell suspension was adjusted to $2.5 \times 10^6$ cells/ml with the culture medium. Then 200 μl of diluted cells ($5.0 \times 10^5$ cells/well) were added to each well of the 96-well plate containing the compound;

(3) The compounds and the cells were incubated at 37° C., 5% CO2 incubator for 24 hours;

(4) Compound activity detection: took 70 l/well cell culture supernatant, operated according to the ELISA kit instructions to detect the content of IL-12p40 in the supernatant, and the optical density absorption value of each well at 450 nm (OD450) was detected by a multifunctional microplate reader;

(5) Cell activity detection: operated according to the Celltiter-Glo instructions, and the chemiluminescence signal (RLU) was detected by a multifunctional microplate reader Envision;

(6) Data analysis:

Compound activity: OD450 value was analyzed by GraphPad Prism software, and the dose effect curve of the compound was fitted to calculate the $EC_{50}$ value of the compound.

Cell activity detection: cell activity was analyzed by GraphPad Prism software, and the dose effect curve of the compound was fitted to calculate the $CC_{50}$ value of the compound to the cell.

4. Experimental Results:

TABLE 2

Experimental Results of Human Peripheral Blood Mononuclear Cells (PBMC)

| Compounds tested | IL-12p40 $EC_{50}$ (uM) | $CC_{50}$ (uM) |
|---|---|---|
| R848 (positive control) | 0.208 | >71 |
| Compound A | 0.031 | >33 |
| Compound B | 0.020 | 28.85 |

From the above experimental results, it can be seen that the compound of the present invention exhibits high activity and safety in the induction activity test of IL-12p40 in human PBMC. The induced activity $EC_{50}$ values of compounds A and B on IL-12p40 were 0.031 μM and 0.020 μM respectively. Both the cytotoxic $CC_{50}$ values of compounds A and B on human PBMC were greater than 10 μM.

Example 24 Study on the Pharmacokinetics

1) Research Purpose:

To obtain the pharmacokinetic characteristics and liver distribution of the compound to be tested in male SD rats 2) Experimental Content Pharmacokinetic study: 6 healthy male SD rats (SPF grade) were divided into 2 groups and 3 rats/group. After fasting overnight (only oral administration group), compound A was administered intravenously at 5 mg/kg and orally at 50 mg/kg, blood was collected by jugular vein puncture at time points 0.083 (IV only), 0.25, 0.5, 1, 2, 4, 6 (PO only), 8 and 24 hours, and at least 0.3 mL of whole blood was collected to $EDTA-K_2$ anticoagulant tube. Within half an hour, plasma was taken after centrifugation (6000 rpm, 8 minutes, 4° C.) and frozen at −20° C. for later use.

Liver-blood ratio study: 4 healthy male SD rats (SPF grade) were divided into 2 groups and 2 rats/group. After fasting overnight, compound A and compound X were administrated orally respectively. Blood was taken through cardiac puncture at time points 1 and 4 hours, at least 0.5 mL of whole blood was collected to $EDTA-K_2$ anticoagulant tube, and plasma was taken after centrifugation (6000 rpm, 8 minutes, 4° C.) within half an hour and frozen at −20° C. for later use. At the same time, liver tissue was collected, rinsed with normal saline, then blotted dry with absorbent paper, weighed, and frozen at −20° C. for later use.

Experimental results: According to the obtained blood drug concentration data, the non-compartmental model of WinNonlin® 8.1 software (Certara, USA) was used to calculate the pharmacokinetic parameters after administration.

Main pharmacokinetic parameters after single intravenous and oral administration of compound A in male SD rats

| | Compound tested Compound A | |
|---|---|---|
| Route of administration | IV - 5 mg/kg | PO - 50 mg/kg |
| $T_{1/2}$ (h) | 0.68 | 5.75 |
| $T_{max}$ (h) | 0.083 | 0.42 |
| $C_{max}$ (ng/mL) | 1834.3 | 1171.4 |
| $AUC_{last}$ (h*ng/mL) | 876.1 | 1245.1 |
| $AUC_{INF}$ (h*ng/mL) | 877.1 | 1257.8 |
| $MRT_{last}$ (h) | 0.38 | 1.93 |
| $V_z$ (L/kg) | 5.59 | — |
| Cl (L/h/kg) | 5.70 | — |
| % F | — | 14.21 |

Liver blood ratio of male SD rats after a single oral administration of the compounds to be tested

| Compound to be tested | time points (h) | liver blood ratio |
|---|---|---|
| Compound A | 1 | 12.3 |
| | 4 | 34.4 |
| Compound X | 1 | 6.9 |
| | 4 | 23.6 |

All literatures mentioned in the present invention are incorporated by reference herein, as though individually incorporated by reference. Additionally, it should be understood that after reading the above teaching, many variations and modifications may be made by the skilled in the art, and these equivalents also fall within the scope as defined by the appended claims.

The invention claimed is:
1. A compound represented by formula I, a stereoisomer or a pharmaceutically acceptable salt thereof:

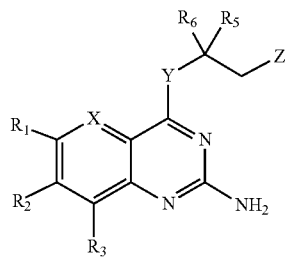

formula I wherein,
X is N;
Y is selected from the group consisting of NH and O;
Z is selected from the group consisting of —N(H)C(O)R$_4$ and —OH;
R$_1$ and R$_3$ are independently selected from the group consisting of hydrogen, halogen, C$_1$-C$_6$ alkyl, hydroxyl and amino; the alkyl is optionally substituted by 1-3 substituents selected from the group consisting of halogen, hydroxyl, C$_1$-C$_6$ alkylamino, C$_1$-C$_6$ alkoxy, cyano, C$_1$-C$_6$ alkyl-C(O)NH—, C$_1$-C$_6$ alkyl-NH—C(O)—, C$_1$-C$_6$ alkyl, C$_3$-C$_{10}$ cycloalkyl, C$_3$-C$_{10}$ heterocycloalkyl, halogen-substituted C$_1$-C$_6$ alkyl, C$_3$-C$_{10}$ heteroaryl and C$_6$-C$_{12}$ aryl;
R$_2$ is selected from the group consisting of C$_3$-C$_{10}$ cycloalkyl, C$_3$-C$_{10}$ heterocycloalkyl, —NR$_8$R$_9$, —OR$_8$, —SR$_8$, —S(O)$_2$R$_8$, —N(R$_{10}$)COR$_{11}$, —N(R$_{10}$)S(O)$_2$R$_{11}$, —CONR$_{10}$R$_{11}$, —COR$_{10}$ and —S(O)$_2$NR$_{10}$R$_{11}$; the cycloalkyl and the heterocycloalkyl are optionally substituted by 1-3 substituents selected from the group consisting of halogen, hydroxyl, C$_1$-C$_6$ alkylamino, C$_1$-C$_6$ alkoxy, cyano, C$_1$-C$_6$ alkyl-C(O)NH—, =O, C$_1$-C$_6$ alkyl-NH—C(O)—, C$_1$-C$_6$ alkyl, C$_3$-C$_{10}$ cycloalkyl, C$_3$-C$_{10}$ heterocycloalkyl, halogen-substituted C$_1$-C$_6$ alkyl, C$_3$-C$_{10}$ heteroaryl and C$_6$-C$_{12}$ aryl;
R$_4$, R$_5$ and R$_6$ are independently selected from the group consisting of halogen, C$_1$-C$_6$ alkyl, C$_3$-C$_{10}$ cycloalkyl, C$_3$-C$_{10}$ heterocycloalkyl, C$_3$-C$_{10}$ heteroaryl and C$_6$-C$_{12}$ aryl;
the alkyl, cycloalkyl, heterocycloalkyl, heteroaryl and aryl are optionally substituted by 1-3 substituents selected from the group consisting of halogen, hydroxyl, amino, C$_1$-C$_6$ alkylamino, C$_1$-C$_6$ alkoxy, cyano, C$_1$-C$_6$ alkyl-C(O)NH—, C$_1$-C$_6$ alkyl-NH—C(O)—, C$_1$-C$_6$ alkyl, C$_3$-C$_{10}$ cycloalkyl, C$_3$-C$_{10}$ heterocycloalkyl, halogen-substituted C$_1$-C$_6$ alkyl, C$_3$-C$_{10}$ heteroaryl and C$_6$-C$_{12}$ aryl;
R$_8$ is selected from the group consisting of C$_3$-C$_{10}$ cycloalkyl, C$_3$-C$_{10}$ heterocycloalkyl, C$_3$-C$_{10}$ heteroaryl and C$_6$-C$_{10}$ aryl; the cycloalkyl, heterocycloalkyl, heteroaryl and aryl are optionally substituted by 1-3 substituents selected from the group consisting of halogen, hydroxyl, amino, C$_1$-C$_6$ alkylamino, C$_1$-C$_6$ alkoxy, cyano, C$_1$-C$_6$ alkyl-C(O)NH—, C$_1$-C$_6$ alkyl-NH—C(O)—, C$_1$-C$_6$ alkyl, C$_3$-C$_{10}$ cycloalkyl, C$_3$-C$_{10}$ heterocycloalkyl, halogen-substituted C$_1$-C$_6$ alkyl, C$_3$-C$_{10}$ heteroaryl and C$_6$-C$_{12}$ aryl;
R$_9$, R$_{10}$ and R$_{11}$ are independently selected from the group consisting of hydrogen, hydroxyl, C$_1$-C$_6$ alkyl, C$_3$-C$_{10}$ cycloalkyl, C$_3$-C$_{10}$ heterocycloalkyl, C$_3$-C$_{10}$ heteroaryl and C$_6$-C$_{10}$ aryl, and the alkyl, cycloalkyl, heterocycloalkyl, heteroaryl and aryl are optionally substituted by 1-3 substituents selected from the group consisting of halogen, hydroxyl, amino, (C$_1$-C$_6$ alkyl)$_2$N—, C$_1$-C$_6$ alkoxy, cyano, C$_1$-C$_6$ alkyl-C(O)NH—, C$_1$-C$_6$ alkyl-NH—C(O)—, C$_1$-C$_6$ alkyl, C$_3$-C$_{10}$ cycloalkyl, C$_3$-C$_{10}$ heterocycloalkyl, halogen substituted C$_1$-C$_6$ alkyl, C$_3$-C$_{10}$ heteroaryl and C$_6$-C$_{12}$ aryl;
or R$_{10}$ and R$_{11}$ and the N, C or S to which they are respectively connected form C$_3$-C$_{10}$ heterocycloalkyl, 6-12 membered fused heterocyclyl or C$_3$-C$_{10}$ heteroaryl, and the heterocycloalkyl is optionally substituted by 1-3 substituents selected from the group consisting of halogen, hydroxyl, amino, (C$_1$-C$_6$ alkyl)$_2$N—, C$_1$-C$_6$ alkoxy, cyano, C$_1$-C$_6$ alkyl-C(O)NH—, C$_1$-C$_6$ alkyl-NH—C(O)—, C$_1$-C$_6$ alkyl, C$_3$-C$_{10}$ cycloalkyl, C$_3$-C$_{10}$ heterocycloalkyl, halogen substituted C$_1$-C$_6$ alkyl, C$_1$-C$_6$ alkoxy, C$_3$-C$_{10}$ heteroaryl and C$_6$-C$_{12}$ aryl;
and, the heterocycloalkyl comprises 1, 2 or 3 heteroatoms selected from N, O or S;
the heteroaryl comprises 1, 2 or 3 heteroatoms selected from N, O or S;
the 6-12 membered fused heterocyclyl comprises 1, 2, 3 or 4 heteroatoms selected from N, O or S.

2. The compound, stereoisomer or pharmaceutically acceptable salt thereof according to claim 1, wherein
X is N;
Y is NH;
Z is selected from the group consisting of —N(H)C(O)R$_4$ and —OH;
R$_1$ and R$_3$ are independently selected from the group consisting of hydrogen, halogen and C$_1$-C$_6$ alkyl, and the alkyl is optionally substituted by 1-3 halogens;
R$_2$ is selected from the group consisting of —NR$_8$R$_9$, —CONR$_{10}$R$_{11}$, —COR$_{10}$ and —S(O)$_2$NR$_{10}$R$_{11}$;
R$_4$ is selected from the group consisting of C$_1$-C$_6$ alkyl and C$_3$-C$_{10}$ cycloalkyl; the alkyl and cycloalkyl are optionally substituted by 1-3 substituents selected from the group consisting of halogen and C$_1$-C$_6$ alkylamino;
R$_5$ and R$_6$ are independently C$_1$-C$_6$ alkyl; the alkyl is optionally substituted by 1-3 halogens;
R$_8$ is C$_3$-C$_{10}$ cycloalkyl; the cycloalkyl is optionally substituted by 1-3 substituents selected from the group consisting of halogen and hydroxyl;
R$_9$ is H;
R$_{10}$ and R$_{11}$ are independently selected from the group consisting of hydrogen, hydroxyl, C$_1$-C$_6$ alkyl, C$_3$-C$_{10}$ cycloalkyl, C$_3$-C$_{10}$ heterocycloalkyl, C$_3$-C$_{10}$ heteroaryl and C$_6$-C$_{12}$ aryl, and the alkyl, cycloalkyl, heterocycloalkyl, heteroaryl and aryl are optionally substituted by 1-3 substituents selected from the group consisting of halogen, (C$_1$-C$_6$ alkyl)$_2$N— and C$_1$-C$_6$ alkyl;
or R$_{10}$ and R$_{11}$ and the N to which they are connected form C$_3$-C$_{10}$ heterocycloalkyl, and the heterocycloalkyl is optionally substituted by 1-3 substituents selected from the group consisting of halogen, hydroxyl, (C$_1$-C$_6$ alkyl)$_2$N—, C$_1$-C$_6$ alkoxy and C$_3$-C$_{10}$ heterocycloalkyl.

3. The compound, stereoisomer or pharmaceutically acceptable salt thereof according to claim 2, wherein:
X is N;
Y is NH;
Z is selected from the group consisting of —N(H)C(O)R$_4$ and —OH;
R$_1$ and R$_3$ are independently selected from the group consisting of hydrogen and halogen;

$R_2$ is —$CONR_{10}R_{11}$;
$R_4$ is $CH_3$— or

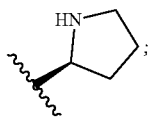 [SMILES: *[C@@H]1CCCN1]

$R_5$ and $R_6$ are independently $C_1$-$C_6$ alkyl;
$R_{10}$ and $R_{11}$ are independently selected from the group consisting of hydrogen, $C_1$-$C_6$ alkyl and $C_3$-$C_{10}$ cycloalkyl, and the alkyl and cycloalkyl are optionally substituted by 1-3 substituents selected from the group consisting of halogen, ($C_1$-$C_6$ alkyl)$_2$N— and $C_1$-$C_6$ alkyl;
or $R_{10}$ and $R_{11}$ and the N to which they are connected form $C_3$-$C_{10}$ heterocycloalkyl, and the heterocycloalkyl is optionally substituted by 1-3 substituents selected from the group consisting of halogen, hydroxyl, ($C_1$-$C_6$ alkyl)$_2$N— and $C_1$-$C_6$ alkoxy.

4. The compound, stereoisomer or pharmaceutically acceptable salt thereof according to claim 3, wherein:
X is N;
Y is NH;
Z is selected from the group consisting of —N(H)C(O)$R_4$ and —OH;
$R_1$ and $R_3$ are independently selected from the group consisting of hydrogen and halogen;
$R_2$ is —$CONR_{10}R_{11}$;
$R_4$ is methyl;
$R_5$ is methyl;
$R_6$ is n-butyl;
$R_{10}$ and $R_{11}$ are independently selected from the group consisting of hydrogen, $C_1$-$C_6$ alkyl and $C_3$-$C_{10}$ cycloalkyl, and the alkyl and cycloalkyl are optionally substituted by 1-3 substituents selected from the group consisting of halogen, ($C_1$-$C_6$ alkyl)$_2$N— and $C_1$-$C_6$ alkyl;
or $R_{10}$ and Ru and the N to which they are connected form $C_3$-$C_{10}$ heterocycloalkyl, and the heterocycloalkyl is optionally substituted by 1-3 substituents selected from the group consisting of halogen, hydroxyl, ($C_1$-$C_6$ alkyl)$_2$N— and $C_1$-$C_6$ alkoxy.

5. The compound, stereoisomer or pharmaceutically acceptable salt thereof according to claim 3, wherein:
X is N;
Y is NH;
Z is selected from the group consisting of —N(H)C(O)$R_4$ and —OH;
$R_1$ and $R_3$ are independently selected from the group consisting of hydrogen and halogen;
$R_2$ is —$CONR_{10}R_{11}$;
$R_4$ is methyl;
$R_5$ is methyl;
$R_6$ is n-butyl;
$R_{10}$ and $R_{11}$ are independently selected from the group consisting of hydrogen, $C_1$-$C_6$ alkyl and $C_3$-$C_{10}$ cycloalkyl, and the alkyl and cycloalkyl are optionally substituted by 1-3 substituents selected from the group consisting of halogen, ($C_1$-$C_6$ alkyl)$_2$N— and $C_1$-$C_6$ alkyl.

6. The compound, stereoisomer or pharmaceutically acceptable salt thereof according to claim 2, wherein:
X is N;
Y is NH;
Z is selected from the group consisting of —N(H)C(O)$R_4$ and —OH;
$R_1$ and $R_3$ are independently selected from the group consisting of hydrogen and halogen;
$R_2$ is —$COR_{10}$;
$R_4$ is methyl;
$R_5$ is methyl;
$R_6$ is n-butyl;
$R_{10}$ is selected from the group consisting of hydroxyl, $C_1$-$C_6$ alkyl, $C_3$-$C_{10}$ cycloalkyl and $C_3$-$C_{10}$ heteroaryl, and the alkyl, cycloalkyl and heteroaryl are optionally substituted by 1-3 substituents selected from the group consisting of halogen and $C_1$-$C_6$ alkyl.

7. The compound, stereoisomer or pharmaceutically acceptable salt thereof according to claim 2, wherein:
X is N;
Y is NH;
Z is selected from the group consisting of —N(H)C(O)$R_4$ and —OH;
$R_1$ and $R_3$ are independently selected from the group consisting of hydrogen and halogen;
$R_2$ is —$COR_{10}$;
$R_4$ is methyl;
$R_5$ is methyl;
$R_6$ is n-butyl;
$R_{10}$ is selected from the group consisting of $C_1$-$C_6$ alkyl and $C_3$-$C_{10}$ cycloalkyl.

8. The compound, stereoisomer or pharmaceutically acceptable salt thereof according to claim 2, wherein:
X is N;
Y is NH;
Z is selected from the group consisting of —N(H)C(O)$R_4$ and —OH;
$R_1$ and $R_3$ are independently selected from the group consisting of hydrogen and halogen;
$R_2$ is —$NR_8R_9$;
$R_4$ is selected from the group consisting of $CH_3$— and

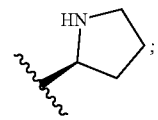 [SMILES: *[C@@H]1CCCN1]

$R_5$ is methyl;
$R_6$ is n-butyl;
$R_8$ is $C_3$-$C_{10}$ cycloalkyl, and the cycloalkyl is optionally substituted by 1-3 substituents selected from the group consisting of halogen and hydroxyl;
$R_9$ is hydrogen.

9. The compound or pharmaceutically acceptable salt thereof according to claim 1, wherein the compound is selected from the group consisting of

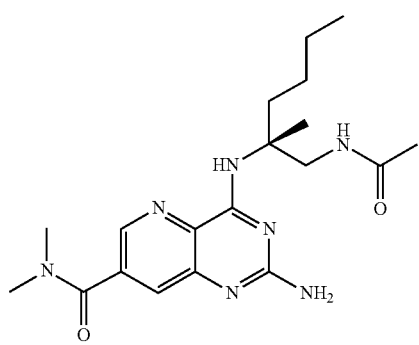
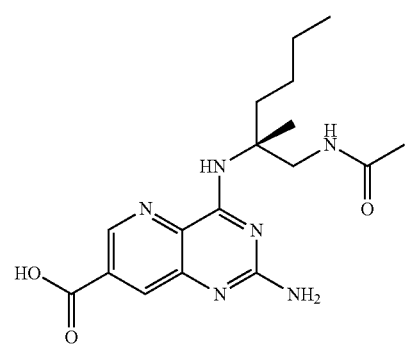
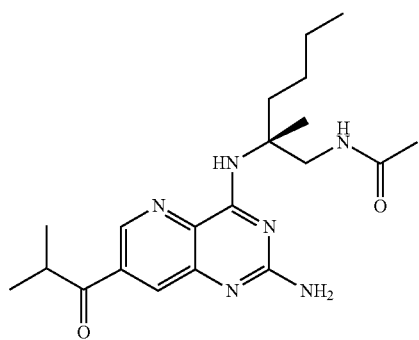
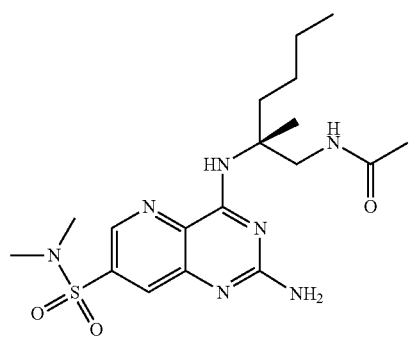
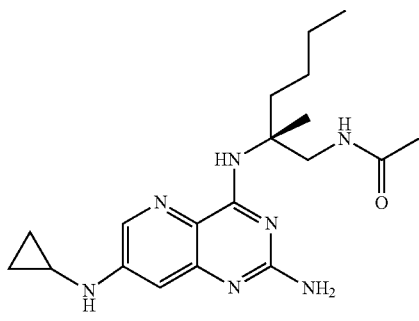
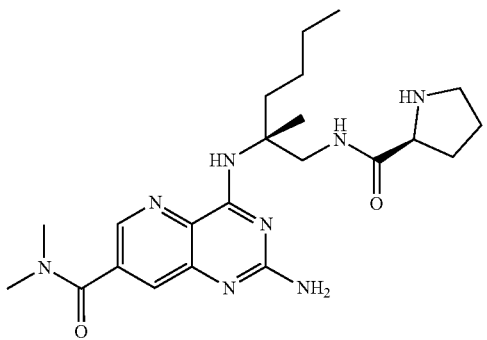
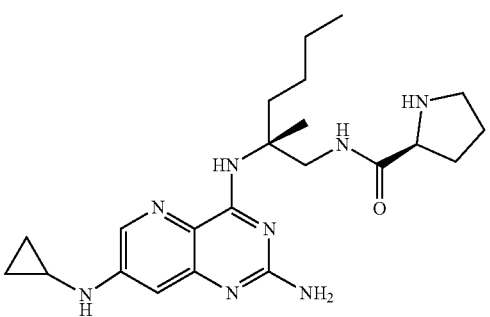
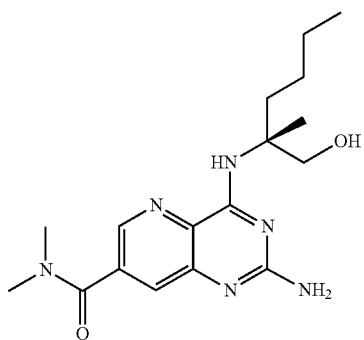
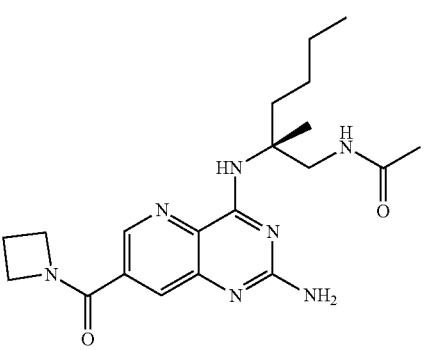
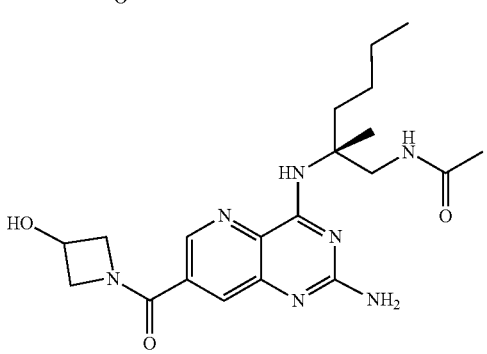

81
-continued
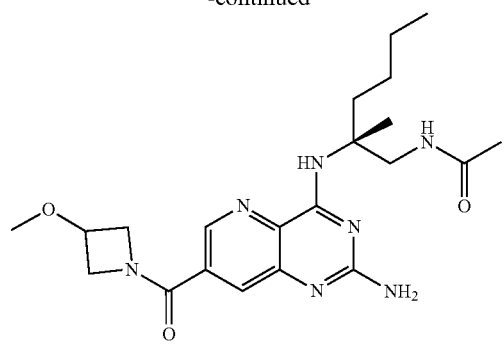
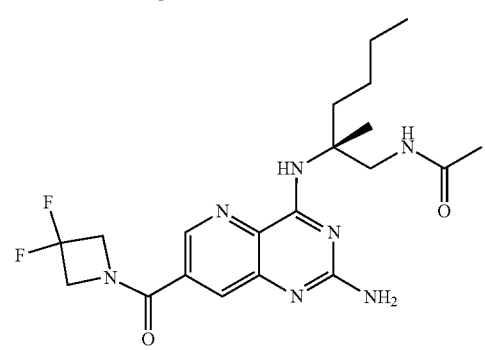
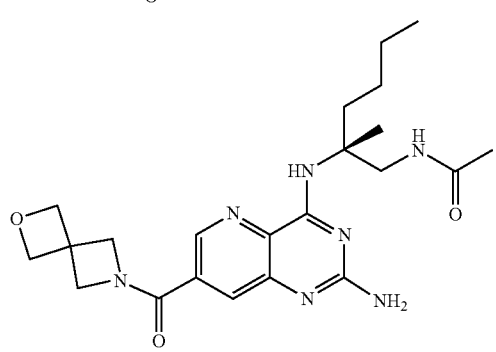
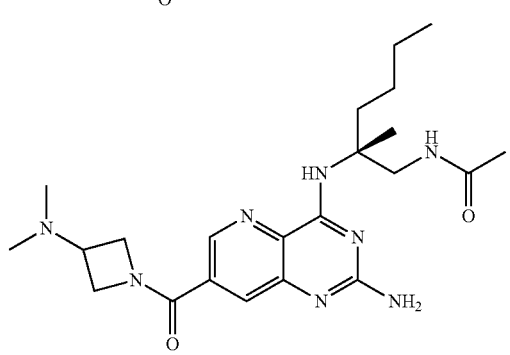
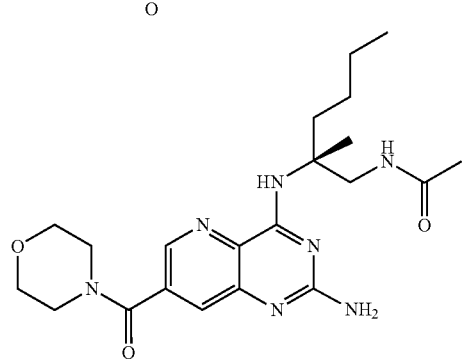
82
-continued
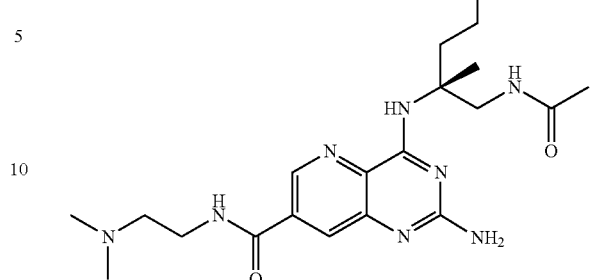
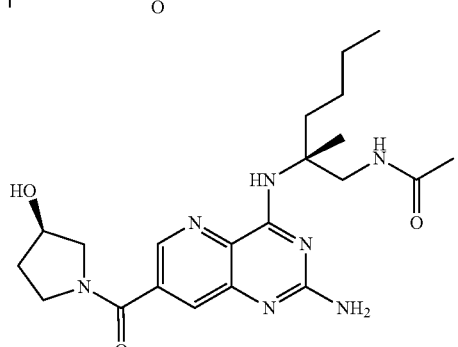
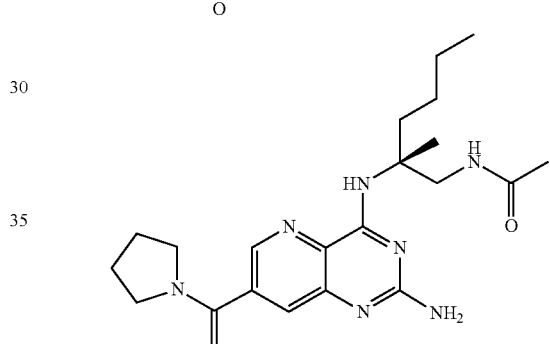
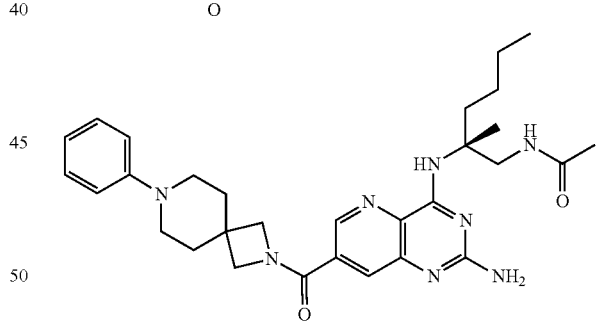
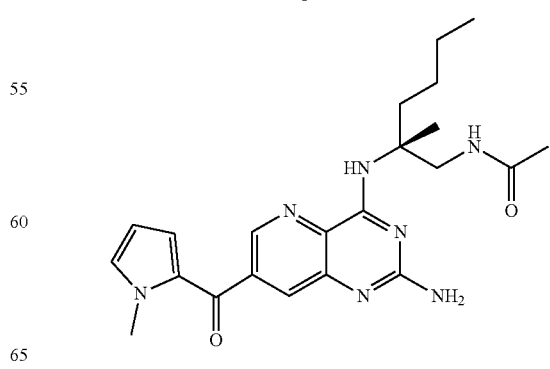

-continued

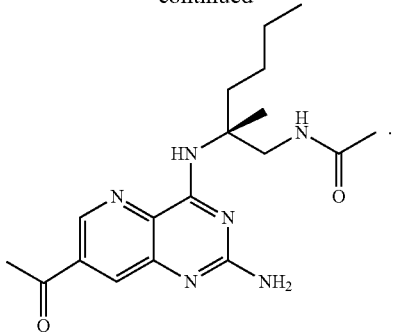

10. A pharmaceutical composition comprising:
   i) one or more of the compounds, stereoisomers or pharmaceutically acceptable salts thereof according to claim 1; and
   ii) pharmaceutically acceptable carriers.

11. A method of treating hepatitis B virus (HBV) infections in a human in need thereof comprising administering to the human an effective amount of the compound, stereoisomer or pharmaceutically acceptable salt thereof according to claim 1.

12. The compound according to claim 1, wherein the compound is

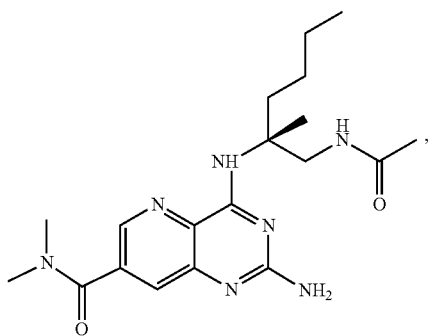 [SMILES: CCCC[C@](C)(CNC(C)=O)Nc1nc(N)nc2cc(C(=O)N(C)C)cnc12]

or a pharmaceutically acceptable salt thereof.

13. The compound according to claim 12, wherein the compound is:

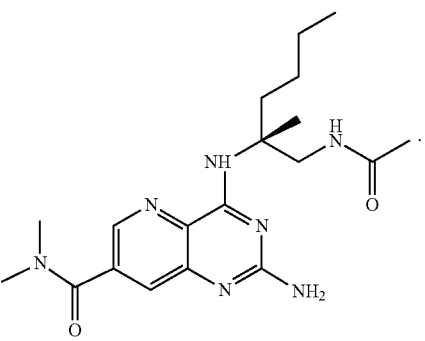 [SMILES: CCCC[C@](C)(CNC(C)=O)Nc1nc(N)nc2cc(C(=O)N(C)C)cnc12]

14. A method of treating hepatitis B virus (HBV) infections in a human in need thereof comprising administering to the human an effective amount of the compound or pharmaceutically acceptable salt thereof according to claim 12.

15. A method of treating hepatitis B virus (HBV) infections in a human in need thereof comprising administering to the human an effective amount of the compound according to claim 13.

* * * * *